US005652890A

United States Patent [19]
Foster et al.

[11] Patent Number: 5,652,890
[45] Date of Patent: Jul. 29, 1997

[54] INTERRUPT FOR A PROTECTED MODE MICROPROCESSOR WHICH FACILITATES TRANSPARENT ENTRY TO AND EXIT FROM SUSPEND MODE

[75] Inventors: Mark J. Foster, Lincoln Township, Berrien County; Saifuddin T. Fakhruddin, St. Joseph; James L. Walker, Benton Harbor; Matthew B. Mendelow, St. Joseph; Jiming Sun, St. Joseph; Rodman S. Brahman, St. Joseph Township, Berrien County; Michael P. Krau, Hagar Township, Berrien County; Brian D. Willoughby; Michael D. Maddix, both of Lincoln Township, Berrien County; Steven L. Belt, Stevensville; Scott A. Hovey, St. Joseph; Mark A. Ruthenbeck, Lincoln Township, Berrien County, all of Mich.

[73] Assignee: Vantus Technologies, Inc., Deerfield, Ill.

[21] Appl. No.: 173,380

[22] Filed: Dec. 23, 1993

Related U.S. Application Data

[63] Continuation of Ser. No. 705,039, May 17, 1991, abandoned.

[51] Int. Cl.$^6$ .................................................. G06F 1/32
[52] U.S. Cl. ...................... 395/750; 395/653; 395/733; 395/734
[58] Field of Search ................................ 395/734, 750

[56] References Cited

U.S. PATENT DOCUMENTS

| | | | |
|---|---|---|---|
| 3,676,861 | 7/1972 | Ruth | 340/172.5 |
| 4,294,496 | 10/1981 | Murez | 312/208.3 |
| 4,317,180 | 2/1982 | Lies | 364/707 |
| 4,381,552 | 4/1983 | Nocilini et al. | 364/707 |
| 4,458,307 | 7/1984 | McAnlis et al. | 395/182.2 |
| 4,461,003 | 7/1984 | Tamaki | 395/102.2 |
| 4,506,323 | 3/1985 | Pusic et al. | 395/448 |
| 4,523,295 | 6/1985 | Zato | 395/750 |
| 4,564,751 | 1/1986 | Alley et al. | 235/146 |
| 4,626,986 | 12/1986 | Mori | 395/700 |
| 4,646,307 | 2/1987 | Nishimura | 395/185.07 |

(List continued on next page.)

FOREIGN PATENT DOCUMENTS 53-22345   3/1978   Japan .

OTHER PUBLICATIONS

Clements, Alan; "Microprocessor Systems Design", 1987, Title pages and pp. 117, 246, 247, 353, 354, PWS–Kent Publishing Company, Boston.

Microsoft, MS–DOS, User's Guide, 1986, Title Pages and p. 245.

IBM System/360 Principles of Operation, Eighth Edition (Sep., 1968) Title pages and pp. 68–83.

Toshiba T1600 "User's Manual" 2d ed.; Title page, pp. 2–1 to 2–3, and pp. 2–8 to 2–11; 1987.

Zenith Data Systems Corporation, MiniSport HD Owner's Manual, pp. 6–1 through 6–3, 1990.

Primary Examiner—Kevin A. Kriess
Assistant Examiner—Kakali Chaki
Attorney, Agent, or Firm—Scott B. Dunbar; James A. Sprowl; T. Murray Smith

[57] ABSTRACT

A laptop computer system includes a protected mode microprocessor capable of operating in restricted and unrestricted modes, and an arrangement which in response to a predetermined condition saves information from the processor and then forcibly switches the processor to its unrestricted mode of operation. When running a multi-tasking operating system where an application program is being executed in a restricted mode, a suspend/resume operation can be carried out in which the system is substantially powered down and then powered back up, and will resume the interrupted application with the restricted mode back in effect. Further, set-up changes such as adjustment of the processor speed can be made without exiting the application program running in the restricted mode.

60 Claims, 50 Drawing Sheets

U.S. PATENT DOCUMENTS

| | | | |
|---|---|---|---|
| 4,658,352 | 4/1987 | Nagasawa | 395/182.12 |
| 4,674,089 | 6/1987 | Poret et al. | 395/183.04 |
| 4,689,761 | 8/1987 | Yurchenco | 364/708.1 |
| 4,694,393 | 9/1987 | Hirano et al. | 395/750 |
| 4,698,748 | 10/1987 | Juzswik et al. | 395/750 |
| 4,734,851 | 3/1988 | Director | 395/479 |
| 4,757,505 | 7/1988 | Marrington et al. | 395/182.2 |
| 4,763,333 | 8/1988 | Byrd | 395/182.2 |
| 4,779,195 | 10/1988 | James | 364/200 |
| 4,782,468 | 11/1988 | Jones et al. | 462/24 |
| 4,787,032 | 11/1988 | Culley | 364/200 |
| 4,823,292 | 4/1989 | Hillion | 364/707 |
| 4,839,837 | 6/1989 | Chang | 361/680 |
| 4,860,190 | 8/1989 | Kaneda | 364/200 |
| 4,868,832 | 9/1989 | Marrington et al. | 395/182.2 |
| 4,870,570 | 9/1989 | Satoh et al. | 395/750 |
| 4,907,150 | 3/1990 | Arroyo et al. | 395/182.22 |
| 4,922,450 | 5/1990 | Rose | 395/750 |
| 4,933,785 | 6/1990 | Morehouse et al. | 360/78.04 |
| 4,945,335 | 7/1990 | Kimura et al. | 340/426 |
| 4,980,836 | 12/1990 | Carter et al. | 364/483 |
| 4,987,535 | 1/1991 | Takayama | 364/200 |
| 4,991,129 | 2/1991 | Swartz | 364/707 |
| 5,014,193 | 5/1991 | Garner et al. | 395/830 |
| 5,021,983 | 6/1991 | Nguyen et al. | 364/707 |
| 5,027,273 | 6/1991 | Letwin | 395/411 |
| 5,027,294 | 6/1991 | Fakruddin et al. | 364/550 |
| 5,068,652 | 11/1991 | Kobayashi | 340/815.43 |
| 5,077,551 | 12/1991 | Saitou | 345/707 |
| 5,083,266 | 1/1992 | Watanabe | 395/550 |
| 5,086,387 | 2/1992 | Arroyo et al. | 395/550 |
| 5,129,091 | 7/1992 | Yorimoto et al. | 395/750 |
| 5,136,694 | 8/1992 | Belt et al. | 395/887 |
| 5,142,684 | 8/1992 | Prry et al. | 395/750 |
| 5,155,840 | 10/1992 | Niijima | 395/550 |
| 5,163,153 | 11/1992 | Cole et al. | 395/750 |
| 5,167,024 | 11/1992 | Smith et al. | 395/375 |
| 5,175,845 | 12/1992 | Little | 395/550 |
| 5,175,853 | 12/1992 | Kardach et al. | 395/650 |
| 5,182,810 | 1/1993 | Bartling et al. | 364/298 |
| 5,189,647 | 2/1993 | Suzuki et al. | 364/10 |
| 5,214,762 | 5/1993 | Bush et al. | 395/837 |
| 5,218,704 | 6/1993 | Watts, Jr. et al. | 395/750 |
| 5,230,074 | 7/1993 | Canova, Jr. et al. | 395/750 |
| 5,237,692 | 8/1993 | Raasch et al. | 395/740 |
| 5,241,680 | 8/1993 | Cole et al. | 395/750 |
| 5,254,888 | 10/1993 | Lee et al. | 327/298 |
| 5,276,888 | 1/1994 | Kardach et al. | 395/725 |
| 5,276,890 | 1/1994 | Arai | 395/750 |
| 5,379,435 | 1/1995 | Hanaoka | 395/750 |
| 5,381,540 | 1/1995 | Adams | 395/425 |
| 5,394,527 | 2/1995 | Fakhruddin | 395/275 |
| 5,396,635 | 3/1995 | Fung | 395/800 |
| 5,465,367 | 11/1995 | Reddy | 395/750 |

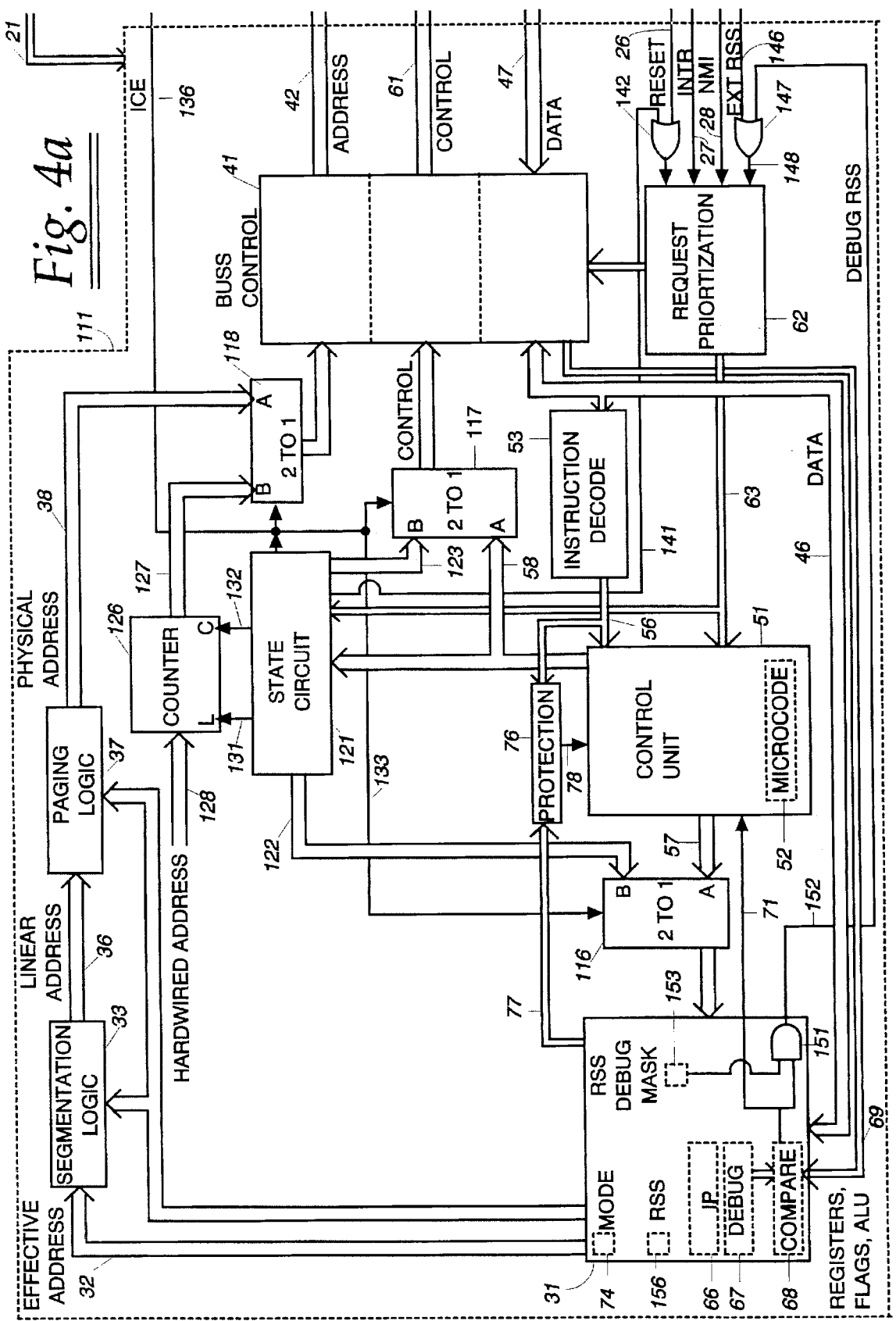

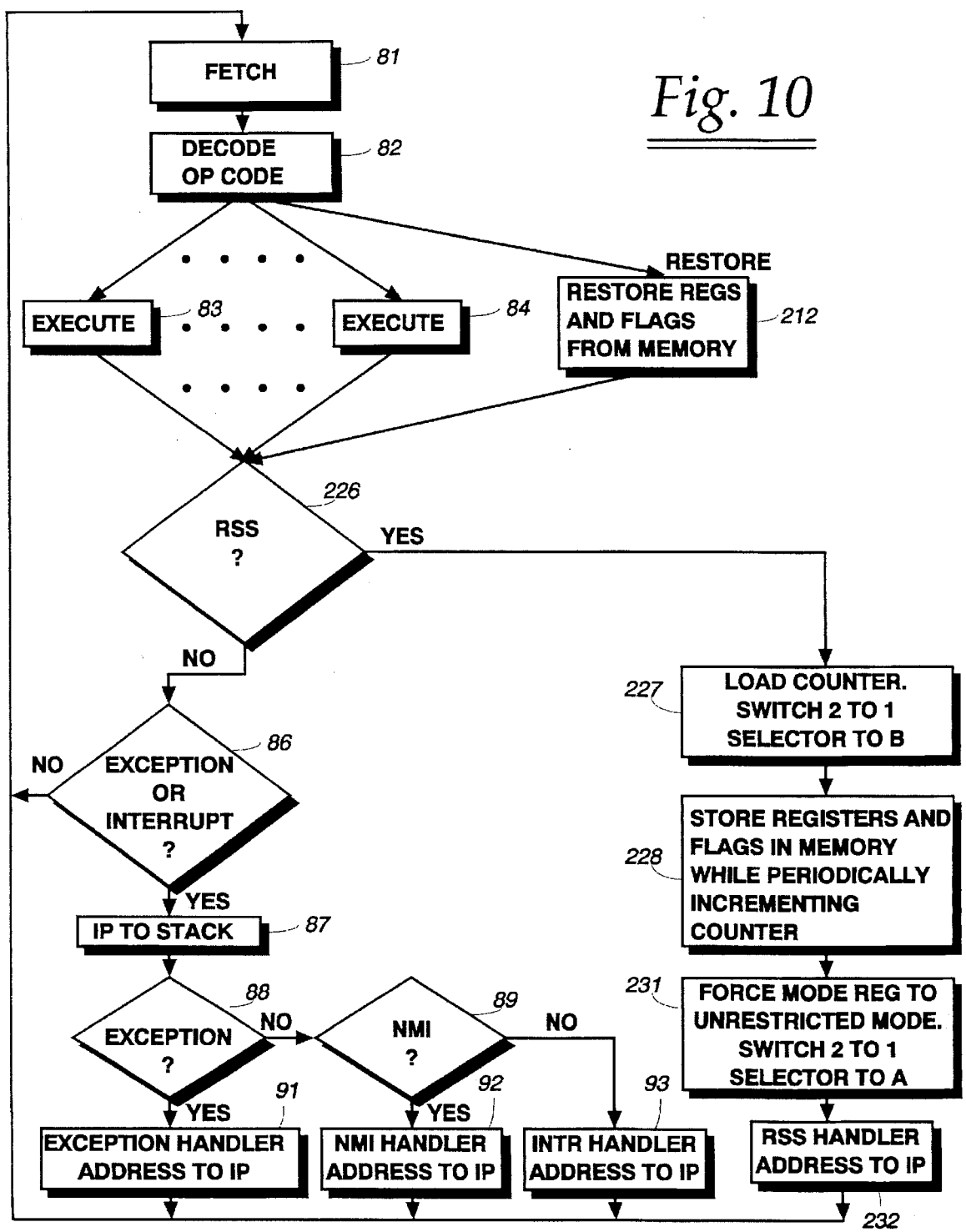

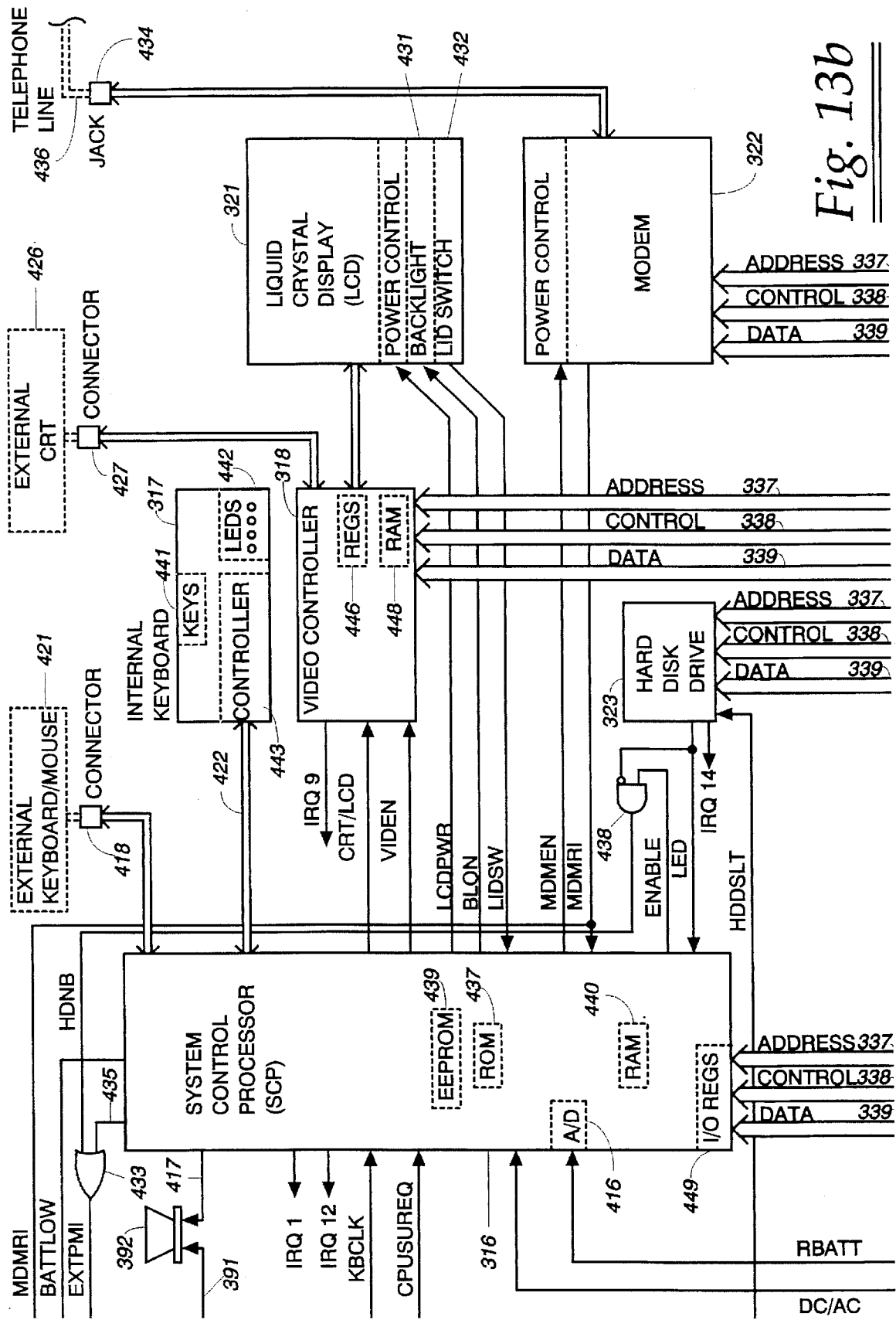

INTERRUPT FOR A PROTECTED MODE MICROPROCESSOR WHICH FACILITATES TRANSPARENT ENTRY TO AND EXIT FROM SUSPEND MODE

This application is a continuation of U.S. Ser. No. 07/705,039, filed May 17, 1991, now abandoned.

CROSS-REFERENCE TO RELATED APPLICATION

This application is related to a copending application entitled METHOD AND APPARATUS FACILITATING USE OF A HARD DISK DRIVE IN A COMPUTER SYSTEM HAVING SUSPEND/RESUME CAPABILITY and filed concurrently herewith.

FIELD OF THE INVENTION

This invention relates generally to the provision of suspend/resume capability in a microprocessor and, more particularly, to the provision of such capability in a protected mode microprocessor to features implemented in a system based on such a microprocessor.

BACKGROUND OF THE INVENTION

Laptop computers are rapidly growing in importance in today's personal computer marketplace. In the past, a few laptop computers offered a feature known as suspend/resume mode (or simply resume mode). This feature is used to save the exact status of the machine whenever the system is powered down. With the use of a back-up battery, the system maintains the saved status until it is powered-up again. This enables users to resume their work as though power had never been turned off. One example of such a system is the PC/Convertible laptop computer, which was manufactured and sold by international Business Machines Corporation (IBM®).

Existing laptops which offer resume mode are based on single-tasking microprocessors such as the 8088 microprocessor made and sold by Intel Corporation of Santa Clara, Calif. In these machines, resume mode offers the above-mentioned benefit, but is limited in functionality due to the single-tasking nature of the machines; it isn't really that much work to bring up a single application, and thus resume mode only saves a few keystrokes. With the growing popularity of serious multi-tasking operating systems such as XENIX and OS/2, resume mode takes on more importance.

For example, computer users want a machine which is "customized" for their use. This customization represents the user's applications programs, interacting in a personalized way. Under the single-tasking nature of operating systems such as Disk Operating System available from Microsoft Corporation, this method of operation is primarily restricted to the use of TSRs (Terminate and Stay Resident applications). On the other hand, OS/2 and XENIX make it possible to create an entirely new "personal environment" containing all of a user's favorite programs, all on-line and all immediately available at the touch of a key.

As these operating environments become more graphics-oriented (via X-Windows and OS/2 Presentation Manager, for instance) the resume concept provides a strong metaphor. In particular, setting up a customized program environment is equivalent to arranging a desk with appropriate tools, which is a very natural behavior. In such a customized environment, resume can literally save hundreds of keystrokes: its value quickly becomes apparent.

The prime problem in implementing resume mode in contemporary laptops is existing processor architectures. In this regard, the Intel 80286/386/486 series of processors offer a number of significant capabilities, and foremost among these capabilities is protected mode. Unfortunately, protected mode programs permit unrestricted operation only by the operating system kernel. Conversely, suspend/resume mode implementations need the ability to freely address system input/output and memory in order to save the state of the machine. This conflict implies that it is necessary to build resume mode code into the kernel of every protected mode program which might be "resumed". This clearly is not an adequate solution, because many pre-existing programs which necessarily lack this feature would be incompatible with the resulting machine.

The Intel 8088 processor does not have protected mode capability. Consequently, the approach used in the current 8088-based laptops mentioned above is to assert the non-maskable interrupt (NMI) to gain control of the processor. While this works well on the 8088, in protected mode processors such as the popular 80286/386/486 it would cause a number of problems:

Once the controller has generated an NMI, external logic must identify the occurrence of the NMI vector fetch cycle. This cannot be based on an absolute address, since the loadable interrupt descriptor table register allows virtually any NMI vector location.

Assuming that the NMI cycle can be detected, it is necessary to come up with a suitable execution (service routine) address for the processor. While operating in protected mode, the global and local descriptor table registers essentially make addresses unknowable to the control circuitry.

Even if a valid address is somehow discerned, its protection rights will probably be inappropriate (such as trying to run code from a stack segment).

In addition, the paging circuitry in the 80386 and 80486 effectively scrambles the processor address lines.

Executing useful code within the hypothetical service routine is exceptionally difficult; even simple techniques such as PUSHing the CPU registers onto the stack may be inappropriate, because the stack may not point to valid memory.

It is important to note that these problems are very similar to those encountered by the designer of an in-circuit emulator (ICE). In both systems, it is necessary to interrupt program execution at an arbitrary point in time without affecting the state of the user's "virtual" machine. After gaining control of the target, free access to the system's input/output and memory is required. While ICEs offer this capability, the associated parts count and cost are ridiculously prohibitive for a portable computer.

A further problem with systems based on protected-mode processors is that it is normally not possible to change certain features of the system configuration while running an application program under existing multi-tasking operating systems. One must exit an application program and operating system, make necessary system configuration adjustments, and then re-enter the multi-taking operating system in the application program, which is tedious and time-consuming.

A further consideration is that some operating systems maintain time and date information separate from the time and date information maintained in hardware, and while the hardware will automatically keep its time and date accurate during a suspend, the time and date in the operating system may become static at the point suspend is entered.

A further consideration is that, while the system is in the suspend mode, a user may remove a floppy disk which was present in a floppy disk drive of the system at the time was powered down, and may even replace it with a different disk. When the interrupted application program is resumed at the end of the suspend mode, there is the danger that it will not realize that the original disk has been replaced with a new disk, and attempt to write data to the new disk with the assumption that it is really the original disk, thereby destroying information on the new disk which the user did not wish to lose.

It may be desirable for a battery-operated system to automatically enter suspend mode when the system is not being actively used in order to conserve battery power, but this can be annoying to the user, and is not absolutely necessary where the system is temporarily operating on AC power.

While separate switches can be used to turn system power on and off and to place the system in suspend mode, this adds to the cost of the hardware and presents the risk that the user may inadvertently actuate the power-off button and thus lose the current operational state of the system in a situation where the user basically intends to always enter and leave suspend mode without losing the existing state of the system.

A further consideration is that, when a user loans his system to another user and the latter changes the system configuration, the configuration set by the original user is lost and the original user is thus faced with the tedious task of attempting to restore his configuration when the system is returned to him.

A further problem is that a user may wish to leave his system for a brief period of time without exiting the application program or turning the system off, and yet want to prevent others from using the keyboard (or other input device) to make alterations or to examine information in the computer system.

A further factor is that conventional floppy disk drives often have internal registers which can be written but cannot be read. If such a disk drive is turned off in order to save power during a suspend mode, the contents of the internal register must be restored when the disk drive is turned back on at the end of suspend mode. However, it is not possible to read the register before suspend mode is enter in order to determine its contents. The desire of users to have a computer system which is compatible with pre-exiting disk drives makes it impractical to simply design a new drive in which all the registers are readable.

A further consideration is that it is often desirable to be able to upgrade the firmware in a computer system from time-to-time in order to obtain new features, but sometimes upgraded firmware is compatible only with more recent versions of the hardware. Unfortunately, the current state of the hardware must normally be determined by dissembling the unit and studying a revision code on the circuit board in order to determine whether upgraded firmware will be compatible with the board, which is a tedious and time consuming process.

When implementing suspend mode, maintaining power to the main memory is commonly viewed as necessary in order to avoid losing the current state of the application program which has been temporarily interrupted, but the maximum duration of the suspend interval is less than it might otherwise be as a result of the fact that a battery powering the system will lose power faster when it has to maintain the main memory than when it does not.

One object of the present invention is to provide a system which is configured around a protected mode processor and is capable of properly carrying out a suspend and resume even when a restricted mode of operation is in effect.

A further object is to provide a system in which system configuration information can be changed even under a multi-tasking operating system without exiting an application program.

A further object is to provide a system which can ensure that time and date information in the active operating system is accurate following a suspend and resume.

A further object is to provide a system which can carry out a suspend and resume operation while reducing the risk the error due to the removal or exchange of a floppy disk present in a floppy disk drive of the system at the time of the suspend.

A further object is to provide a system which has respective sets of configuration parameters for use when the system is respectively operating under AC and DC power, and an arrangement for automatically switching between these respective configurations when the system is switched between AC power and DC power.

A further object is to provide a suspend/resume system having a single button which is deactuated to place the system in either a suspend mode or a power off mode, the system having an internal arrangement which specifies the effect of this button.

A further object is to provide a system having a multi-level configuration, so that after a first user loans the system to a second user and the second user changes the overall configuration, the first user can quickly and easily restore the configuration which was in effect at the time the system was loaned to the second user.

A further object is to provide a system which uses a conventional floppy disk drive without physical modification and which is capable of properly reconfiguring the floppy disk drive following a suspend and resume operation.

A further object is provide a system in which software or firmware can directly determine the current revision status of certain hardware in the system.

A further object is provide a system capable of carrying out a suspend and resume operation without maintaining power to the main system memory.

BRIEF DESCRIPTION OF THE DRAWINGS

Preferred embodiments of the present invention will be described in detail hereinafter with reference to the accompanying drawings, in which:

FIGS. 4a–4b are block diagrams of a computer system embodying the present invention;

FIG. 10 is a flowchart of microcode which is embedded in a processor of the embodiment of FIG. 9;

FIGS. 13a–13b and 13c–13d are respective portions of a block diagram of a further embodiment of a computer system which embodies features of the present invention, FIGS. 13a–13b and 13c–13d being referred to collectively herein as FIG. 13;

FIGS. 29–30, 31a–31c and 32a–32e are flowcharts showing respective portions of a program executed by the auxiliary processor.

DETAILED DESCRIPTION

Figure 1A:
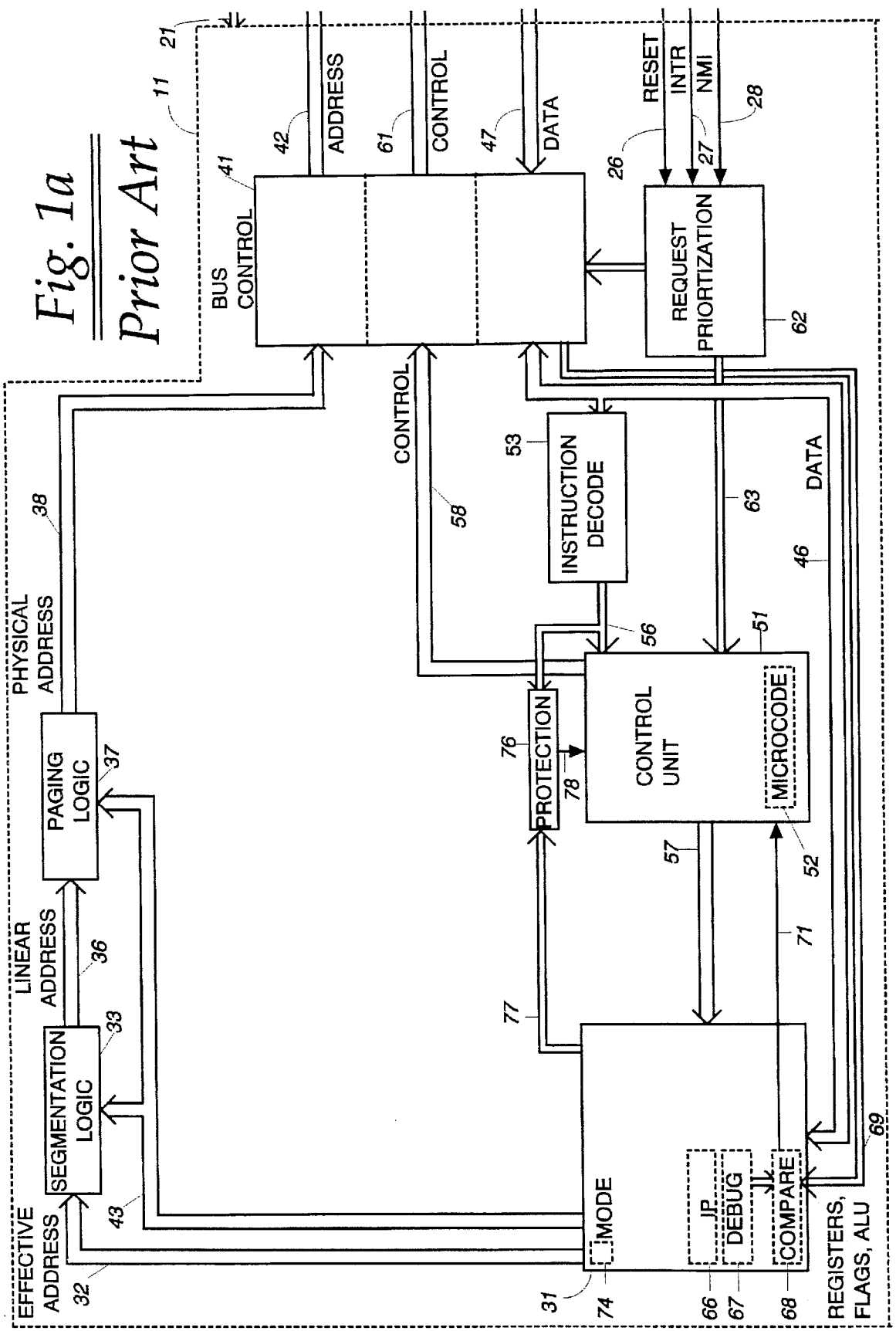
FIGS. 1a and 1b are block diagrams of a conventional computer system.
Figure 1B:
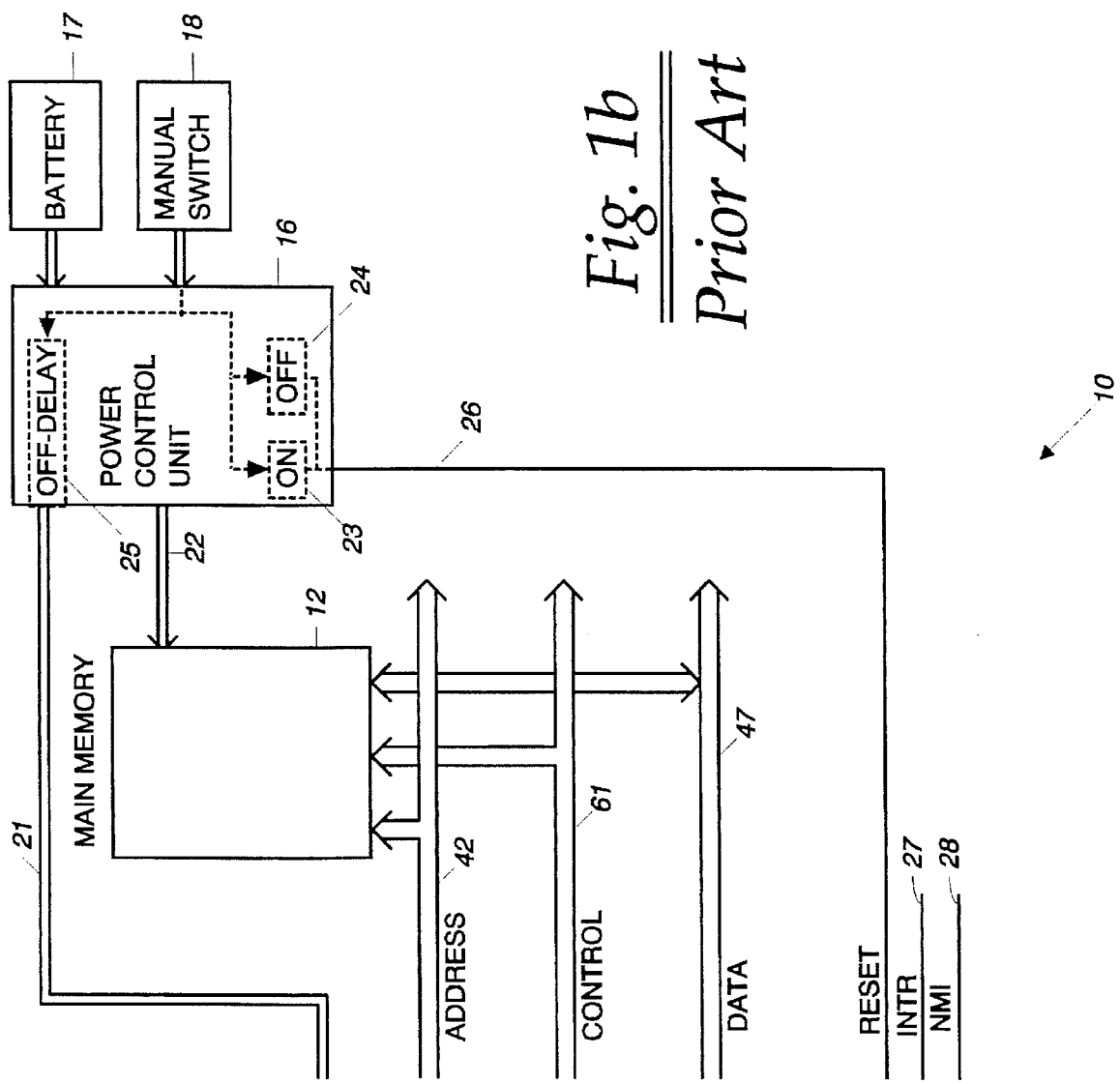

FIGS. 1a–1b are block diagrams of a conventional portable computer system 10 of the type commonly referred to as a "laptop" personal computer, which includes a processor 11, a main memory 12, a power control unit 16, a rechargeable battery 17, and a manually operable power control switch 18. The system 10 also includes a conventional keyboard and liquid crystal display (LCD), but these components are not essential to an understanding of the present invention and have therefore not been illustrated and described.

The main memory 12 is implemented with dynamic random access memory (DRAM). The main memory 12 is volatile, or in other words loses all information stored in it when power to it is turned off. During operation, the main memory 12 typically contains a series of instructions which constitute the program being executed by the processor 11, as well as data used by the program. The main memory 12 may in fact simultaneously store instructions and data for each of several different applications programs, for example a word processor, a spreadsheet, and a database manager.

While the manual switch 18 is actuated, the power control unit 16 supplies power at 21 to the processor from the battery 17, and supplies power at 22 to the main memory from the battery 17. In a conventional and not-illustrated manner, the power from the battery 17 is filtered, regulated and otherwise electrically conditioned, and is converted to various voltages required by respective system components.

The power control circuit 16 also includes a circuit 23 which, when the switch 18 is turned on, produces a reset signal for a predetermined period of time on a line 26 which is connected to the processor 11. After sufficient time has elapsed for power to have stabilized throughout the system, the circuit 23 deactuates the reset line 26. When the manual switch 18 is turned off, a circuit 24 produces a signal which is supplied to the reset line 26 and which is maintained until power in the processor 11 has dissipated, in order to prevent the processor 11 from processing data while it loses power and thus possibly generating and storing erroneous results. The power supplied at 22 to the main memory is not turned off in response to deactuation of the switch 18, but instead remains on so that information in the main memory 12 will not be lost. For example, in a laptop computer which does not have a floppy disk drive or a hard disk drive, maintaining the power at 22 to the main memory ensures that applications programs do not have to be tediously reloaded through a serial or parallel port each time the system is turned on. The power supplied at 21 to the processor 11, on the other hand, is turned off by a circuit 25 a short time interval after the manual switch 18 is deactuated, this time delay ensuring that the reset signal generated by circuit 24 has taken effect throughout the system before the supplied voltages begin to drop.

The processor receives two interrupt signals INTR and NMI on respective lines 27 and 28, the latter being a non-maskable interrupt which is handled with a higher priority than the former.

The processor 11 is a microprocessor implemented as a single monolithic integrated circuit, or as two or three monolithic integrated circuits which are designed specifically to cooperate with each other. The internal processor architecture shown in FIG. 1 is entirely conventional, and is therefore described only briefly herein for purposes of facilitating an understanding of the present invention. One conventional and commercially available microprocessor having this general type of architecture is the Model 80386-SX manufactured by Intel Corporation of Santa Clara, Calif.

The processor 11 includes a section 31, which contains all of the internal registers and flags of the processor, as well as an arithmetic logic unit (ALU). The majority of the registers and flags are not individually depicted, because they are conventional and their depiction is not essential for an understanding of the present invention.

During system operation, the processor 11 uses information in its registers and in instructions it is executing to periodically generate an effective address at 32, which is used by segmentation logic 33 to generate a linear address 36, which in turn is used by paging logic 37 to generate a physical address 38, the physical address 38 being supplied through a bus control unit 41 to an address bus 42 coupled to the main memory 12. The segmentation and paging functions performed by the circuits 33 and 37 are conventional and therefore not described in extensive detail. For purposes of the present invention, it is sufficient to understand that each circuit typically modifies the address presented to it through translation or mapping. Consequently, it is common for the physical address at 38 to be different from the linear address at 36, and for the linear address 36 to in turn be different from the effective address at 32. The section 31 includes special registers which control the segmentation and paging functions, and control signals derived from these registers are supplied at 43 to the circuits 33 and 37.

The section 31 containing registers and flags is coupled by data lines 46 through the bus control unit 41 to a bidirectional data bus 47, the data bus 47 being coupled to the main memory 12.

The processor 11 includes a control unit 51, the operation of which is controlled by a microcode program 52. As is conventional, when the processor 11 is to execute one of the instructions of the program stored in memory 12, the execution of the instruction is implemented by carrying out several substeps or subinstructions defined by the microcode 52. As a program instruction from the memory 12 is read into the processor 11 across data bus 47, the operation code is supplied from the lines 46 to an instruction decode circuit 53, which in turn supplies at 56 to the control unit 51 decoded information regarding the particular instruction so that the control unit 51 will carry out the substeps in the microcode 52 which together constitute execution of the program instruction. The control unit 51 provides control signals at 57 to the section 31 containing the registers, flags and ALU, for the purpose of manipulating the registers, flags and ALU in an appropriate manner for each instruction being executed. The control unit 51 also produces additional control signals at 58, which are supplied through the bus control unit 41 to a control bus 61, which is coupled to the main memory 12. A request prioritization circuit 62 coordinates the handling of respective signals such as the reset signal 26, the INTR interrupt signal 27, and the NMI interrupt signal 28.

One of the registers present in the section 31 is an instruction pointer 66, which contains an address corresponding to the next program instruction in memory 12 which is to be executed. The section 31 also includes several debug registers, one of which is shown at 67 and is connected to a comparator 68. The comparator 68 compares an address present in the debug register 67 to information received at 69 from the bus control unit 41 regarding addresses being accessed via the buses 42, 47 and 61. If the comparator 68 determines that an address being accessed across these buses is identical to the address stored in register 67, the comparator 68 generates an exception signal on a line 71 connected to the control unit 51, and in response to the signal 71 the control unit 51 shifts program execution to a different program portion in the main memory 12 which is an exception handling routine.

The processor 11 is capable of operating in two or more modes, namely an unrestricted mode and one or more restricted modes. In the unrestricted mode, the program in the main memory 12 which the processor 11 is currently executing has generally unrestricted capability to access all of the registers and flags of the processor 11, to access all of the locations of the main memory 12, and to execute each of the instructions which the processor 11 is capable of executing. In contrast, in a restricted mode, the program being executed will typically be prevented by the processor 11 from changing certain registers and/or flags, from accessing certain portions of the main memory 12, and from executing certain instructions, such as instructions which would change the registers or flags the program is not permitted to change. For processors which have more than one restricted mode, the various modes represent progressively stricter levels of restriction regarding the capabilities of the processor which the currently-executing program is permitted to utilize.

As an example of where a restricted mode and an unrestricted mode might be utilized, assume that the main memory 12 has four portions which respectively contain program instructions for an operating system and for three different application programs, such as a word processor, a spreadsheet and a database manager. Assuming that the operating system is operating in the unrestricted mode, as a part of the process of turning control over to the word processing program, the operating system would set the registers controlling the segmentation and paging circuits 33 and 37 so that these circuits are permitted to access the portions of the main memory 12 which contain the instructions and data for the word processing program, but are prevented from accessing the portions of main memory 12 storing the operating system, spreadsheet and database manager. When control is returned from the word processing program to the operating system, the unrestricted mode in which the operating system executes is restored, and thus the operating system can change the control registers for the segmentation and paging circuits 33 and 37 so they permit accesses only to the instructions and data of the spreadsheet program, while turning control over to the spread sheet program and simultaneously instituting a restricted mode.

The section 31 includes a mode register 74 in which the processor maintains an indication of the current operational mode. A reset signal on line 26 forces the mode register 74 to the unrestricted mode. When the mode register 74 indicates that restrictions are in effect, a protection circuit 76 looks for violations of these restrictions. For example, the protection circuit 76 monitors the decoded signals 56 from the circuit 53, in order to determine whether an instruction which is about to be executed is a prohibited instruction for the current level of restriction. Similarly, the protection circuit 76 monitors line 77 from the section 31 in order to detect any attempted access to a register, flag or memory address which is prohibited by the restrictions currently in effect. If the protection circuit 76 detects any violation, it produces an exception signal at 78 which, like the exception signal 71, causes the processor 11 to shift program execution to a special program section provided in the memory 12 to handle protection violations.

Figure 2:
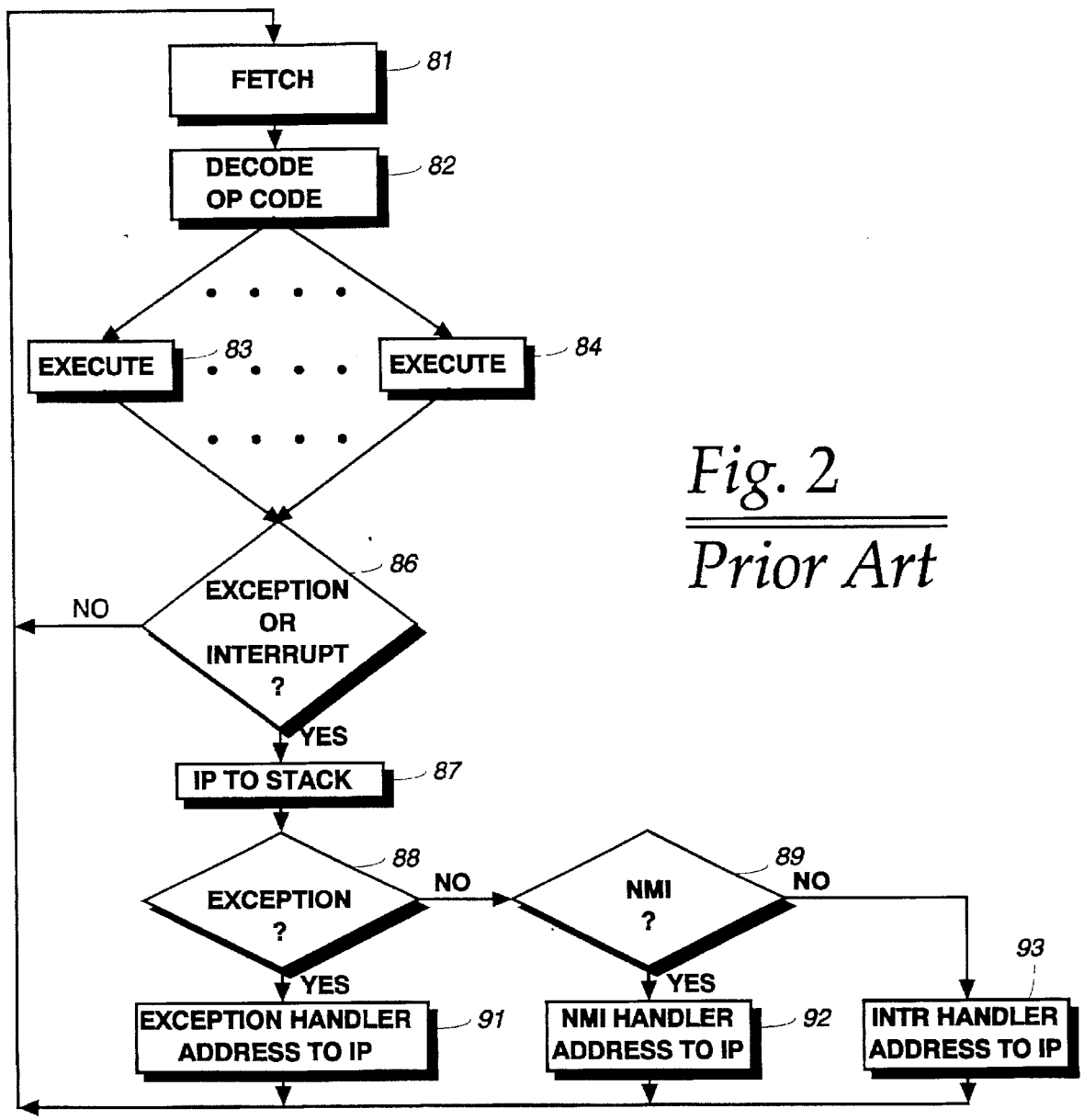
FIG. 2 is a flowchart of conventional microcode embedded in a processor of the embodiment of FIG. 1.

FIG. 2 is a flowchart showing in a simplified and conceptual form a portion of the microcode 52 of the control unit 51. In block 81, the control unit 51 produces at 57 and 58 in FIG. 1 the control signals which cause a program instruction to be fetched from the main memory 12 to the processor 11. Then, at block 82, the operation code of the instruction is decoded by the circuit 53. Then, depending on the particular instruction, a respective separate portion of the microcode is executed in order to effect execution of the specific program instruction, two of these portions being shown diagrammatically at 83 and 84. Then, at 85, the control unit 51 checks to see if an exception has just occurred at 71 or 78 or if an interrupt has just occurred at 27 or 28. If not, the next program instruction is fetched at 81. Otherwise, the instruction pointer register 66 is saved on a stack in the memory at 87, and then at 88 and 89, control is shifted to one of three microcode portions 91–93 which each load into the instruction pointer the starting address of a respective program portion in the memory 12 which will handle the respective condition which has occurred. Control then returns to 81, where the instruction fetched is the first instruction of the handler routine.

Those of ordinary skill in the art will recognize that it is possible to carry out the fetch 81 and decode 82 of the next instruction which is expected to be executed while the processor is carrying out execution of the current instruction at 83 or 84. Thus, the separate block of FIG. 2 are not intended to imply that the events shown therein must occur at different points in time, but are merely intended to illustrate the basic sequence of events which typically occurs in a cyclic manner within the microcode controlled control unit.

Figure 3:
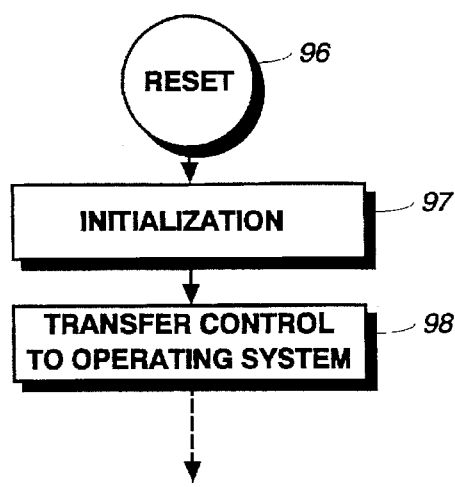
FIG. 3 is a flowchart of a conventional program used in the embodiment of FIG. 1.

FIG. 3 is a flowchart of the events which happen when power to the system is turned on. In particular, the circuit 23 (FIG. 1) of the power control unit 16 generates a reset signal on line 26, which resets the processor 11 so that it starts at 96 in FIG. 3. When the reset signal terminates, the processor 11 begins operation at a predetermined address in the memory 12, which is the start of a short routine causing it to carry out some system initialization, as shown in block 97 of FIG. 3. Then, control is shifted to the resident operating system at 98, which typically gives the user an opportunity to manually select, load and start one of several different application programs.

As evident from the foregoing discussion, the protection capabilities of the processor 11 are highly advantageous in multi-tasking situations where instructions and data for different application programs are simultaneously present in respective portions of the memory 12. This essentially permits an operator to build a customized or personalized computing environment in which each of his or her favorite application programs are all loaded and ready to run, and thus the user can quickly and conveniently switch between them with a minimal number of keystrokes. Various multi-tasking operating environment programs are now available, including for example WINDOWS from Microsoft and OS/2 PRESENTATION MANAGER from International Business Machines.

A desirable extension of this concept of a personalized operating environment is the implementation in association with it of what is commonly called suspend/resume capability, which has previously been implemented only in systems where the processor did not have a protection mechanism with a restricted mode and thus always operated in an unrestricted mode, namely systems intended for use with single-tasking programs such as Disk Operating System (DOS) available from Microsoft and from International Business Machines.

According to the basic suspend/resume concept, when the system is to be powered down, the exact status of the system is saved in a memory and is maintained through use of a back-up battery until the system is powered-up again, at which point the status is restored and execution resumes from the point at which it was terminated when the power was turned off. Thus, if a user was in his word processing program when he turned the power off, then when the power is turned back on he will find himself looking at the same screen displaying the same document with the cursor at the same location as at the point in time when power was turned off.

As to existing microprocessors which have protected mode capability and are thus suitable for use in multi-tasking environments, such as the processor 11 of FIG. 1, the basic problem in implementing suspend/resume is that, when power is turned off, an application program will typically be executing under a restricted mode which prevents the unrestricted access needed to registers, I/O and memory in order to store the entire current state of the system. For example, certain registers cannot be accessed and saved because of the restricted mode which is in effect, and unrestricted addressing of the I/O and memory may not be possible as a result of the restricted mode which is in effect. With respect to addressing, it should be understood that if a program is attempting to store the state of the system at a known address in memory, the segmentation and paging circuits 33 and 37 address may scramble the known address so that the state of the machine is actually stored at an unknown address different from the known address, and when the system was subsequently turned back on it would have no way of knowing the unknown address the information had been stored. The protection mechanism, of course, prevents the control registers for the paging and segmentation circuits 33 and 37 from being changed in order to avoid the problem. In short, saving the state of a processor requires some capability for unrestricted system access at a point in time when a restricted mode is in effect to facilitate execution of an application program, whereas existing protection mechanisms have been very carefully designed to absolutely prevent any such unrestricted access so that it is completely impossible for one application program to inadvertently alterer any portion of the instructions or data of another application program.

As mentioned above, the foregoing discussion of FIGS. 1a–1b and 2–3 relates entirely to a hardware and software arrangement which is conventional. The present invention involves an improvement of this conventional arrangement which permits suspend/resume capability to be implemented in a multi-tasking processor environment which utilizes a protection mechanism having restricted mode capabilities. Such an arrangement which embodies the present invention is shown in FIGS. 4a–4b, 5 and 6 and is described in detail below.

Figure 4B:
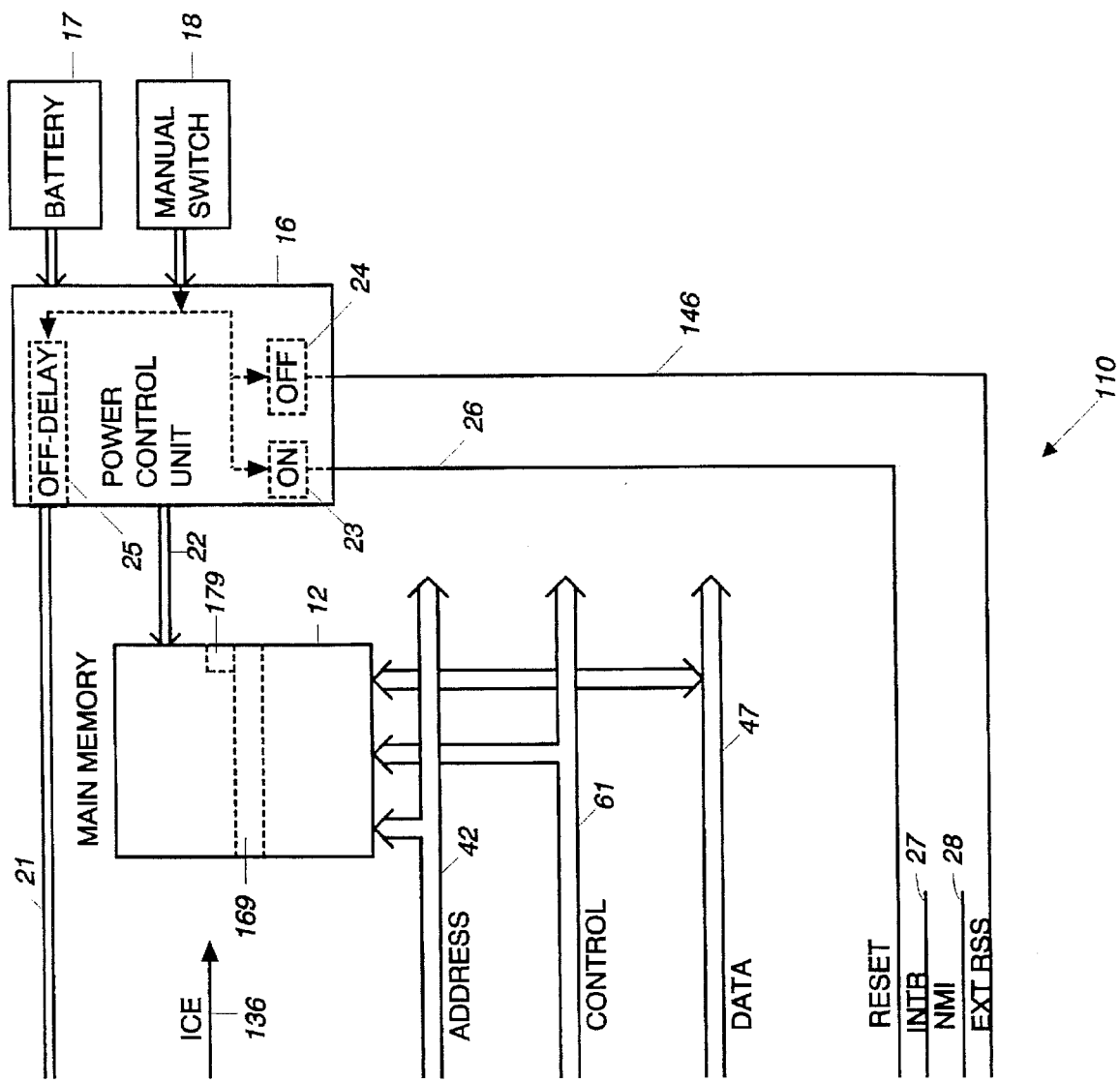

FIGS. 4a–4b show a computer system 110, in which elements equivalent to elements of FIG. 1 are designated with the same reference numerals used in FIG. 1. The memory 12, power control unit 16, battery 17 and manual switch 18 are all identical to those in FIG. 1. The processor 111 includes all of the elements present in the processor 11 of FIG. 1, as well as some additional elements which are discussed in detail below.

More specifically, the processor 111 includes a two-to-one selector 116 having two inputs ports A and B, the control signals 57 from the control unit 51 being connected to the input port A, and the outputs of the selector 116 being connected to register section 31 in place of the signals from control unit 51. The control signals 58 from the control unit 51 are connected to the A input port of a further two-to-one selector 117, the outputs of this selector being connected to the bus control unit 41. The physical address lines 38 from the paging circuit 37 are connected to the A input port of a third two-to-one selector 118, the outputs of this third selector being connected to the bus control unit 41.

A state circuit 121 has control outputs 122 which are coupled to the B input port of the selector 116, and has control outputs 123 which are connected to the B input port of the selector 117. A binary counter 126 has outputs 127 which are connected to the B input of the selector 118, and the inputs of the counter 128 are hard-wired so as to constantly present to the input of the counter a predetermined address. The state circuit 121 produces a load control line 131 which, when pulsed, causes the counter 126 to be loaded with the hard-wired address present at 128, and has a count control line 132 which, when pulsed, causes the counter 126 to increment. The state circuit 121 also generates a select control signal 133 which is connected to a control input of each of the two-to-one selectors 116, 117 and 118. The two-to-one selectors 116–118 each supply to their output lines the signals present at the A input port thereof when the select control line 133 is deactuated, and each supply to their output lines the signals present at the B input port thereof when the select line 133 is actuated. The select control line 133 is also connected to an external pin 136 on the integrated circuit package for the processor 111, to serve as an ICE signal for a purpose discussed later.

It will be noted that, when the select line 133 is actuated, the control unit 51 is functionally disconnected from the rest of the processor 111. In particular, the state circuit 121 can control the register, flag and ALU section 31 through the selector 116, and supplies control signals to the bus control unit 41 through the selector 117. Further, the segmentation and paging circuits 33 and 37 are effectively bypassed, because addresses are supplied from the counter 126 through the selector 118 to the bus control unit 41.

The state circuit 121 also produces a reset output line 141 which is connected to one input of a two-input OR gate 142, the output of the OR gate 142 being connected to the reset input of the prioritization circuit 62, the other input of the gate 142 having applied thereto the reset signal produced on line 26 from the power control unit 16.

At the power control unit 16, the output of circuit 24 is not connected to the reset line 26 as it was in the embodiment of FIG. 1. Instead, the output of circuit 24 drives a new line 146, which serves as an external request for a state save (EXTRSS) of the processor. This EXTRSS line 146 is connected to one input of a two-input OR gate 147, the output 148 of which serves as a new input to the circuit 62 and is effectively treated by the processor 111 like a non-maskable interrupt having a higher priority than either of the pre-existing interrupts INTR and NMI on lines 27 and 28. When an RSS interupt is being serviced, the pre-existing interrupts INTR and NMI are ignored, and if present are serviced after the RSS has been serviced. The register section 31 includes a request state save (RSS) debug mask 153, which is preferably a single unused bit in a pre-existing internal control register of the processor. This mask bit 153 is connected to one input of a two-input AND gate 151, the other input of which is coupled to the exception signal 71 from the comparator 68, the output 152 of gate 151 being coupled to the other input of the OR gate 147.

The register section 31 also includes an RSS register 156, which is preferably two unused bits of a pre-existing internal control register of the section 31. One of these bits is called the RSS flag, and as described in more detail below, the state circuit 121 automatically sets this flag each time an interrupt occurs at the new RSS interrupt input 148. At the point in time when this flag is set, the other bit of this register is loaded with the state of line 152, to provide a software-testable indication of whether the interrupt at 148 was produced by a signal from gate 151 or, alternatively, by a signal from circuit 24 in the power control unit 16. The RSS register 156 is not changed by a reset signal from gate 142.

Figure 5:
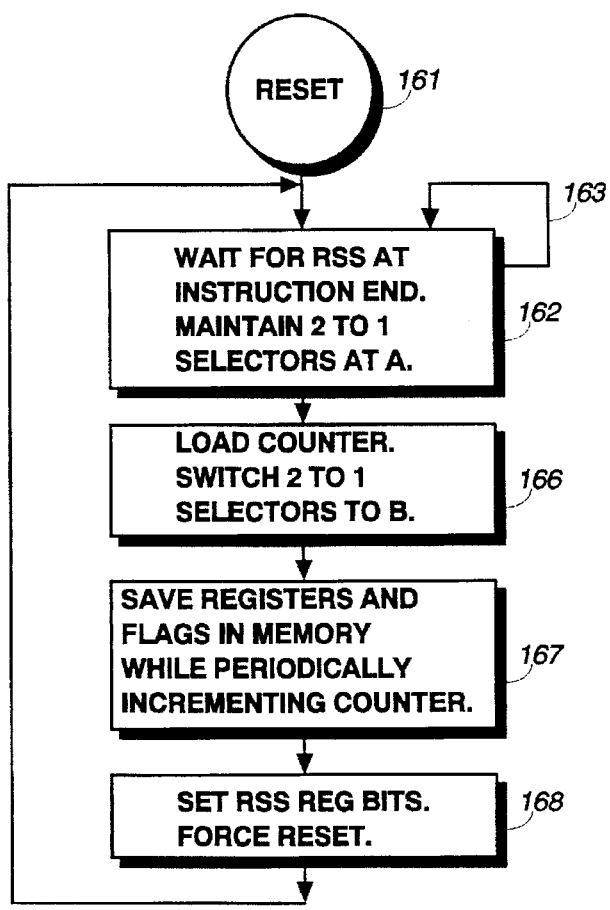
FIG. 5 is a state diagram for a state machine which is a component of the embodiment of FIG. 4.

FIG. 5 is a state diagram showing diagrammatically the operation of the state circuit 121. Those of ordinary skill in the art are thoroughly familiar with techniques for building a state circuit which will implement the state diagram shown in FIG. 5, for example the techniques taught in the book "Switching and Finite Automata Theory" by Zvi Kohavi, published in 1970 by McGraw-Hill Book Company of New York. Thus, the internal structure of the state circuit 121 is not illustrated and described in detail, but the state diagram of FIG. 5 is described below in detail.

In particular, following a power-up reset signal on line 26 (FIG. 4), the state circuit proceeds from initial state 161 to state 162, where it monitors the signals 63 from the circuit 62 and the signals 58 from the control unit 51, looking for a request state save (RSS) interrupt at 148 at the end of execution of a program instruction by the control unit 51, while simultaneously maintaining the signal 133 in a deactuated condition so that the two-to-one selectors 116–118 each supply their A input port to their output. So long as this condition of interest does not occur, the state circuit 121 remains in state 162, as shown diagrammatically at 163. However, when an RSS interrupt is eventually found to exist at the end of execution of a program instruction, the state circuit 121 transitions from state 162 to state 166, where it produces a pulse on output line 131 to load the hard-wired address 128 into the counter 126, while activating the select control line 133 to switch each of the two-to-one selectors 116–118 so that each is supplying the signals from its B input port to its outputs.

The state machine 121 then unconditionally transitions to state 167, where it generates control signals at 122 and 123 which cause the registers and flags of the section 31 to be successively supplied across data lines 46, through bus control unit 41 and across data bus 47 to the main memory 12, where they are stored in a portion 169 of the main memory 12 reserved for this purpose. The portion 169 of memory 12 begins at the hard-wired address defined at 128.

As the registers and flags are being successively supplied to the memory, the state circuit 121 periodically pulses the line 132 in order to increment the counter 126 and thereby present a series of progressively increasing addresses to the memory 12, so that the register and flag information is stored in successive locations of the memory 12.

When all of the registers and flags have been stored in portion 169 of memory 12, the state machine 121 transitions unconditionally in FIG. 5 from block 167 to block 168, where it produces control signals at 122 which affect the two bits of the RSS register 156, in particular by forcibly setting the RSS flag bit and by loading into the other bit the state of line 152. Simultaneously, the state circuit 121 actuates line 141 in order to force a reset by means of gate 142. The purpose of the reset is to put the processor into a known state, which includes putting it into the unrestricted mode of operation. The reset, of course, forces the state circuit 121 back to state 163, where it deactuates the line 133 in order to switch the two-to-one selectors back to their A input ports. This reset forces the mode register 74 to a state selecting the unrestricted mode, but has no effect on the RSS register 156. The reset also causes the control unit 51 to respond in exactly the same manner as it would to a power-up reset, in particular by executing an instruction at a predetermined address in the memory 12, which is the first instruction of a software routine present in the memory 12.

Figure 6:
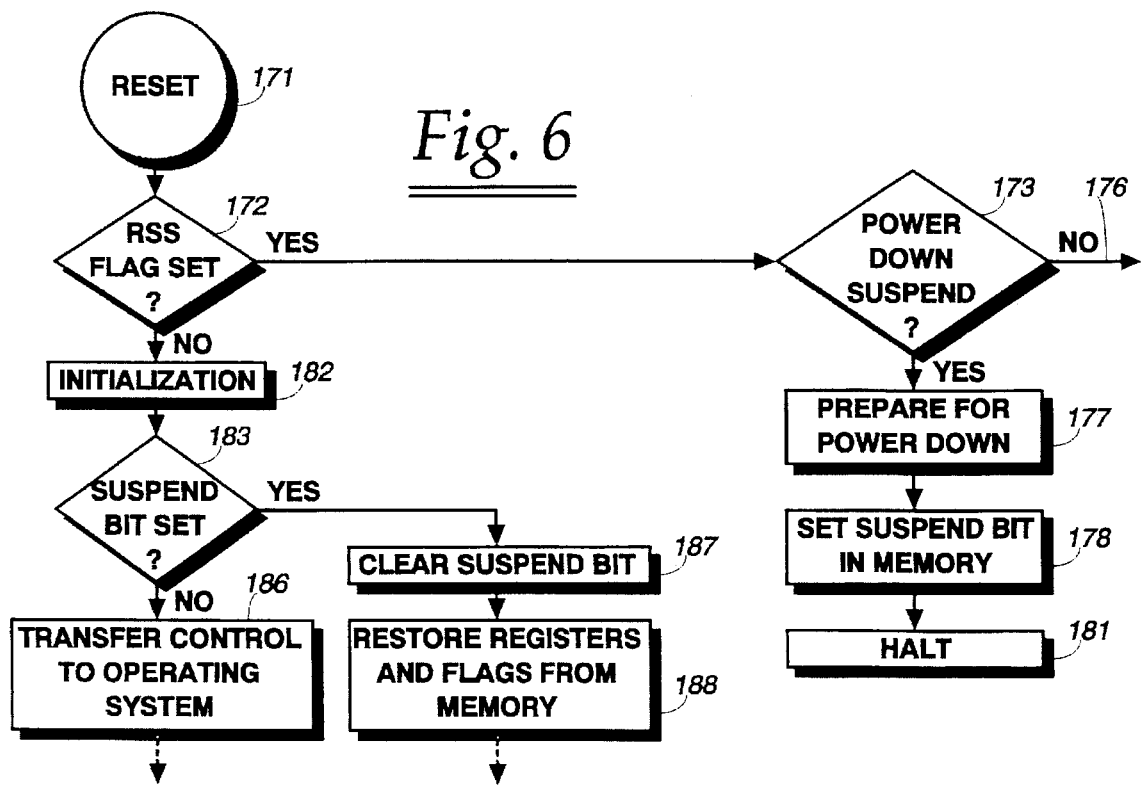
FIG. 6 is a flowchart of a program executed by the computer system of FIG. 4.

A flowchart of this software routine is shown in FIG. 6, and is a modified version of the conventional routine shown in FIG. 3. In particular, following the reset, this routine proceeds from 171 to 172, where it checks the RSS register 156 to see if the RSS flag bit is set. If it is, then the software routine proceeds to block 173, where it checks the other bit of the RSS register 156 in order to determine the source of the RSS condition. If the bit is set because the line 152 was actuated, then control would proceed at 176 to an appropriate software routine to handle the debug RSS.

On the other hand, if the RSS interrupt was caused by actuation of line 146 by power control unit 116 in order to indicate that the switch 18 has been deactuated and that power to the processor 111 is being turned off, control proceeds from block 173 to block 174, where the processor does any housekeeping necessary to prepare for a power loss. In particular, the entire state of the processor itself has already been saved, but the processor may need to save the states of peripherals which may be present, or take some other appropriate action. Then, at 178, the processor sets a suspend bit 179 in a reserved location of the main memory 12, in order to indicate that the suspend portion of a suspend/resume operation has been performed, so that when power is again turned on the system will know that it can perform the complementary resume operation. The processor 111 then halts at 181, and waits for the power control circuit 16 to terminate the power supplied to the processor at 21. After terminating power at 21, the power control unit 16 continues to supply power from battery 17 to main memory 12, in order to maintain all of the data stored in main memory 12.

When power is subsequently turned back on, the power control unit 16 will produce a power-up reset on line 26 in the usual manner, so that the control unit 51 again causes program execution to begin at 171 in FIG. 6. Due to the power loss, the RSS flag bit of the register 156 will not be set, and thus control will proceed from block 172 to block 182, where the usual system initialization is carried out. Then, at block 183, the suspend bit at 179 in the main memory 12 is checked. In the event this bit were not set, because no suspend operation had been done when the power was turned off, control would proceed to block 186 where the operating system would be started in the usual manner. However, where it is found at 183 that the suspend bit is set, control proceeds to block 187 where the suspend bit is cleared, and then to block 188 where the processor executes a series of instructions which successively restore the register and flag states saved in portion 169 of the memory 12 to the various registers and flags in the section 31. The last register to be restored is the instruction pointer register, because loading the instruction pointer register with its saved value will cause the next instruction fetched to be the next instruction to be executed in the application program which was interrupted by the power loss. Thus, the application program continues running from the point at which it was interrupted, as if it had never been interrupted at all.

Referring again to FIGS. 4a–4b, it was mentioned above that the signal 133 produced by the state circuit 121 to control the two-to-one selectors 116–118 is also connected to an external pin ICE at 136 of the physical package for the integrated circuit of the processor 111. This facilitates use of an in-circuit emulator with the processor 111. The pin 136 is actuated at the point in time where the state circuit 121 disables the outputs of the control unit 51 in order to control saving of the current status of the processor 111 in the portion 169 of memory 12. Consequently, when a not-illustrated in-circuit emulator recognizes that the signal on pin 136 has been actuated, it can disconnect the busses 42, 47 and 61 of the processor from external devices such as the memory 12, and couple these busses to its own control RAM. Then, as the processor performs the state-save process, the register and flag information will be recorded in the emulator RAM. The in-circuit emulator can then easily examine and/or change the information in the emulator RAM.

The gate 151 has been provided in order to enhance the debugging capabilities provided by an in-circuit emulator. In particular, the emulator can adjust the information in its RAM corresponding to the debug register 67 to specify an address in a software program at which execution is to be stopped, and can also set the bit in its RAM corresponding to the debug mask register 153, and can then cause the CPU register and flag status to be restored so that the processor 111 continues with the application program. When an access is made to the address specified in debug register 67, the comparator 68 actuates its output 71 which, through gate 151, produces an RSS interrupt at 148 to cause the state circuit 121 to perform the state-save operation, during which the in-circuit emulator causes the state-save information to be directed to its own RAM in the manner described above. The emulator will then have readily available in its RAM the status of all registers and flags in the processor 111 at the point in time when the processor attempted to access the address of interest. In this manner, the in-circuit emulator could single-step through the instructions of a program, while permitting a programmer to freely and easily examine the status of all of the internal registers and flags of the processor 111 despite the fact that they are physically embedded within a monolithic integrated circuit.

It will be noted that the embodiment of FIGS. 4a–4b requires no change at all to the microcode 52 of the control unit 51, the microcode 52 being identical to that for the embodiment of FIGS. 1a–1b.

Use of the hard-wired address at 128 might be inconvenient in some applications, and for those applications it would be desirable to be able to selectively specify the beginning address of the portion 169 of the memory 12.

Figure 7A:
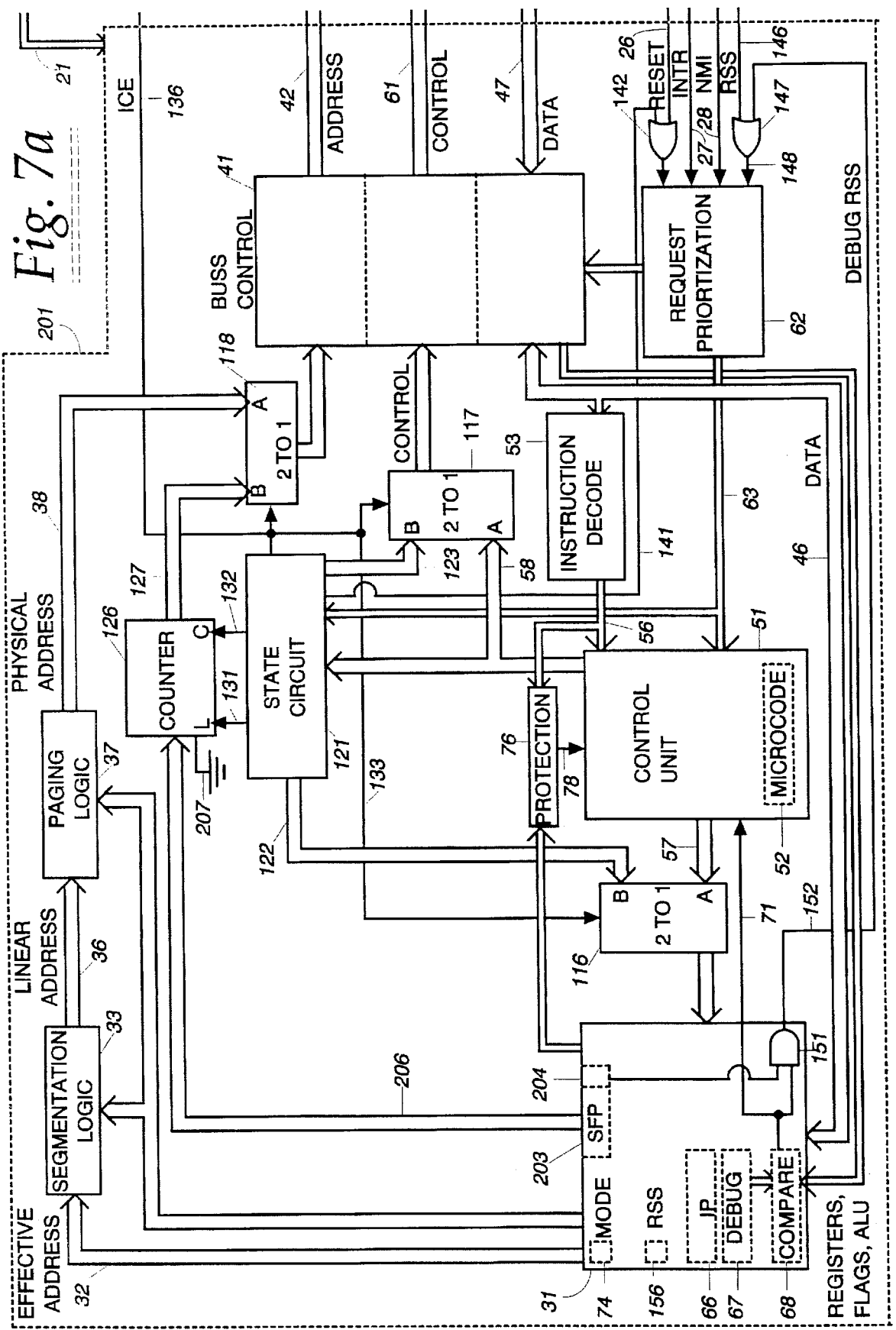
FIGS. 7a–7b are block diagrams of an alternative embodiment of computer system of FIG. 4.
Figure 7B:
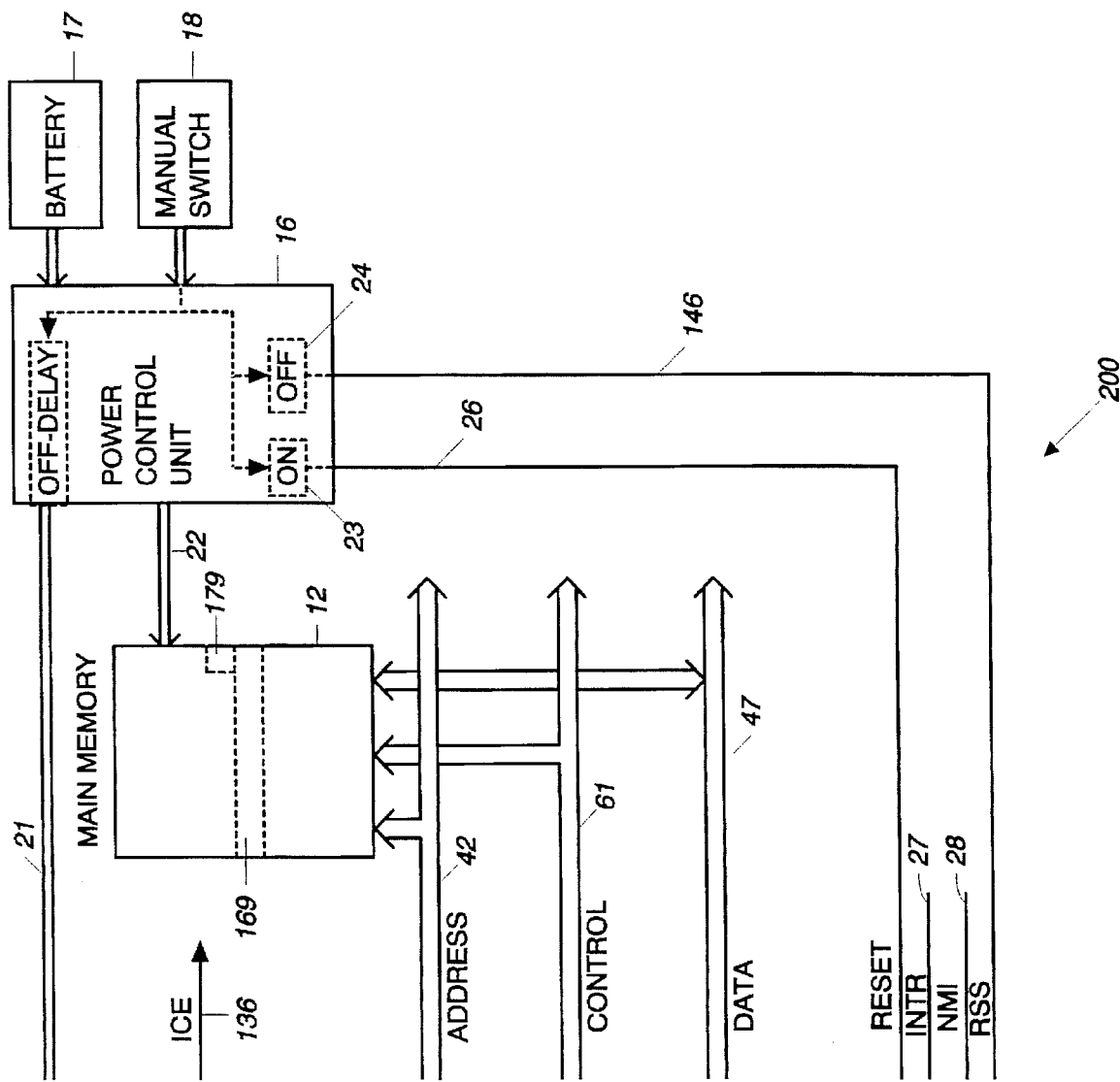

FIGS. 7a–7b are modification of the embodiment of FIGS. 4a–4b which provides this feature. FIGS. 7a and 7b are identical to FIGS. 4a and 4b respectively, except as described hereinafter, and elements in FIGS. 7a–7b equivalent to those in FIGS. 4a–4b respectively have been designated with the same reference numerals.

In FIGS. 7a and 7b, a new save frame pointer (SFP) register 203 has been provided in the register section 31, the least significant bit 204 of this register being used as the mask bit which can enable and disable the gate 151. All outputs of the register 203 except the least significant bit are connected at 206 to the inputs of the counter 126, the least significant input bit of the counter being connected to ground at 207. Thus, by properly loading the SFP register 203, the portion 169 of the memory 12 can be selectively placed almost anywhere which is convenient within the memory 12, except that the starting address must always be on an even-byte boundary as a result of the fact that the least significant bit of the starting address is grounded at 207.

Figure 8:
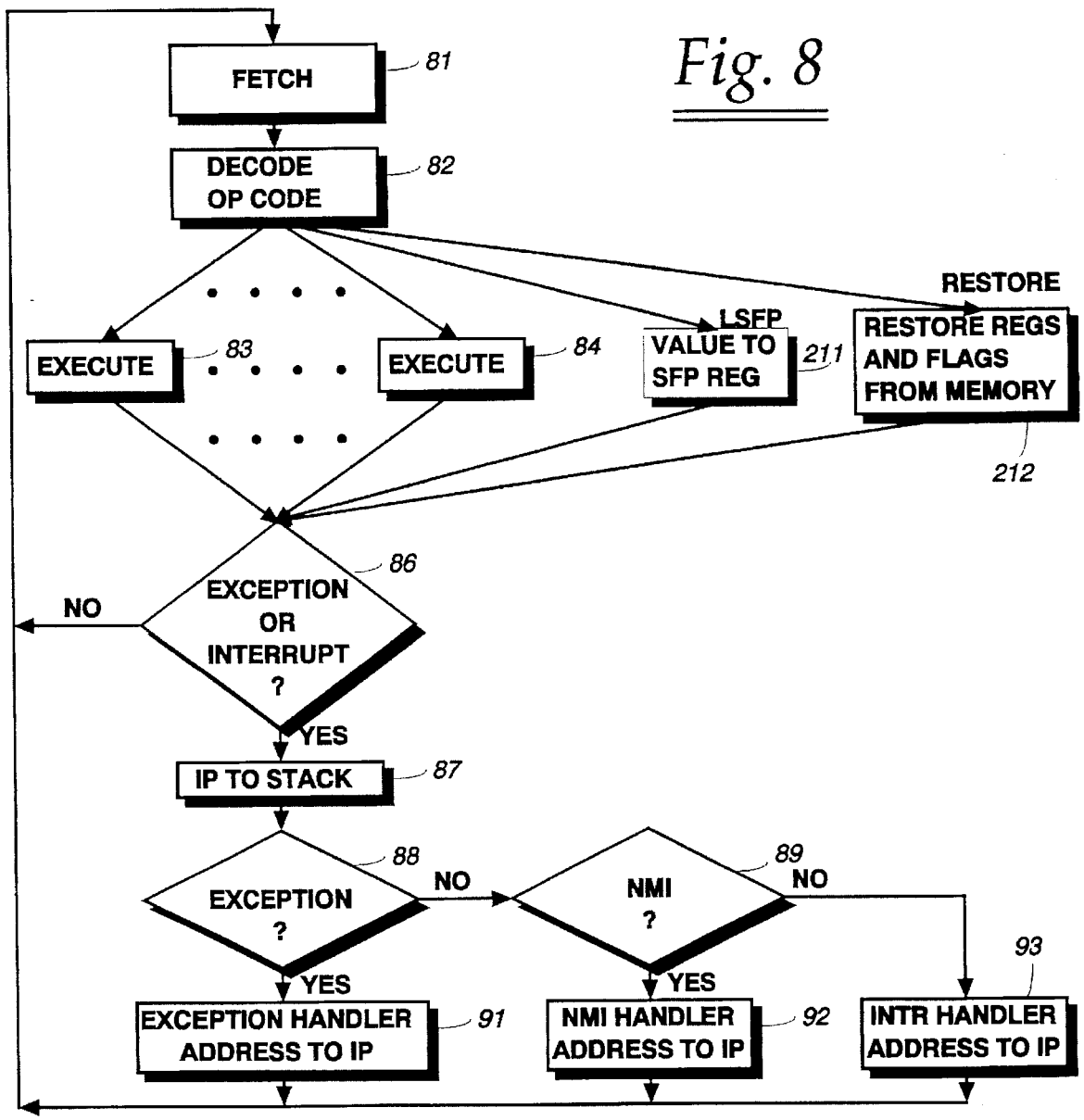
FIG. 8 is a flowchart of microcode embedded in a processor of the embodiment of FIG. 7.

In order to load the special new SFP register 203, a new load save frame pointer (LSFP) program instruction is provided, which of course necessitates a modification to the microcode 52. The modified microcode for the embodiment of FIGS. 7a and 7b is shown in FIG. 8. FIG. 8 includes all of the blocks depicted in the conventional microcode of FIG. 2, and they are labelled with the same reference numbers. In addition, however, FIG. 8 includes a new block 211 corresponding to execution of the new LSFP instruction. Further, FIG. 8 includes a second new block 212 which corresponds to execution of an additional new instruction RESTORE. The RESTORE instruction automatically extracts the stored processor status from portion 169 of the memory 12 and restores it to all registers and flags in the section 31 of processor 201. This is much faster and more efficient than executing a long series of software program instructions which progressively restore the states of the respective registers and flags of the processor. The operation of the embodiment of FIGS. 7a–7b is essentially the same as that described above for FIGS. 4a and 4b in association with FIGS. 5 and 6, recognizing that the initialization sequence in block 182 of FIG. 6 would include execution of the new LSFP instruction in order to initialize the SFP register 203 of FIGS. 7a–7b, and that the block 188 of FIG. 6 would be carried out simply by executing the new RESTORE instruction 212 (rather than a long series of pre-existing instructions) in order to restore the saved state of the processor to its registers and flags.

Figure 9A:
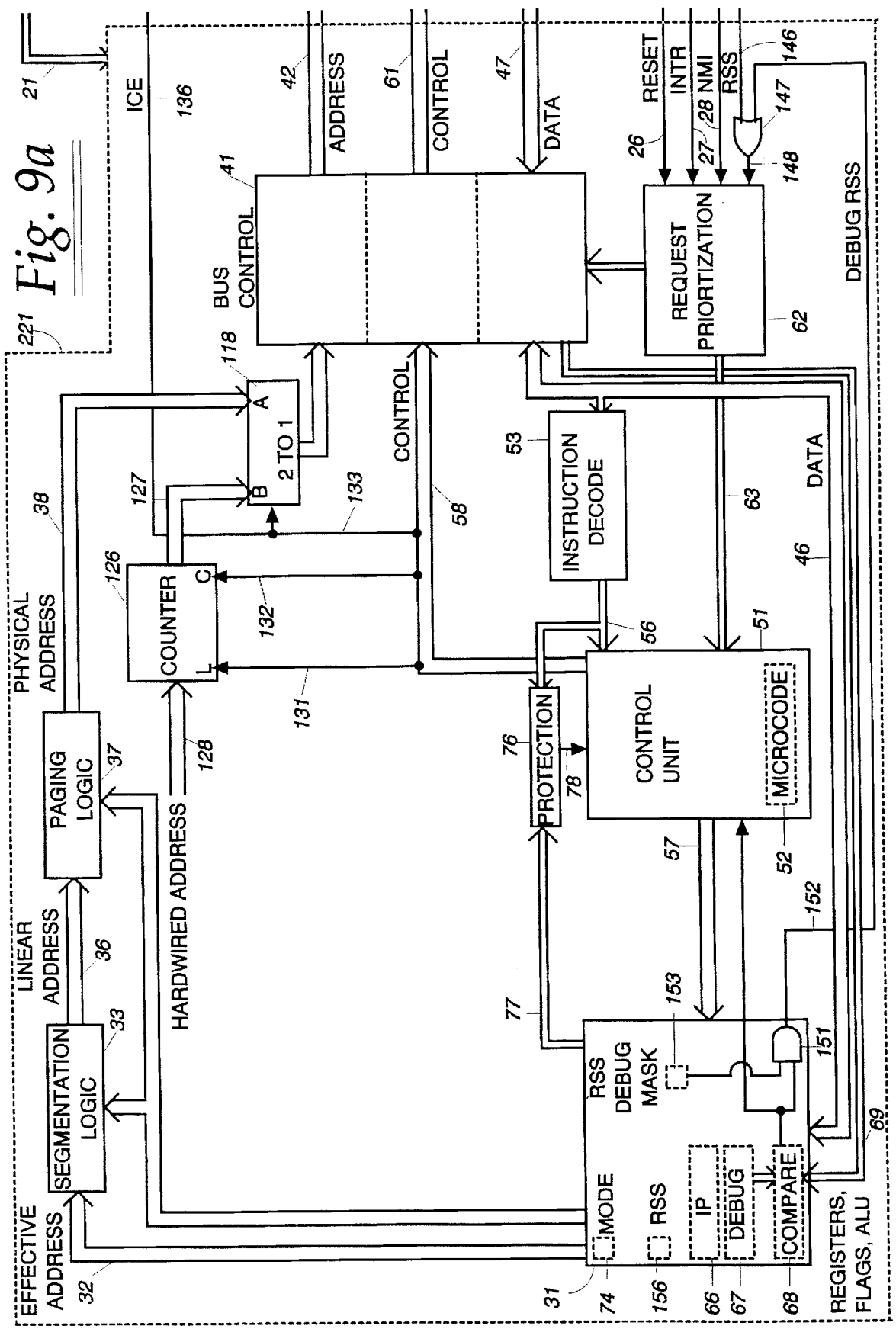
FIGS. 9a–9b are block diagrams of a computer system which is a further alternative embodiment of the system of FIG. 4.
Figure 9B:
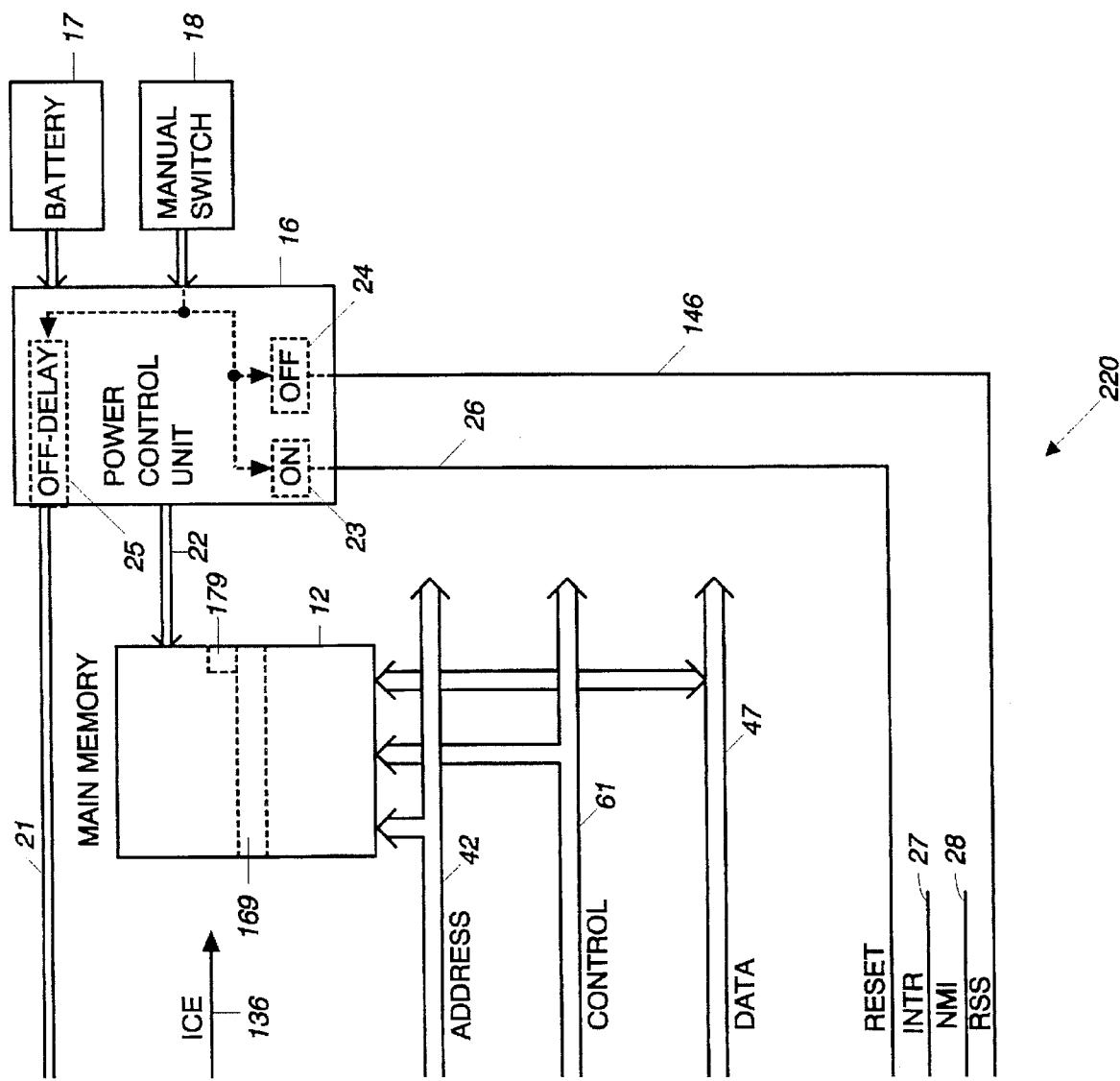

By modifying the microcode 52 somewhat more extensively, it is possible to have the state save operation controlled directly by the control unit 51, thereby avoiding the need to provide the state circuit 121 to control the state save. This approach is implemented in another modified version of the embodiment of FIGS. 4a–4b as depicted in FIGS. 9a–9b. Elements in FIGS. 9a–9b which are the same as elements in FIGS. 4a–9b respectively have been designated with the same reference numerals. However, it will be noted that certain elements such as the state circuit 121 and the two-to-one selectors 116 and 117 are not present in the embodiment of FIGS. 9a–9b. The two-to-one selector 118 and the counter 126 remain, in order to permit the control unit 51 to bypass the address manipulation functions produced by the segmentation and paging circuits 33 and 37. The load counter and increment counter control lines 131 and 132 are produced directly by the control unit 51, as is the select control line 133 for the two-to-one selector 118.

The revised microcode for the embodiment of FIGS. 9a–9b is shown in FIG. 10. Many of the blocks in FIG. 10 are equivalent to blocks in FIG. 8, and have therefore been designated with the same reference numerals. FIG. 10 does, however, include some new blocks. In particular, following execution of each program instruction, a check is made at 226 to see if an RSS interrupt has just occurred at 148 in FIGS. 9a–9b. If not, control moves to block 86, and proceeds in the same manner as described above for FIG. 2. On the other hand, if it is determined at 226 that an RSS interrupt has just occurred, control proceeds to block 227, where the microcode causes control unit 51 to produce a pulse on line 131 which loads the counter 126 with the hard-wired address 128, and to actuate the control line 133 in order to switch the two-to-one selector 118 so that its outputs are supplied with signals from its B input port. Then, control proceeds to block 228, where the microcode causes the control unit 51 to successively route the registers and flags from the section 31 across data lines 46, through bus control unit 41 and across data bus 47 to memory 12, while periodically producing pulses on line 132 in order to increment the counter 126, so that the registers and flags are stored at successive locations in the portion 169 of memory 12.

Then, the microcode proceeds to 231, where it forcibly resets the mode register 74 so that it selects an unrestricted mode. At the same time, it also deactuates the control line 133 to switch the two-to-one selector 118 back to its A input port. Then, at 232, it loads the instruction pointer 66 with a predetermined address in the memory 12 which contains the first instruction of a software routine for handling the RSS interrupt, and then returns to block 81 where this first instruction of the software routine is fetched.

Figure 11:
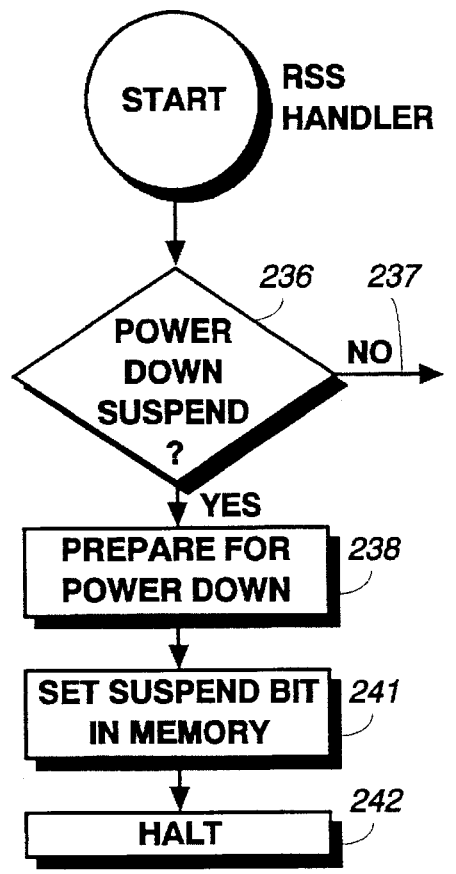
FIGS. 11 and 12 are flowcharts of respective portions of a m ed by the system of FIG. 9.

A flowchart of this software routine is shown in FIG. 11. This routine begins at 236 by checking the RSS register 156 to determine if the RSS interrupt was caused at 152 by a debug exception or at 146 by a power-down signal. In the event of a debug exception, a branch is made at 237 to a routine to handle the debug exception. Otherwise, control proceeds from block 236 to block 238, where the processor 221 does housekeeping preparation for a power-down, such as saving the states of peripherals. Then, at 241, the software sets the suspend bit 179 in the memory 12. Then, at 242, the processor halts and waits for the power supplied at 21 to be terminated.

Figure 12:
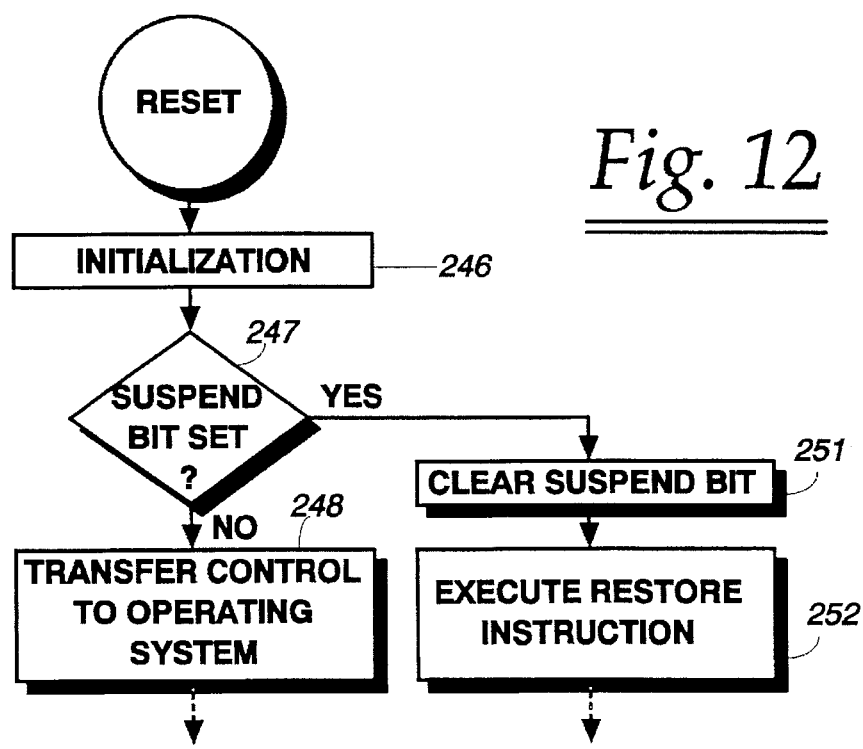
Figure 13A:
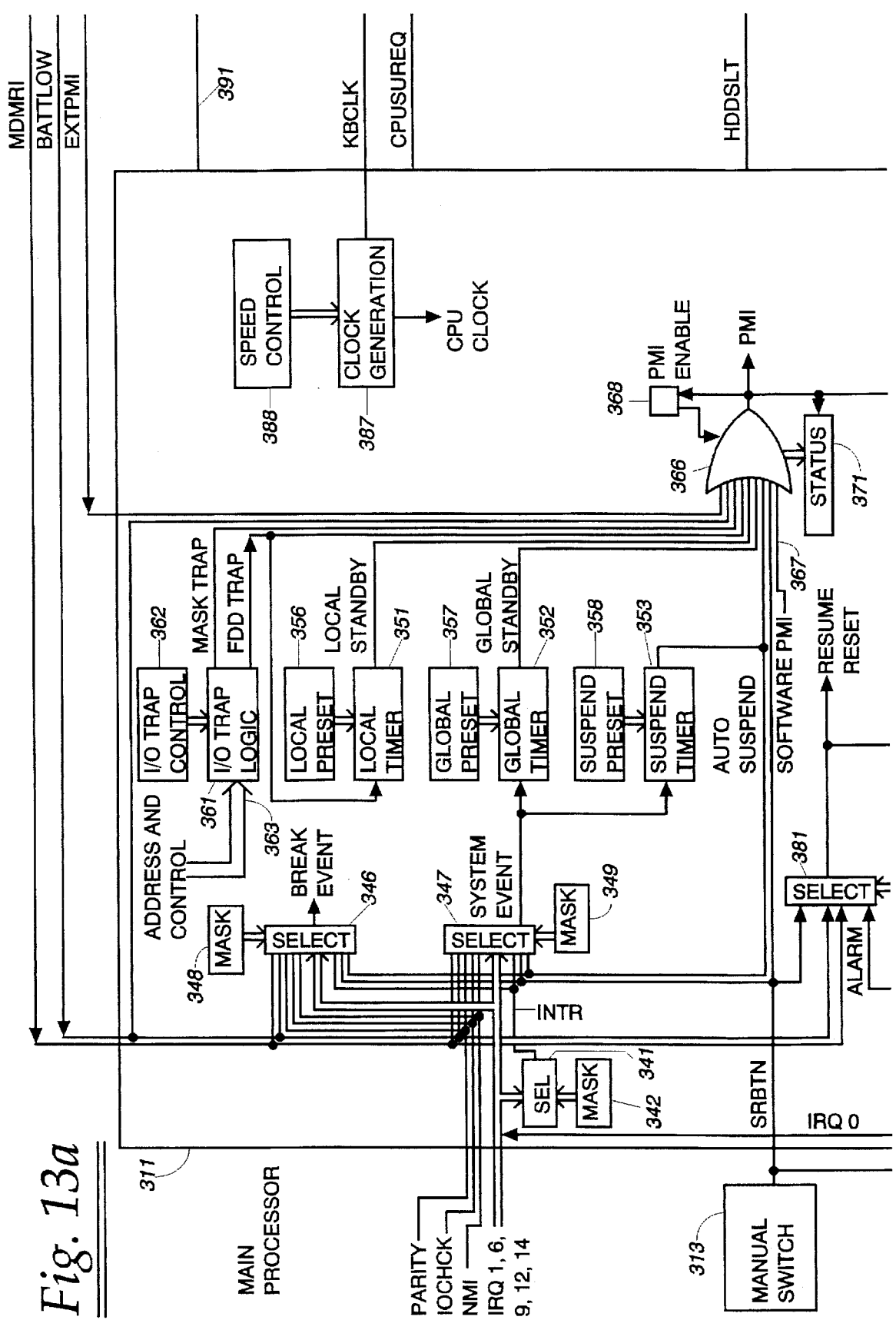
Figure 13C:
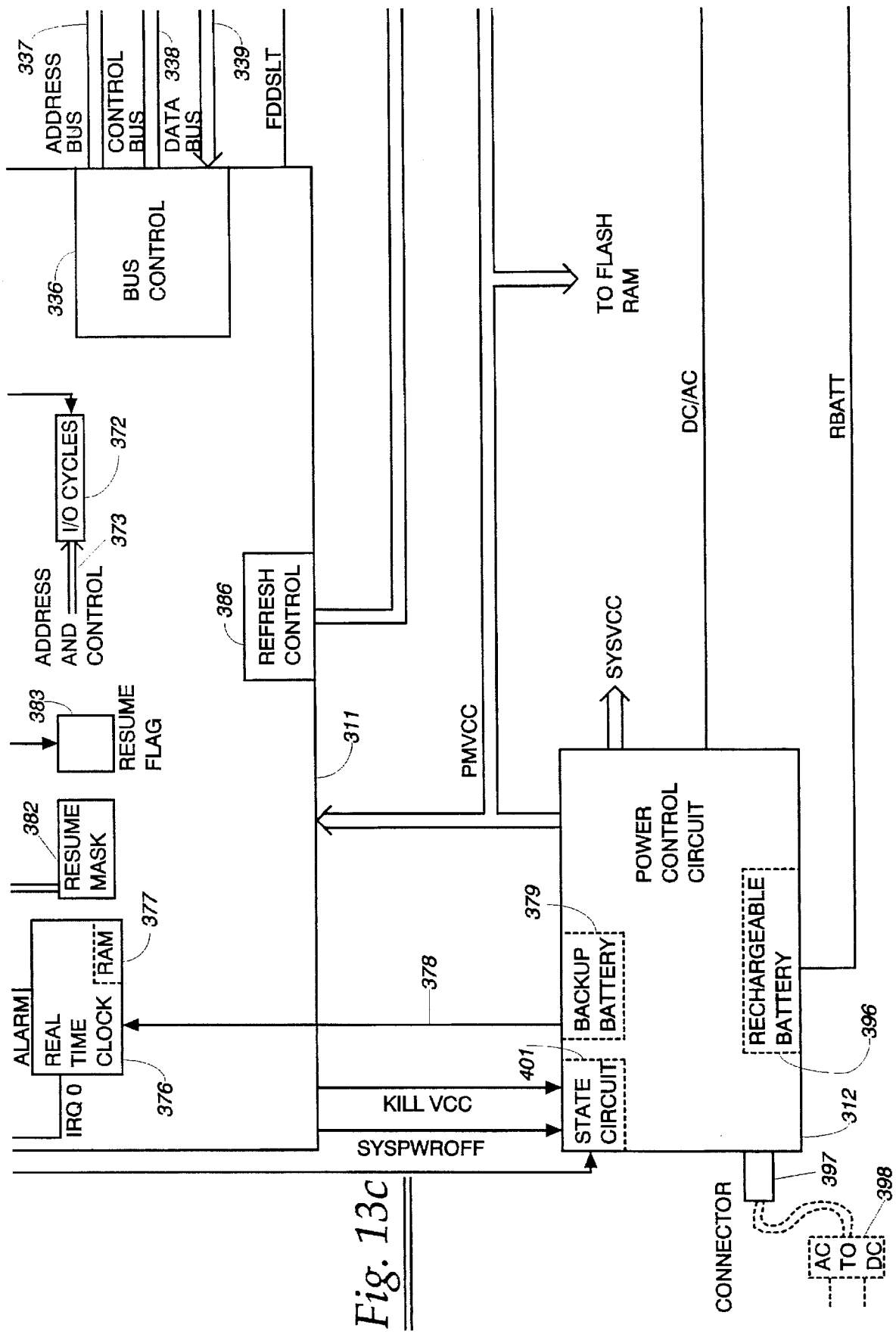
Figure 13D:
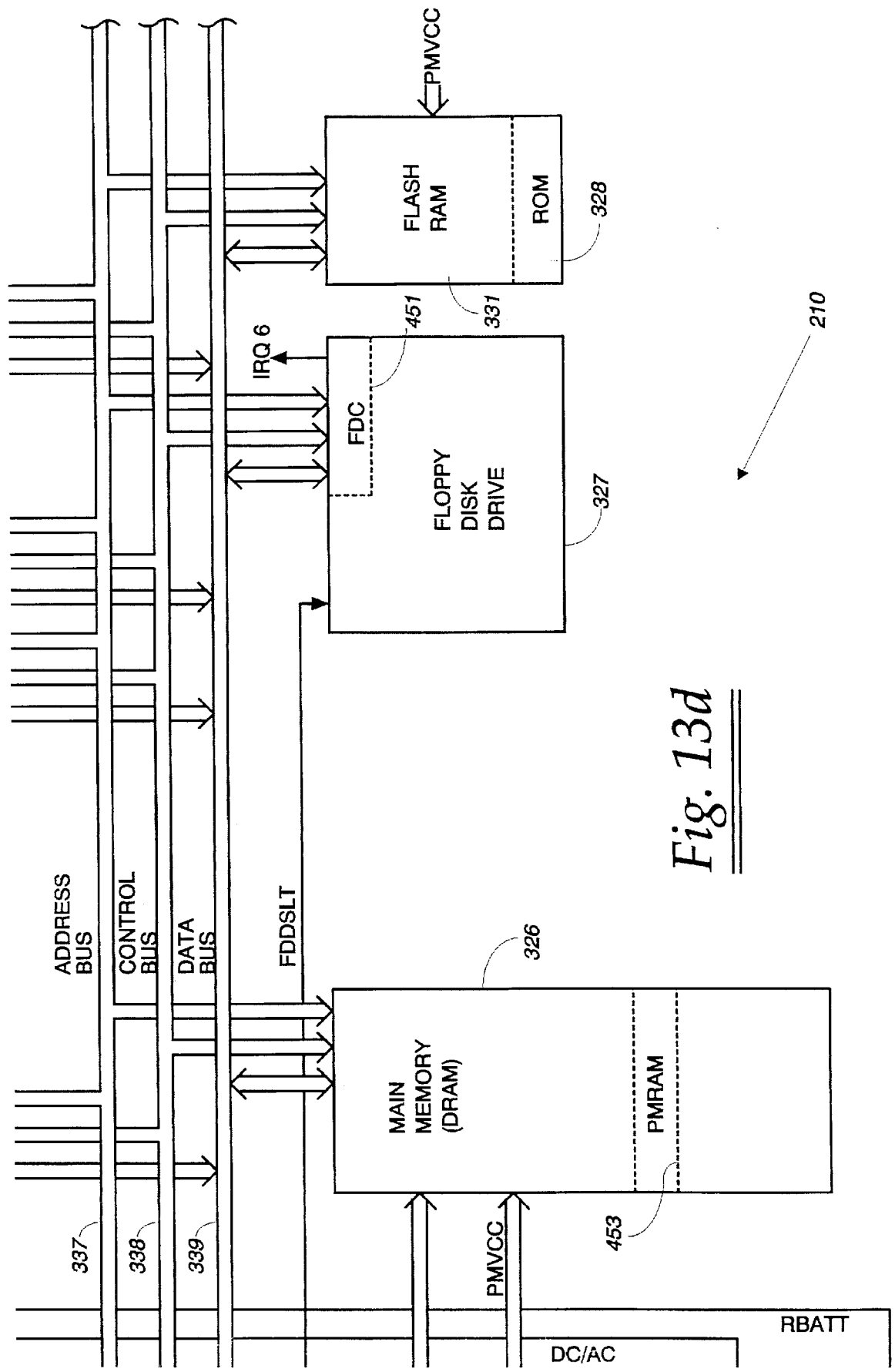

When power is subsequently turned back on, the power-up reset at 26 will cause the control unit 51 to execute a program instruction at a predetermined location in the main memory 12, which is the first instruction of a routine shown in FIG. 12. In this routine, the processor carries out any necessary initialization functions at 246, and then at 247 checks the suspend bit 179 in the memory 12. If the suspend bit is not set, then at 248 it transfers control to the operating system in the usual manner, after which the operating system will typically allow a user to manually select, load and start a desired application program. On the other hand, if it is determined at block 247 that the suspend bit 179 in memory 12 is set, then control proceeds to block 251, where the suspend bit 179 is cleared. Then, at block 252, the RESTORE instruction is executed so that the saved register and flag status is loaded from the portion 169 of memory 12 into the respective registers and flags of the section 31 of processor 221. Since this includes restoration of the value in the instruction pointer, the next instruction fetched will be the next instruction which the application program interrupted by the RSS interrupt and power-down would have executed if it had not been interrupted. The application program thus continues running from the point at which it was interrupted, as though it had not been interrupted and power had not been turned off and turned back on.

FIGS. 13a–13b and 13c–d are a block diagram of a "note-book" type laptop computer system 310 which embodies features of the present invention. These figures are referred to collectively as FIG. 13. The computer system 310 includes a main processor 311, a power control circuit 312, a manually operable power control switch 313, a system control processor (SCP) 316, an internal keyboard 317, a video controller circuit 318, a monochrome liquid crystal display (LCD) unit 321, a modem 322, a hard disk drive (HDD) 323, a main memory 326 implemented with dynamic random access memory (DRAM) chips, a floppy disk drive (FDD) 327, a read only memory (ROM) 328, and a flash RAM 331.

A microprocessor suitable for use in the system 310 of FIG. 13 is the Intel 386-SL, which implements the features of the invention discussed above in association with FIGS. 4a–4b, 5–6, 7a–7b, 8, 9a–9b and 10–12 which was developed by Intel Corporation of Santa Clara, Calif. under a license from the Assignee of the present invention, and which was first disclosed to the industry within the past few months. It will be recognized that other functionally equivalent microprocessors may be developed could also be used for the main processor 311. Since detailed information regarding the Intel 386-SL is available from Intel, the entire internal architecture thereof has not been shown and described in detail here. The processor 311 includes circuitry functionally equivalent to all of the circuitry shown in FIGS. 9a–9b and in particular has an unrestricted mode and at least one restricted mode. In FIG. 13, only features which are important to an understanding of the present invention are depicted and described.

More specifically, the processor 311 includes a bus control circuit 336, which controls an address bus 337, a control bus 338 and a bidirectional data bus 339 coupling the processor 311 to other major component of the system. The processor 311 also includes an interrupt selector 341 having respective inputs to which are coupled six interrupt signals IRQ 0, 1, 6, 9, 12 and 14. An IRQ mask register 342 can be loaded by software with a mask having six bits which each correspond to a respective one of the six interrupt lines. When each mask bit is a binary "1", the selector 341 actuates its single INTR output line whenever the associated interrupt line is actuated, whereas if the mask bit is a binary "0", the selector 341 ignores the associated interrupt line.

A break event selector 346 and a system event selector 347 each have a plurality of inputs, and different signals are coupled to respective inputs of both of the selectors 346 and 347. These signals include the six IRQ interrupt signals, and the INTR signal from the interrupt selector 341. The other signals include a modem ring indicator signal MDMRI generated by the modem 322, a battery low warning signal BATTLOW generated by the SCP 316, a parity signal PARITY which can be controlled by a device such as the main memory 326 which carries out parity checking, an input/output (I/O) channel check signal IOCHCK which can be controlled by I/O devices, a non-maskable interrupt NMI which has a higher priority than the IRQ interrupt signals, the output signal SRBTN from the manual switch 313, and an AUTO SUSPEND signal which will be described in more detail later. Associated with each of the selectors 346 and 347 is a respective mask register 348 or 349 which is loaded by software, and each of the selectors 346 and 347 in the associated mask register 348 or 349 functions in a manner similar to that described above for the selector 341 and associated mask register 342. The break event selector 346 produces a BREAK EVENT output signal, and the system event selector 347 produces a SYSTEM EVENT output signal.

The processor 311 includes three hardware timers 351–353, in particular a local timer 351, a global timer 352, and a suspend timer 353. Associated with each timer is a respective preset register 356–358, which is controlled by software and can be set to enable or disable the associated timer. Further, each preset register includes a numerical value which defines the time interval which the associated timer is to measure. The SYSTEM EVENT signal is connected to each of the timers 352 and 353, and each time this signal is actuated it causes each of these timers which is enabled to restart the timing of its specified time interval. When a user is actively using the system, the SYSTEM EVENT signal will be actuated so frequently that the timers 352 and 353 will typically not be able to time out the full specified time interval. On the other hand, if the user walks away from the system for a period of time, the SYSTEM EVENT signal may remain deactuated for a long period of time, in which case the timers 352 and 353 may time out. When the timer 352 times out, it actuates an output signal GLOBAL STANDBY, and when the timer 353 times out it actuates the signal AUTO SUSPEND. Although the timer 353 is a hardware timer provided to time a suspend interval, in the preferred embodiment this hardware timer is kept disabled, and the suspend interval is timed by software in the SCP in a manner described in more detail later. The local timer 351 operates in a similar manner to the timers 352 and 353 and produces an output signal LOCAL STANDBY if it times out, but the signal used to restart the timer 351 is a different signal FDD TRAP, which is discussed below.

The processor 311 includes an I/O trap logic circuit 361 which receives address and control information at 363 from the bus control unit 336, and which is controlled by an I/O trap control register 362. The register 362 is set by software and, in the preferred embodiment, defines a range of I/O addresses assigned to control registers in the floppy disk drive 327, and the I/O address assigned to the system event mask register 349. Whenever the I/O trap logic 361 detects that one of these addresses is being accessed, it actuates its FDD TRAP output signal if the floppy drive is being accessed and its MASK TRAP signal if the mask register is being accessed, the FDD TRAP signal having the effect of restarting the local timer 351, as mentioned above.

The BATTLOW signal, the FDD TRAP signal, the MASK TRAP signal, the LOCAL STANDBY signal, the GLOBAL STANDBY signal, the AUTO SUSPEND signal and the SRBTN signal are all connected to respective inputs of an OR gate 366. A further input of the gate 366 is connected to an external power management interrupt signal EXTPMI from the SCP 316, and another input is connected at 367 to a power management interrupt signal which can be selectively actuated by software. A flip-flop 368 disables the output of the gate 366 when it is set, and can be controlled by software. When any one of the inputs to the gate 366 is actuated, the gate 366 generates at its output a power management interrupt signal PMI, which is functionally comparable to the RSS interrupt discussed above in association with FIGS. 4a–4b, 5–6, 7a–7b, 8, 9a–9b and 10–12.

In response to actuation of the PMI signal, the PMI enable flip-flop is automatically set, and a status register 371 is automatically loaded with an image of the logical states of the inputs to the gate 366, so that software can subsequently examine the register 371 and identify one or more of the inputs to gate 366 which were responsible for generating the PMI interrupt signal. In addition, a circuit 372 receives address and control information at 373 from the bus control unit 336, and is effectively a first-in/first-out (FIFO) memory which stores the last several I/O bus cycles performed by bus control 336. In response to actuation of the PMI signal, the circuit 372 stops storing this information, and thus contains a static indication of the most recent I/O cycles.

The processor 311 also includes a real time clock (RTC) circuit 376, which includes a small amount of RAM 337 which is accessible to software. The RAM 337 contains the date, the time-of-day, and a certain amount of system configuration information. When the computer system 310 is completely turned off, the real time clock circuit 376 nevertheless receives a small amount of power at 378 from a back-up battery 379 in the power control circuit 312, so that the real time clock circuit 376 can keep the date and time information in RAM 337 accurate. The interrupt signal IRQ0 is generated by the real time clock circuit 376, and in particular is actuated in a periodic manner, so that an operating system or application program which maintains its own time or date can keep that time and date updated. The real time clock circuit 376 can also be programmed by software to actuate an ALARM output at a specified date and time.

The ALARM signal is connected to one input of a resume selector 381, the other three inputs of which are connected to the SRBTN signal from manual switch 313, the BATT-LOW signal from SCP 316, and the modem ring indicator signal MDMRI from the modem 332. A resume mask register 382 which can be set by software is used to selectively mask the ALARM signal, the MDMRI signal, or the BATTLOW signal. It is not possible for the mask register 382 to directly mask the SRBTN signal from the switch 313. However, if the BATTLOW signal is actuated and is not masked by the mask register 382, it will mask all three of the signals SRBTN, ALARM and MDMRI. Summarizing, if the BATTLOW signal is masked or is not masked but is deactuated, the selector 381 will produce a RESUME RESET signal at its output in response to actuation of the signal SRBTN, and also in response to actuation of either of the signals ALARM and MDMRI when not masked by the register 382. The RESUME RESET signal is a special reset of the processor 311, which will be discussed again later. The processor 311 includes a hardware resume flag 383, which is forcibly set by the RESUME RESET signal and is forcibly cleared by other types of reset signals. The RESUME flag 383 can be tested and cleared by software.

The processor 311 also includes a refresh control circuit 386, which controls the refresh of the DRAM chips in the main memory 326. The refresh control circuit 386 can be set to refresh the memory chips at different rates, the power consumption of DRAM chips being lower for lower refresh rates than for higher refresh rates.

The processor 311 also includes a clock generation circuit 387 which generates a CPU clock signal, and a keyboard clock signal KBCLK which is supplied to an interrupt input of the SCP 316. A speed control register 388 can be set by software to select one of a range of frequencies for the CPU clock signal, or to completely stop the CPU clock signal. Power consumption within the processor 311 is dependent on its clock speed, and in particular is lower for lower clock speeds.

The processor 311 outputs a signal 391 which is connected to a conventional piezo speaker 392 and, when actuated, can cause the speaker 392 to beep. In addition, the processor generates a signal CPUSUREQ which is connected to the SCP and is described in more detail later. Further, the processor generates two signals FDDSLT and HDDSLT which, when deactuated, turn off or at least reduce power to the floppy disk drive 327 and hard disk drive 323.

respectively. The processor also generates two control signals SYSPWROFF and KILLVCC which are connected to the power control circuit 312 and are described in more detail below.

As mentioned above, the power control circuit 312 includes a back-up battery 379. In addition, the power control circuit 312 has a rechargeable battery 396, and has a connector 397 to which can be releasably connected a conventional external AC to DC convertor 398 adapted to be plugged in to a standard wall socket. When the convertor 398 is present and supplying power to the power control circuit 312, the power from the convertor 98 is used by the circuit 312 to provide power needed throughout the entire system 310, and to simultaneously recharge the rechargeable battery 396. When no convertor 398 is connected to the connector 397, power required throughout the system 310 when the system is on is drawn from the rechargeable battery 396. In the event no convertor 398 is present and the rechargeable battery 396 either becomes discharged or is removed for replacement, the back-up battery 379 is used to supply enough power to maintain the system in at least a low power mode.

Figure 14:
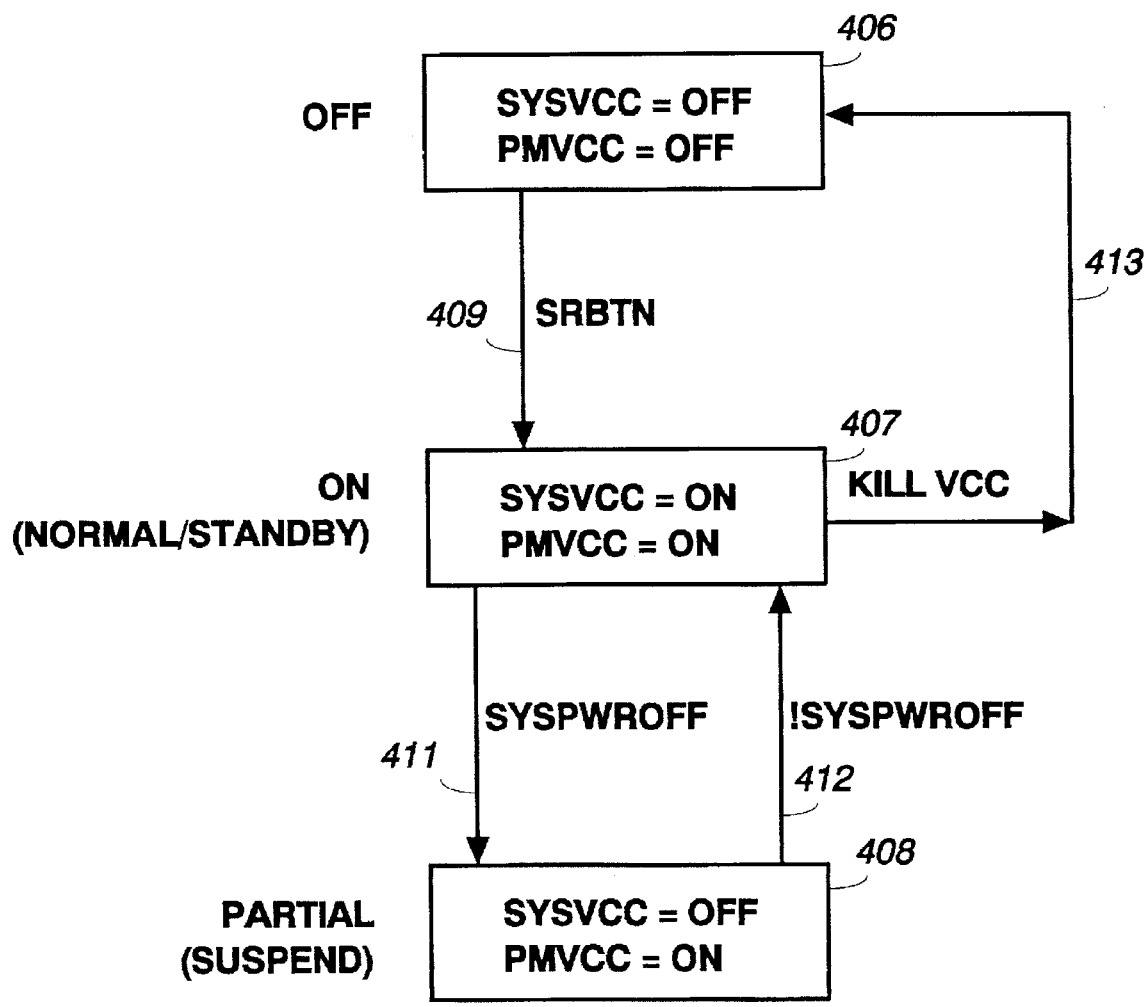
FIG. 14 is a state diagram for a state machine which is a comet of the system of FIG. 13.

The power control circuit 312 has a power output PMVCC on which it supplies power to the processor 311, main memory 326, and flash RAM 331, and has a power output SYSVCC on which it supplies power to other system components. The supply of power to these two power outputs is controlled by a state circuit 401. FIG. 14 is a state diagram showing the basic operation of the state circuit 401 of the power control circuit 312. The state diagram includes three states 406–408. The state 406 represents a situation where the computer system 310 of FIG. 13 is entirely off. In this state, SYSVCC and PMVCC are both off, and only the real time clock circuit 376 in the processor 311 and the state circuit 401 in the power control circuit 312 are receiving power. The second state 407 corresponds to normal operational modes of the computer system 310, and also corresponds generally to a global standby mode in which certain system components are placed in a low power mode and the processor 311 stops operating in order to conserve power, as described in more detail later. In this state SYSVCC and PMVCC are both on, the real time clock circuit drawing its power from PMVCC rather than from the battery 379. The third state 408 corresponds generally to a suspend mode of the type discussed above in association with FIGS. 4a–4b, 5–6, 7a–7b, 8, 9a–9b and 10–12. In state 408, the power output PMVCC is turned on, but the power output SYSVCC is turned off in order to conserve power.

Starting from a condition in which the system is off and the state circuit 401 is in state 406, when a user manually actuates the switch 313 in order to turn the system on, the state machine 401 proceeds at 409 to state 407, where it turns on both SYSVCC and PMVCC. If at some point in time the processor 311 intends to enter a suspend mode, it will actuate the signal SYSPWROFF to the state circuit 401, which will cause the state circuit 401 to transition at 411 to state 408, where it keeps PMVCC on but turns off SYSVCC. Since SYSVCC is used to supply power to virtually all components other than the processor 311, memory 326 and RAM 331, the power consumption of components normally powered by SYSVCC is reduced to zero. Meanwhile, PMVCC maintains the information in main memory 326 during the suspend mode, and also provides power to the processor 311 and RAM 331 so that it will be able to wake up from the suspend mode. When the processor 311 does wake up from the suspend mode, it deactuates the signal SYSPWROFF, so that the state machine 401 transitions from state 408 back to state 407 and turns the supply SYSVCC back on, thereby repowering the peripheral components of the system so that they can be used again. If it is determined at some point that the system is to be turned completely off, then the processor 311 ultimately actuates the signal KILLVCC to the state machine 401, which causes the state machine to transition at 413 from state 407 back to state 406, where it turns off both SYSVCC and PMVCC.

The power control circuit 312 produces a signal DC/AC to the system control processor (SCP) 316, to indicate whether the system is running on AC power from the convertor 398 or on DC power from battery 396 (or battery 397). The terminal voltage of rechargeable battery 396 is also supplied in the form of an analog signal RBATT to the SCP 316, so that the SCP 316 can monitor the state of the battery charge. In particular, the SCP 316 has an analog-to-digital (A/D) convertor 416, which converts the analog terminal voltage from battery 396 into a digital signal that can be analyzed by the SCP 316. When the SCP determines that the voltage is too low, it actuates the above-mentioned BATTLOW signal to the main processor 311.

Turning to the SCP 316, the SCP in the preferred embodiment is based on an Intel 87C51GB processor, but it will be recognized that there are other commercially available processors which could be used for the SCP. The SCP generates a speaker control signal 417 which is connected to the speaker 392 and can be used to cause the speaker 392 to beep. In addition, the SCP generates the signals IRQ1 and IRQ12, which as mentioned above are connected to interrupt inputs of the main processor 311. Further, the SCP 316 is coupled to an external connector 418, to which can optionally be coupled a conventional external keyboard or mouse 421. The SCP 316 is also coupled at 422 to the internal keyboard 317. The SCP outputs to the video controller 318 a signal CRT/LCD, which indicates whether the video controller 318 should consider the active display unit to be the liquid crystal display unit 321 or a conventional external CRT 426 which can be optionally wired to a connector 427 coupled to the video controller 318. The SCP 316 sends the video controller 318 a signal VIDEN which, when disabled, causes the video controller 318 to turn itself off or to at least reduce its power consumption.

The SCP sends to the liquid crystal display unit 321 a signal LCDPWR, which turns on and off the power to the liquid crystal display in the unit 321. The display includes a backlight 431 which illuminates the liquid crystal display. The display unit 321 is provided on a lid of the laptop computer which, in a conventional manner, can be moved between positions covering and exposing the keys of the internal keyboard 317, and a lid switch 432 is provided to indicate whether the lid is open or closed. The SCP 316 generates a signal BLON which turns on and off the backlight 431 of the display unit 321, and receives from the lid switch 432 a signal LIDSW which indicates whether or not the switch is actuated and thus whether or not the lid is open or closed.

The SCP 316 also generates a signal MDMEN which causes a power control section of the modem 322 to shut off power to the modem 322, or to at least place the modem in a low power consumption state. The SCP 316 receives from the modem 322 the previously-mentioned modem ring indicator signal MDMRI, which is actuated when an incoming telephone call reaches the modem through a telephone jack 434 to which the mode 322 is coupled, the jack 434 of the system 310 being adapted to be optionally coupled to a standard telephone line 436.

The hard disk drive 323 produces an output signal LED which is used in a conventional manner to control a conventional and not-illustrated light emitting diode in order to provide the computer user with a visual indication of the activity of the hard disk drive. This LED signal is connected to the SCP and to one input of a two-input AND gate 438, the hard disk not busy output HDNB of which is connected to an input of an OR gate 433 and indicates that the hard disk is not busy. The other input of the gate 438 is coupled to an ENABLE output signal of the SCP 316, and thus the SCP can selectively enable and disable the gate 438. The SCP also produces an output signal at 435 which is connected to a second input of the OR gate 433, and the output of the OR gate 433 serves as the previously-mentioned EXTPMI signal to the main processor 311. The hard disk drive 323 also generates the interrupt signal IRQ14, which as mentioned above is coupled to the main processor 311.

The internal keyboard 317 includes a set of keys 441 which form a standard laptop computer keyboard, four light emitting diodes (LEDs) 442 which are visible to the system user and provide typical status information, and a controller circuit 443 which interfaces the keys 441 and LEDs 442 to the SCP 316.

The video controller 318 includes control registers 446, and a video RAM 448 which is coupled to the buses 337–339 and is a 128 KB memory arranged as 64K by 16 bits.

The SCP 316 includes an electrically programmable read only memory (EEPROM) 439, in which it stores configuration information, a password, an extended set-up information, as discussed in more detail later. Further, the SCP includes a ROM 437 which stores a program executed by the SCP, and a RAM 440 in which the SCP can store and retrieve information during system operation. The SCP also includes several I/O registers, which can be used to pass data between the main processor 311 and the SCP 316.

The flash RAM 331 is a conventional semiconductor device which can be electrically modified, but is not volatile and will retain the information stored in it when power to it is turned off. The flash RAM 331 is 128 KB, and contains the basic input/output system (BIOS) program, as well as factory configuration settings. The ROM 328 contains a program which is normally not used, but which can be used to control the system while the flash RAM 331 is reloaded in the event an unusual circumstance causes the contents of the flash RAM to be lost.

The conventional floppy disk drive 327 includes a floppy disk controller (FDC) circuit 451, which controls the floppy disk drive and can also generate the interrupt signal IRQ6 to the processor 311.

The main memory 326 includes a portion PMRAM 453, which is functionally equivalent to the portion 169 of memory 12 in FIGS. 9a–9b. The bus control unit 336 of processor 311 automatically prevents software from accessing the PMRAM section 453 of the main memory 326, except in two specific situations. First, the service routine for the power management interrupt PMI is stored in the PMRAM section 463 of the main memory 326, and in response to a PMI the bus control unit 336 automatically permits access to the PMRAM 453 so that the state of the processor 311 can be stored there and so that the service routine there for the PMI can be executed. Second, software running in the unrestricted mode of the processor 311 can selectively enable and disable the capability to access to the PMRAM 453, so that the PMRAM can be initialized.

Figure 15:
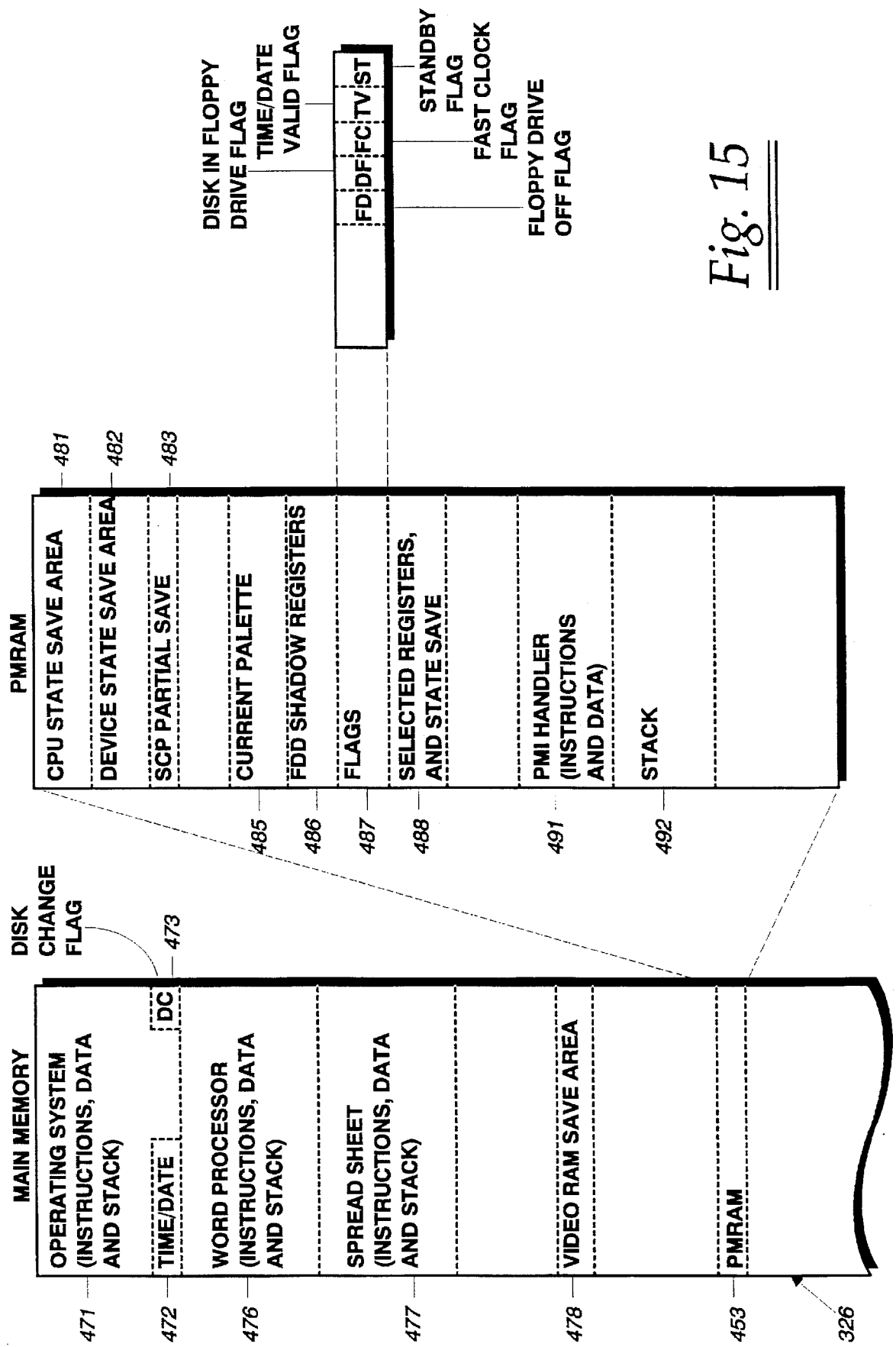
FIG. 15 is a diagram showing the organization of a main memory which is a component of the system of FIG. 13.

FIG. 15 is a diagrammatic representation of some of the information stored in the main memory 326. The organization of this information shown in FIG. 15 is exemplary, and it will be recognized that the format in which the information is stored could be reorganized without departing from the present invention. Further, there may be additional information which is stored in the main memory 326 but is not essential to an understanding of the present invention, and which is therefore not illustrated and described in detail.

A portion 471 of the main memory is used to store an operating system, for example Disk Operating System (DOS) available from Microsoft Corporation. The operating system maintains time and date information at 472, and also maintains a disk change (D/C) flag 473 which is used to indicate that a disk has been changed.

Two additional portions 476 and 477 in the main memory each contain a respective application program, the portion 476 containing the stack, instructions and data for a word processor, and the portion 477 containing the stack, instructions and data for a spreadsheet. A further portion 478 of the main memory is used to store an image of the video RAM 448, as will be described in more detail later.

The PMRAM portion 453 of the main memory includes a state save portion 481, where the processing unit 311 automatically saves its state in response to a PMI interrupt. A further portion 482 is used to save information regarding other devices, and a portion 483 is used for a partial state save of the SCP 316 which will be discussed later. A portion 485 is used to record the current palette being used for the LCD 321, as will be described later, and a portion 486 serves as shadow registers which are used to maintain an image of all control registers within the floppy disk drive 327, as also described later. A byte 47 is used for several one-bit flags, including a fast clock (FC) flag which is set to indicate that the user has selected a fast clock speed for the processor 311, a floppy off (FO) flag which is set to indicate that the power to the floppy disk drive is off, a disk in floppy drive (DF) flag which can be set to indicate that a disk is present in the floppy disk drive, a time/date valid TV flag which is set if the current operating system supports time and date information, and a standby (ST) flag which is set under certain circumstances to indicate to the processor whether it is to enter standby mode or suspend mode when a particular event occurs.

The software routine which handles the power management interrupt (PMI) is also stored in the PMRAM portion 453 of the main memory 326, as shown at 491 in FIG. 15. A portion 492 of the PMRAM serves as a stack area for use by the PMI handler routine. FIGS. 16–26 are flowcharts showing the operation of the PMI handler routine and a reset handler routine.

Figure 16A:
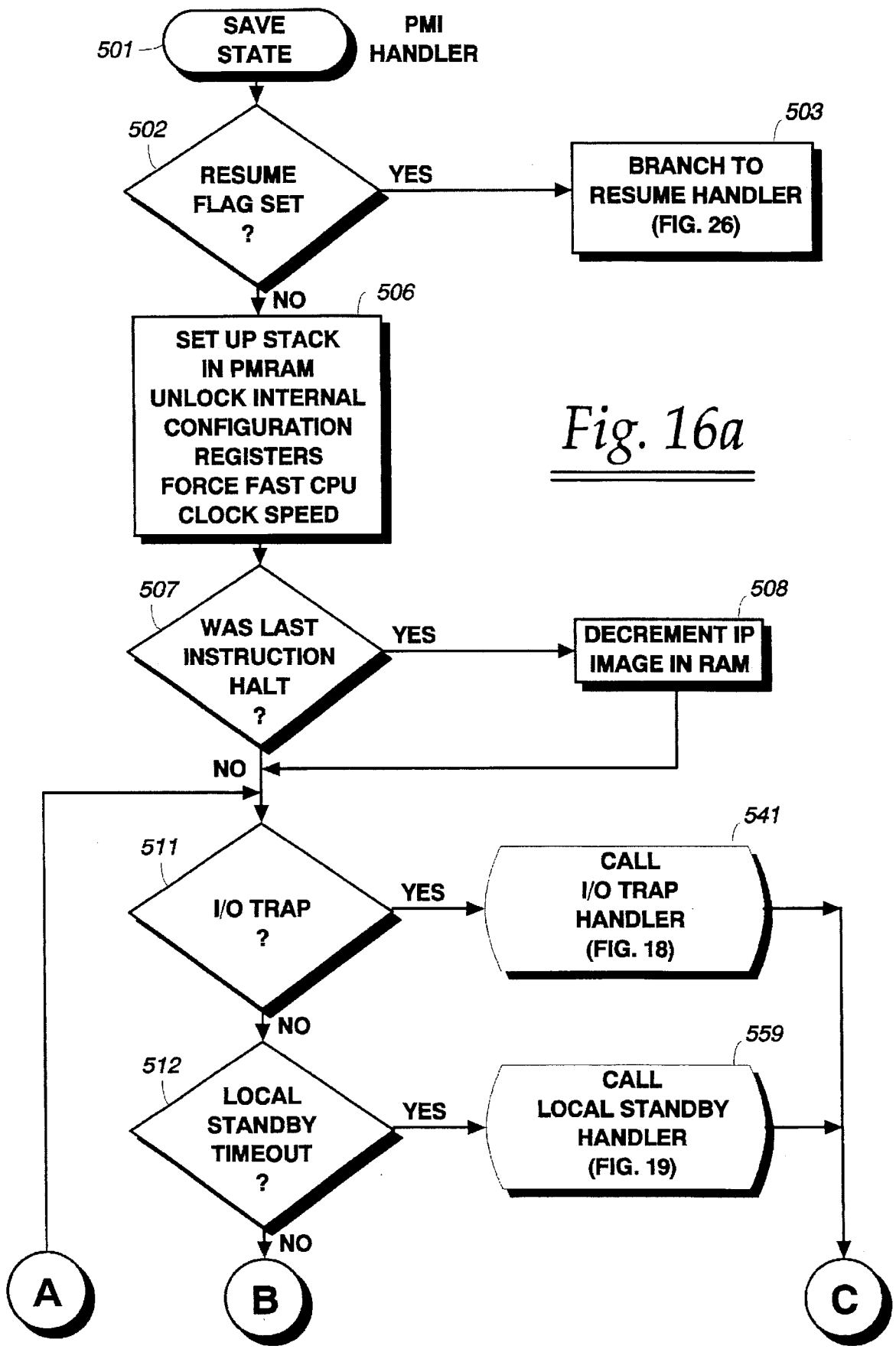
FIGS. 16a–16c, 17–19, 20a–20d, 21–22, 23a–23b, 24a–24b, 25a–25b and 26a–26c are flowcharts showing respective portions of a program executed by a main processor of the computer system of FIG. 13.
Figure 16B:
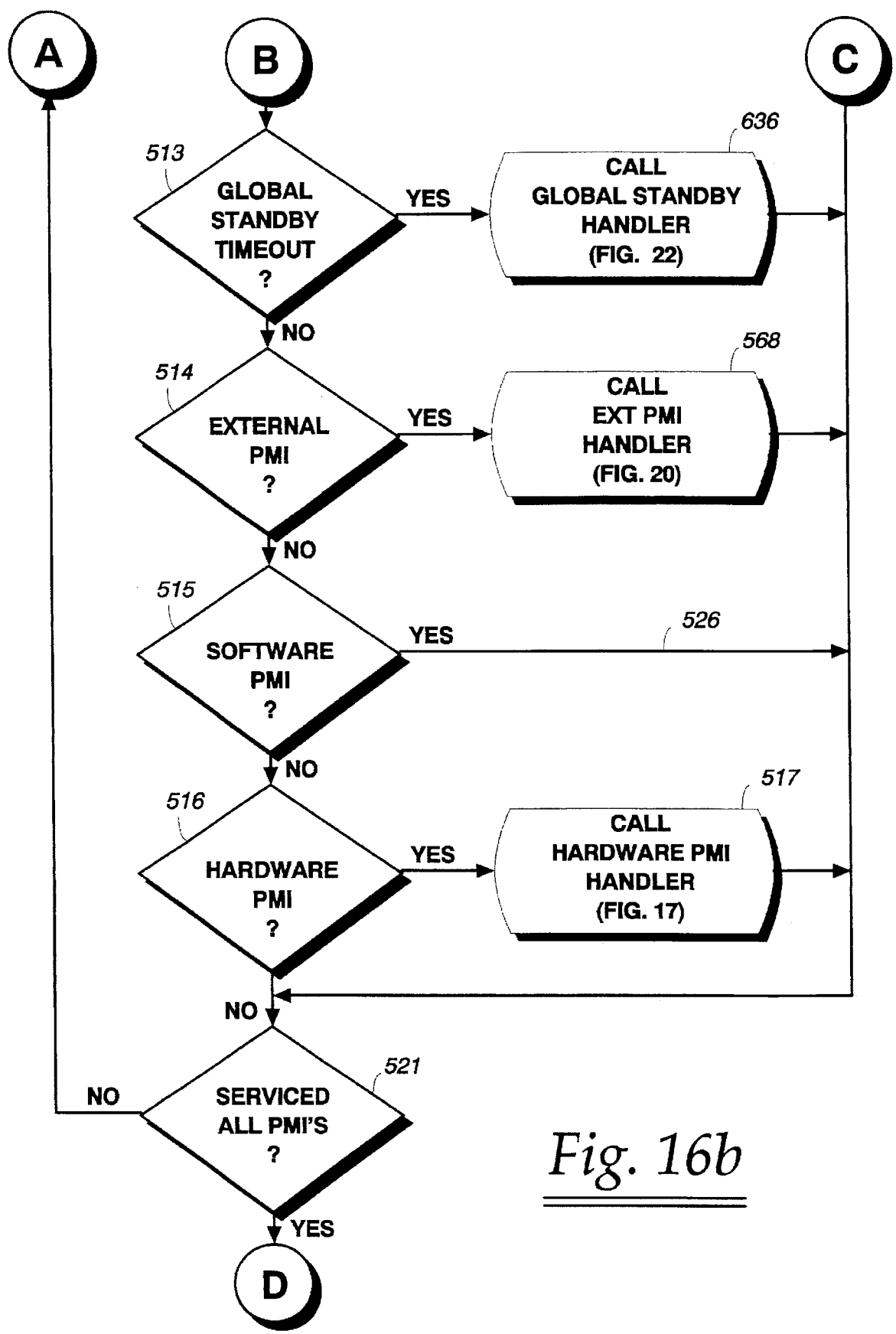
Figure 16C:
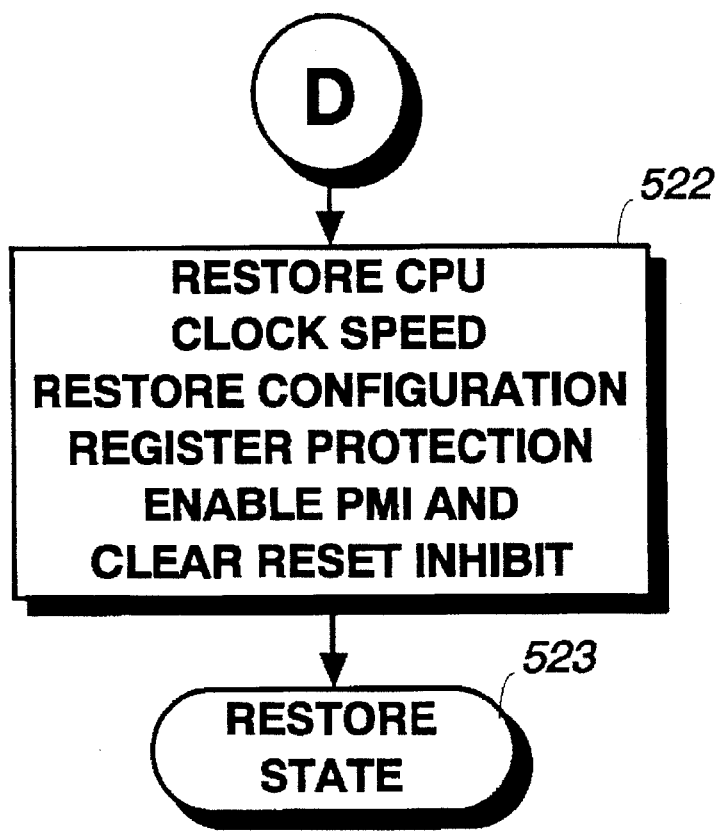

Beginning with FIGS. 16a–16c, a PMI from any source causes the hardware of the processor 311 to automatically save its state in the state save area 481 of the PMRAM portion 453 of the main memory, as shown diagrammatically at 501 in FIGS. 16a–16c. Then, the processor 311 automatically begins execution of the PMI handler routine 491 in the PMRAM at a predetermined point, which is shown at 502 in FIG. 16. Regardless of the source of the PMI, the first thing the PMI handler does is to check the resume flag 383 (FIG. 13) in the processor 311 in order to see whether the processor 311 is in the process of resuming from a suspend state. If a resume is in progress, then at block 503 control is transferred to a resume handler, which will be discussed later.

In the case of any other PMI, control proceeds to block 506, where the processor sets itself up to use the stack 492 in the PMRAM, because the PMI handler routine must always be capable of proper operation, and has no way of knowing whether the current stack in the interrupted application program is a valid and usable stack. Then, the processor 311 unlocks certain internal configuration registers so that they can be altered, such as the control register 388 which can be used to change the speed of the CPU clock. Then, the processor changes the register 388 in order to force the CPU to run at a fast clock speed, so that the PMI routine will execute as fast as possible.

Control then proceeds to block 507, where the processor checks to see whether the last instruction executed before the PMI was a HALT instruction. If it was, then the image of the instruction pointer register saved at 481 in the PMRAM is decremented at 508, so that when the PMI handler is exited the instruction which is fetched and executed is the HALT instruction rather than the instruction which follows the HALT instruction, in order to be certain that the processor again enters the HALT mode. Then, control proceeds to block 511, where the processor begins a successive check of the six possible sources of a PMI, as represented by the six blocks 511–516. Each of these will be discussed in more detail in a moment.

After detecting and servicing the source of the PMI, control proceeds to block 521, where the processor checks to see whether one or more other sources of the PMI are pending. If so, control returns to block 511, so that the processor can again scan for the particular source of each PMI, and service it. When it is determined at block 521 that every pending PMI has been serviced, control proceeds to block 522, where the processor restores the speed control register 388 to select the CPU clock speed which was in effect at the time the PMI occurred. The FC flag shown in FIG. 15 indicates to the processor whether this was a fast or slow clock speed. Then, the processor restores the protection level (if any) which was in effect for the internal configuration registers, including the speed control register 388. The processor can determine the level of protection which was in effect by examining the image of the CPU state which is present at 481 in the PMRAM. Then, the processor enables the PMI, and clears an internal bit automatically set within the processor 311 by the PMI to prevent the processor from responding to a reset during servicing of the PMI. Then, at 523, the processor executes an instruction which ends the PMI handler routine by restoring the internal state of the processor from the state save area 481, which of course causes the processor to resume execution of the interrupted application program.

As previously explained, a software instruction can generate a PMI as shown diagrammatically at 367 in FIG. 13, but in the preferred embodiment this capability is used only to reenter the PMI handler when the system is in the process of resuming from a suspend mode, and in that case control is routed from block 502 to block 503 as discussed above, and should never proceed to block 515. Consequently, a software PMI should not normally be detected at block 515 in FIGS. 16a–16c. Nevertheless, since it is possible that some other program may execute a software instruction which generates a software PMI, block 515 will intercept this condition, but transfers control at 526 directly to block 521, thereby handling the software PMI without doing anything at all.

Block 516 checks for a hardware PMI, the sole source of which in the preferred embodiment is the manual switch shown at 313 in FIG. 13. In particular, deactuation of this switch produces a PMI which is detected at block 516, and causes control to proceed to block 517, where a subroutine call is made to a hardware PMI handler routine, which is illustrated in FIG. 17.

Figure 17:
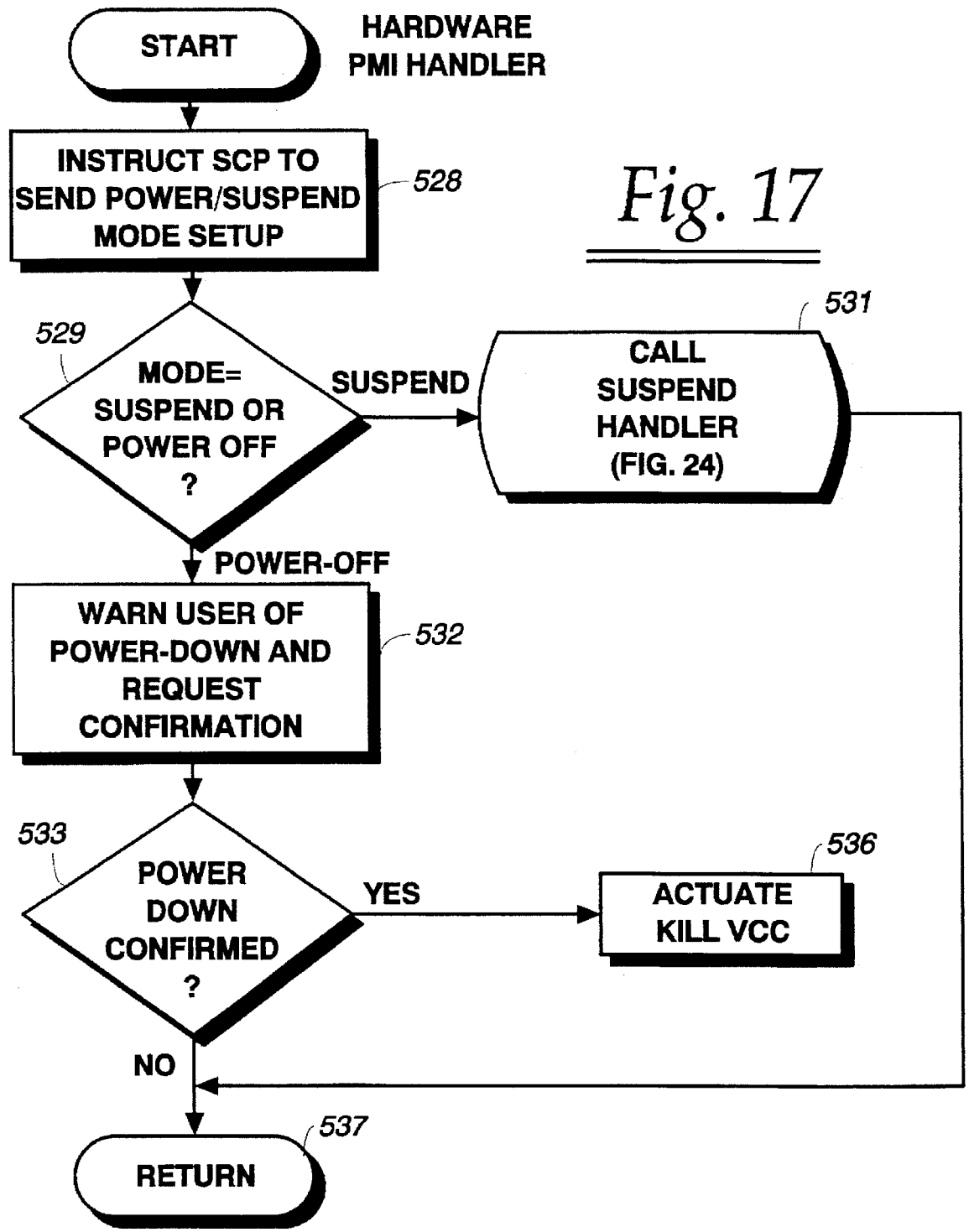

Referring to FIG. 17, the processor begins at 528 by instructing the SCP 316 to send it a portion of the set-up information stored in EEPROM 439, in particular a bit which can be set by the user as part of the system configuration, and which specifies whether deactuation of the switch 313 is to cause the system 310 to completely turn itself off, or to enter the suspend state in which it is capable of resuming the interrupted application program. Whenever the processor needs to send a command to the SCP while servicing a PMI instruction, it first actuates the CPUSUREQ signal to the SCP so that the SCP will stop sending information to the processor and thus the interface will be clear. Once the command is accepted, the processor may deactuate the CPUSUREQ signal. Control proceeds to block 529, where the processor checks the information received back from the SCP. If the user has specified that deactuation of the switch 313 is to place the system in suspend mode, the system proceeds to block 531, where it calls a suspend handler which will be described in detail later.

On the other hand, if the user has specified that in response to deactuation of the switch 313 the system is to be turned off, control proceeds from block 529 to block 532, where the processor 511 causes the video circuitry to display a warning which reminds the user that power will be turned completely off and requesting confirmation to proceed. This is because turning power off will cause the loss of everything in the main memory 326, and it is thus important to be certain that the user is not assuming that the system will be entering suspend mode, where this information would be maintained. The user response is checked at block 533, and if the user confirms that power is to be turned off then control proceeds to block 536 where the processor actuates the KILLVCC line so what the power control circuit 312 turns SYSVCC and PMVCC off in the manner described above in association with FIG. 14. On the other hand, if it is determined at block 533 from the user response that the user did not want the power turned off, then control proceeds to block 537, where a return is made from the hardware PMI handler without taking any action at all.

Referring again to FIGS. 16a–16c, if it is determined at 511 that the source of the PMI interrupt is an I/O trap condition, this means that one of the signals MASK TRAP or FDD TRAP shown in FIG. 13 has been actuated and created the PMI. Block 511 therefore transfers control to block 541, where a subroutine call is made to an I/O trap handler routine, which is shown in FIG. 18.

Figure 18:
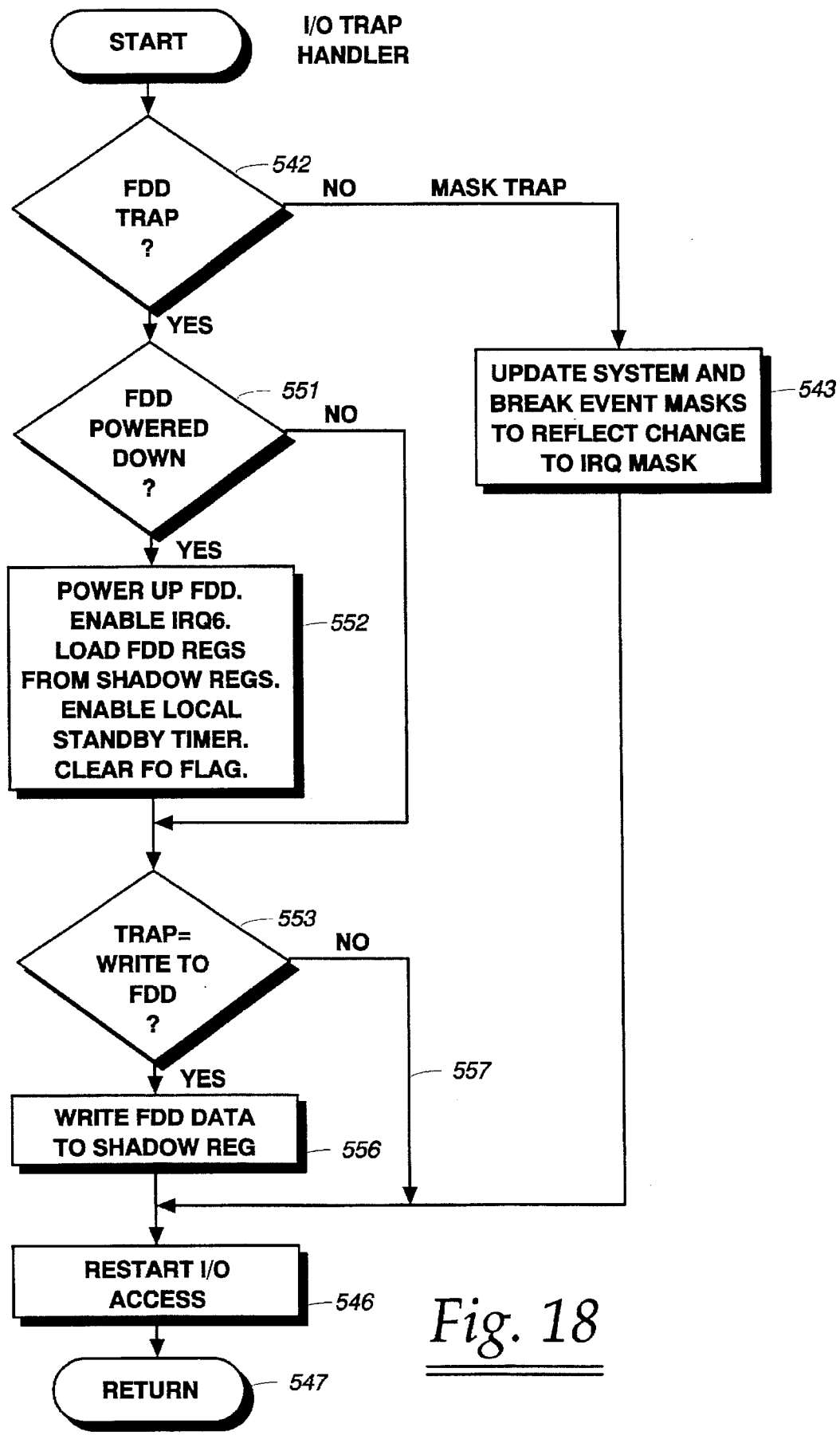

Referring to FIG. 18, this routine begins at block 542 by checking the status register 371 (FIG. 13) in order to determine whether the source of the interrupt was the FDD trap signal. If it was not, then it must have been the MASK TRAP signal, and control proceeds to block 543. The occurrence of the MASK TRAP signal means that the processor hardware has detected an access to the mask register 342 which controls the enabling and disabling of the various IRQ interrupt lines. If the purpose of the access to the MASK register 342 is to mask an IRQ interrupt, then at block 543 the system also updates the mask in system event mask register 349 to mask this IRQ interrupt. This avoids a system problem, because if the IRQ interrupt signal becomes actuated but is masked at 342, the normal interrupt servicing routine will not recognize the interrupt and thus the signal will remain actuated. If this IRQ interrupt is not masked at 349, then the continuously actuated signal will have the effect of preventing the SYSTEM EVENT line from changing, as a result of which the timers 352 and 353 will not be restarted and will time out even when the system is actually very active. Therefore, by conforming the mask register 349 to the mask register 342 at block 543, the disabled IRQ interrupt signal will be prevented from inhibiting the SYSTEM EVENT signal, and thus other active inputs to the selector 347 will be able to cause the SYSTEM EVENT signal to actively change in response to system activity so that the timers 352 and 353 are properly restarted by system activity.

After the processor sets the mask at block 543, control proceeds to block 546, where the processor restarts the I/O access to the mask register 342. In particular, the PMI trap interrupt intercepted the access to the mask register 342, and thus this mask register was not in fact actually changed. However, and as previously discussed, the I/O cycles which would have accessed this register have been captured at 372 (FIG. 13), and thus in block 546 the processor uses this information to restart the I/O access to register 342 so that it properly completes. Then, at block 547, control is returned to the main routine of FIGS. 16a–16c.

On the other hand, if it was determined at block 542 that the PMI was caused by the FDD TRAP signal, then control proceeds to block 551. This means that an I/O access to a control register of the floppy disk drive 327 has been intercepted. As will be described later, the system turns the floppy disk drive 327 off if a specified period of time elapses without any system access to the floppy disk drive. Thus, it is possible that the intercepted access to the floppy disk drive was an attempt to access the floppy drive while it does not have any power. Accordingly, at block 551, the processor checks the FO flag (FIG. 15) in order to determine whether the floppy disk drive is powered down. If it does have power, then block 552 is skipped. Otherwise, block 552 is entered in order to bring up the floppy disk drive.

In particular, the processor 11 actuates the FDDSLT line to restore normal power to the floppy disk drive 327, and enables interrupt IRQ 6 which is used by the floppy disk drive in a conventional manner during normal operation. Then, the processor loads control registers in the controller circuit 451 of the floppy disk drive 327 from the shadow registers 486 in the PMRAM. As will be described in a moment, the shadow registers contain an image of the internal state of the floppy disk drive just before its power was turned off. Then, the processor enables the local standby timer 351 (FIG. 13), which as described in more detail later as the timer used to monitor the length of time since the last access to the floppy disk drive so that a decision can be made as to when it should be powered down. Finally, the processor clears the FO flag (FIG. 15) to indicate that the floppy disk drive is currently up and running.

Control then proceeds from block 552 to block 553. As just mentioned, the shadow registers 486 (FIG. 15) are an image of the control registers in the floppy disk drive 451. Every time any program stores anything in these control registers, the same information must be stored in the shadow registers 486 so that the shadow registers contain an accurate image of the actual registers in the floppy disk drive. Thus, at block 553, the processor checks to see whether the intercepted I/O access to the control registers of the floppy drive constitute a write of information into a register, as opposed to a read of information from the register. If it is determined that control information is being written into the floppy disk drive, then at 554 the same information is written into the shadow register area 486. On the other hand, if data is being read from the floppy disk drive, then block 556 is skipped at 557. In either case, control ultimately proceeds to block 546, where the I/O access to the floppy drive is restarted as discussed above so that the hardware completes the interrupted I/O access. Then, at 547, control returns to the routine of FIG. 16a–16c.

Figure 19:
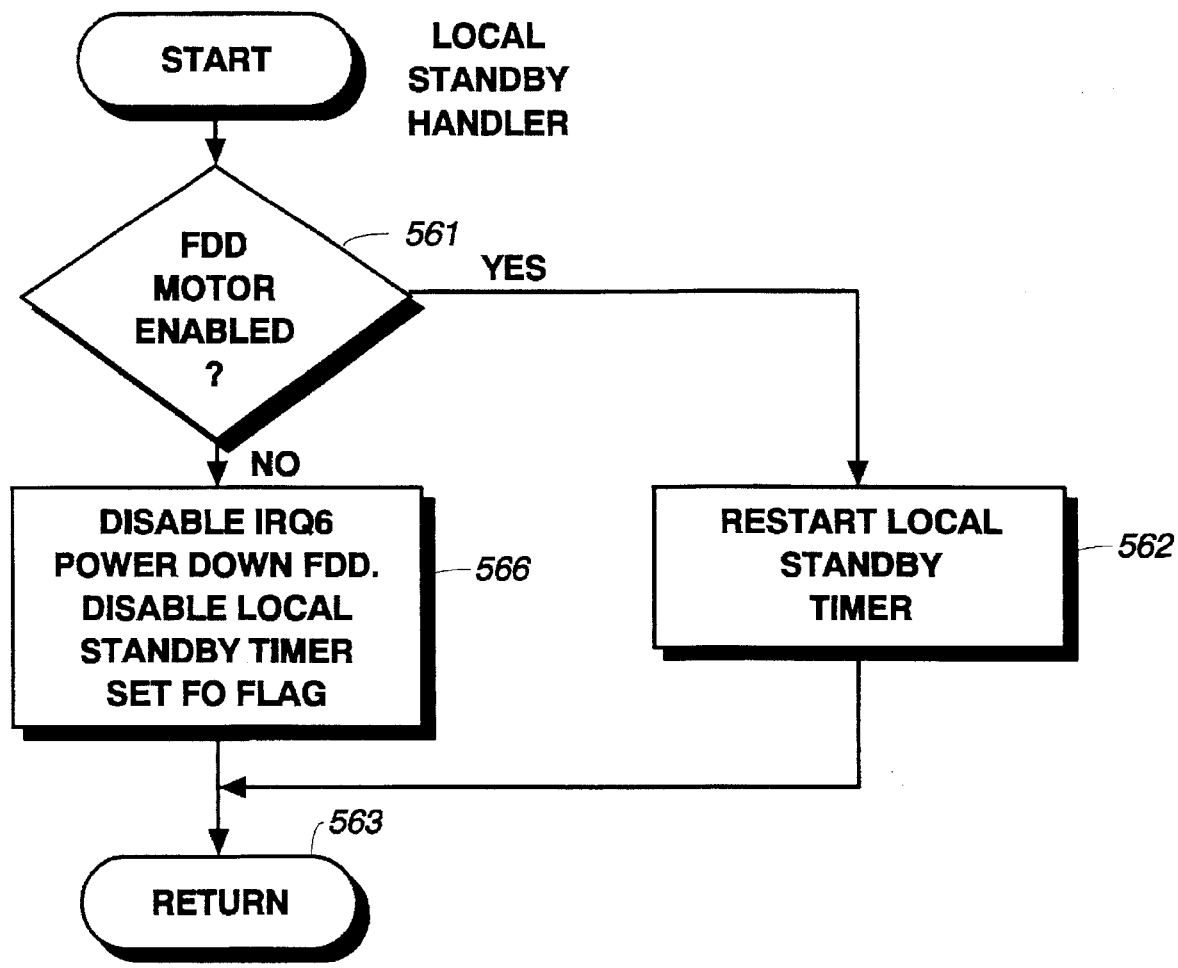

In FIGS. 16a–16c if it is determined at block 512 that the local standby timer 351 has expired, then control proceeds to block 559, where a subroutine call is made to a local standby handler routine, which is shown in FIG. 19. Referring to FIG. 19, the fact that the local standby timer has timed out is an indication that the floppy disk drive has not been accessed for a specified period of time and is thus probably not currently in use and can be turned off in order to conserve power. However, it is first important to make sure that the floppy disk drive motor is not running, because power should preferably not be shut off while the motor is running. Therefore, at block 561, the processor reads a register in the floppy disk drive 327, which in a conventional manner includes an indication of whether the motor is currently enabled. If it is, control proceeds to block 562, where the processor simply restarts the local standby timer 351 at 562 and then returns at 563 to the routine of FIG. 16. Typically, however, the motor will not be running, and control will thus usually proceed to block 566, where the floppy disk drive will be powered down in order to conserve power. In particular, the processor disables interrupt IRQ 6, which is used by the floppy drive, and then deactuates the FDDSLT signal so that the floppy disk drive turns itself off or at least enters a low power state. Then, the processor disables the local standby timer 351, and sets the FO flag (FIG. 15) in order to indicate that power to the floppy drive is currently off. Then, the processor returns at 563 to the calling routine shown in FIG. 16.

In FIGS. 16a–16c, it may be determined at block 514 that the source of the PMI was created by the SCP 316 using the line EXTPMI, in which case control proceeds to block 568, where a subroutine call is made to the EXTPMI handler routine shown in FIGS. 20a–20d. There are three possible reasons why the SCP may have initiated a PMI. Therefore, at 571 in FIG. 20, the processor begins by asking the SCP 316 to send a byte indicating which of the three conditions was the reason for the PMI. Upon the receipt of this byte, the processor proceeds to block 572, where it checks for the first of these conditions.

In order to discuss this first condition, it is important to understand that, if the system has attempted to enter either the global standby mode or the suspend mode, and if it found that the hard disk drive 323 was still busy, then as described in more detail below and in the previously-mentioned copending application, the SCP will actuate the ENABLE line to the gate 438, and then return to the interrupted application program. Then, the instant the hard disk drive 323 finishes what it is doing and deactuates the LED line which controls its light emitting diode, the gate 438 will actuate the HDNB line to gate 433 which in turn will actuate the EXTPMI line.

Consequently, at block 572, the processor 311 checks the information received from the SCP in order to see whether the reason for the PMI was the signal from the hard disk. If it was, then control proceeds to 573, where the processor checks the ST flag (FIG. 15) in order to determine whether it was previously attempting to enter suspend mode or global standby mode when it found that it had to wait for the hard disk. If the flag is not set because the system was attempting to enter the suspend mode, then control proceeds to block 576, where a subroutine call is made to the suspend handler routine, which will be described in more detail later. On the other hand, if it is determined at 573 that the system is attempting to enter global standby mode, then at 577 the processor instructs the hard disk 323 to spin down its motor, and control then proceeds to block 578 where a subroutine call is made to a routine which causes the processor to enter the global standby mode, as discussed in detail later. Upon termination of the suspend mode or the global standby mode, control proceeds from block 576 or 578 to block 579. Also, if it had been determined at block 572 that the source of the PMI was not a signal from the hard disk, then control would have proceeded at 581 directly to block 579.

In 579, the processor checks for the second condition which may have caused the SCP 316 to initiate the PMI. In particular, the SCP monitors the DC/AC signal from the power control circuit, which indicates whether the system is currently receiving DC power from the battery 396 or is receiving AC power from the converter 398. When the SCP detects that a change has been made from AC power to DC power, or from DC power to AC power, it actuates the EXTPMI signal to the main processor. If it is determined at block 579 that this is the reason for the PMI, then control proceeds to block 582. A feature of the system is that the SCP maintains configuration data for use under AC power which is different from the configuration information it maintains for use under DC power. For example, when operating on AC power, power consumption is less of a concern, and thus the user may elect to keep the floppy disk drive 327 powered up all the time when operating under AC power, and to allow the system to automatically power it down when not in use as described above only when operating under DC power. Accordingly, at block 582, the main processor instructs the SCP to send it appropriate configuration values, namely AC values if a switch has been made to AC mode and DC values if a switch has been made to DC mode. Then, the processor implements these values in the system configuration, for example by reloading the preset registers 356 and 357 with their AC preset values rather than their DC preset values. The processor sends two timer preset values back to the SCP for use in a suspend timer and a backlight timer maintained by the SCP, as described later. Control then proceeds to block 583. Control also proceeds directly from block 579 to block 583 if it is determined at block 579 that the source of the PMI was not a change between AC and DC power.

In block 583, the processor checks for the third of the conditions which would cause the SCP to initiate a PMI. In particular, some of the keys 441 of the internal keyboard 317 can be pressed simultaneously, and the SCP is capable of detecting these special multi-key or hot key combinations. When the processor detects one of several special multi-key combinations, it actuates the EXTPMI line to the main processor, so that any program in progress is immediately interrupted, a special function is carried out, and then the program in progress is resumed. If it is found at 583 that one of the special multi-key or hot key combinations has been pressed, control proceeds to block 586, which is the first in a sequence of eight blocks 586–593 checking for each of the special multi-key combinations which can cause the SCP to initiate a PMI. This information is in a coded field in the byte sent by the SCP at 571 to indicate the reason for the PMI.

In block 586, the processor checks to see if the multi-key or hot key combination was one which indicates that the user wants the CPU to run at a slow clock speed. In a situation where the user is operating on battery power and is running a program which does not require fast processor speed, intentionally reducing the processor speed will reduce power consumption and thus permit the user to operate the system longer before the battery requires recharging. Thus, in block 596, the processor actuates line 391 (FIG. 13) to cause the speaker 392 to beep once, and then clears the FC flag (FIG. 15) in order to indicate that the selected CPU speed is a slow speed. The processor does not immediately change the clock speed because, as mentioned above in association with blocks 506 and 522 in FIG. 16, the PMI handler routine always executes at a fast clock speed. The slower speed selected in block 596 by clearing the FC flag will be implemented in block 522 as the processor prepares to leave the PMI handler routine.

On the other hand, if the hot key is not a request for slow CPU operation, then control proceeds from block 586 to block 587, where a check is made to see if the hot key is a request for fast CPU operation. If it is, control proceeds to block 597, where the processor causes the speaker 392 to beep twice and then sets the FC flag in order to indicate that a fast processor speed is desired.

If it is determined in block 587 that the hot key is not a request for a fast processor speed, then control proceeds to block 588, where a check is made to see if the hot key is a request for a pop-up/set-up screen, which permits the user to change system set-up information in the middle of an application program. If this is the hot key pressed, then control proceeds to block 598, where a subroutine call is made to a pop-up/set-up handler routine. This handler routine will be described after the other hot keys shown in FIG. 20 have been described.

If the actuated hot key is not the pop-up/set-up key, then control proceeds to block 589, where a check is made to see if the hot key pressed is a user request that the system enter the global standby mode. A user might want to enter global standby mode when he knows that he will not be using the system for a short period of time and wants to conserve power but does not want to enter full suspend mode. If it is found that the user has requested intentional entry to global standby, then control proceeds from block 589 to block 601, where the processor reads a status register in the hard disk drive 323 in order to see if the hard disk drive 323 is busy. If the hard disk drive is not busy, then control proceeds directly to block 602, where a subroutine call is made to a routine which guides the system into standby mode, this routine being described in detail later.

On the other hand, if the hard disk is busy, then the entry to standby mode must wait until the hard disk is not busy. Therefore, control would proceed from block 601 to block 603, where the processor instructs the SCP to actuate the ENABLE signal in order to enable the gate 438, as previously mentioned. The processor also sets the ST flag (FIG. 15) in order to indicate that, when the hard disk is no longer busy, the system should enter global standby mode rather than suspend mode, in particular as already discussed above in association with block 572 of FIG. 20. Thus, after block 603, the PMI handler routine will continue and will eventually return control to the interrupted application program, and then when the hard disk drive 323 ultimately finishes what it is doing and deactuates its LED control line, a further PMI will be generated and will cause the system to eventually reach previously-described blocks 572, 573, 577 and 578 in order to enter the standby mode.

If it is determined at block 589 that the hot key pressed is not the request to intentionally enter the global standby mode, the processor proceeds to block 590, where a check is made to see if the hot key is a request by the user for a change in the palette used for the LCD 321 (FIG. 13). In this regard, the LCD 321 in the preferred embodiment is a monochrome display rather than a color display, and the flash RAM 331 contains 16 predefined palettes which represent respective variations of the gray scale capabilities of the monochrome LCD 321. Since most application programs are written to operate with color displays, the screens they produce can sometimes be somewhat difficult to read when presented on a monochrome display. However, the screens may be easier to read with some gray scale palettes than with others.

The present system permits a user to quickly run through an adjustment of palettes while within an application program, where he can immediately see the effect of each palette. In pre-existing systems, it was typically necessary to exit the application program, adjust the palette selection in the set-up data, and then re-enter the application program to see the effect of the new palette, which is obviously tedious and time consuming when there are several possible palettes which need to be tried. Thus, if it is determined at 590 that the user wants to shift down one palette in the table of 16 palettes, control is transferred to block 606, where the processor retrieves an identification of the current palette stored at 485 in the PMRAM, obtains the next lower palette from the table of 16 palettes in the flash RAM 331, configures the registers 446 of the video controller 318 to implement this new palette, and records an identification of this new palette at 485 in the PMRAM.

If it is determined at 590 that the hot key is not a request to shift down a palette, control proceeds to block 591 where a check is made to see if the request is to shift up one palette. If so, control proceeds to block 607, where the processor carries out a sequence similar to that in block 606 except that it shifts up one palette in the table rather than down one palette. If it is determined at block 591 that the actuated hot key is not a request to shift up a palette, then control proceeds to block 592, where a check is made to see if the hot key pressed is a request that the current display device be swapped, in particular from the LCD 321 to an external CRT 426 if the LCD is currently active, or from the external CRT to the LCD if the CRT is active. If the user has requested this change, then control proceeds from block 592 to block 608, where the processor instructs the SCP to identify the active video unit. The response from the SCP is examined at 609, and if the LCD is active control proceeds to block 610, where the processor instructs the SCP to deactuate the line LCDPWR to power down the LCD, and to set the CRT/LCD line to select the CRT. Then, the processor configures the video controller for operation with the CRT. On the other hand, if the CRT is found to be active at 609, then control proceeds to 614, where the processor configures the video controller for operation with the LCD, and then instructs the SCP to set the CRT/LCD line to select the LCD, and to actuate the LCDPWR line to power up the LCD.

If it is determined at block 592 that the actuated hot key is not a request for a display swap, then control proceeds to block 593, where a check is made to see if the hot key pressed is a request to temporarily lock up the system. If it is not, then control proceeds to block 611, which is the common return from the EXTPMI handler to the calling routine of FIG. 16. Otherwise, control proceeds from block 593 to block 612, where the processor 311 instructs the SCP 316 to send a system password which is stored in the EEPROM 439 of the SCP. Then, at block 613, the processor uses the display to ask the user to enter a password, waits for a line of information, and accepts the line of information entered by the user on the keyboard. Then, at block 616, the system compares the passwords from the user and the SCP, in order to see whether they are the same. If they are not, the system continues to loop through blocks 613 and 616. Otherwise, control proceeds from block 616 to the return at 611. By using this hot key, the user can essentially leave his system when it is up and running while preventing another from using it while he is gone, because the system will not respond unless the correct password is entered. When the user returns, he enters the correct password, and then can return to whatever he was doing.

Figure 20A:
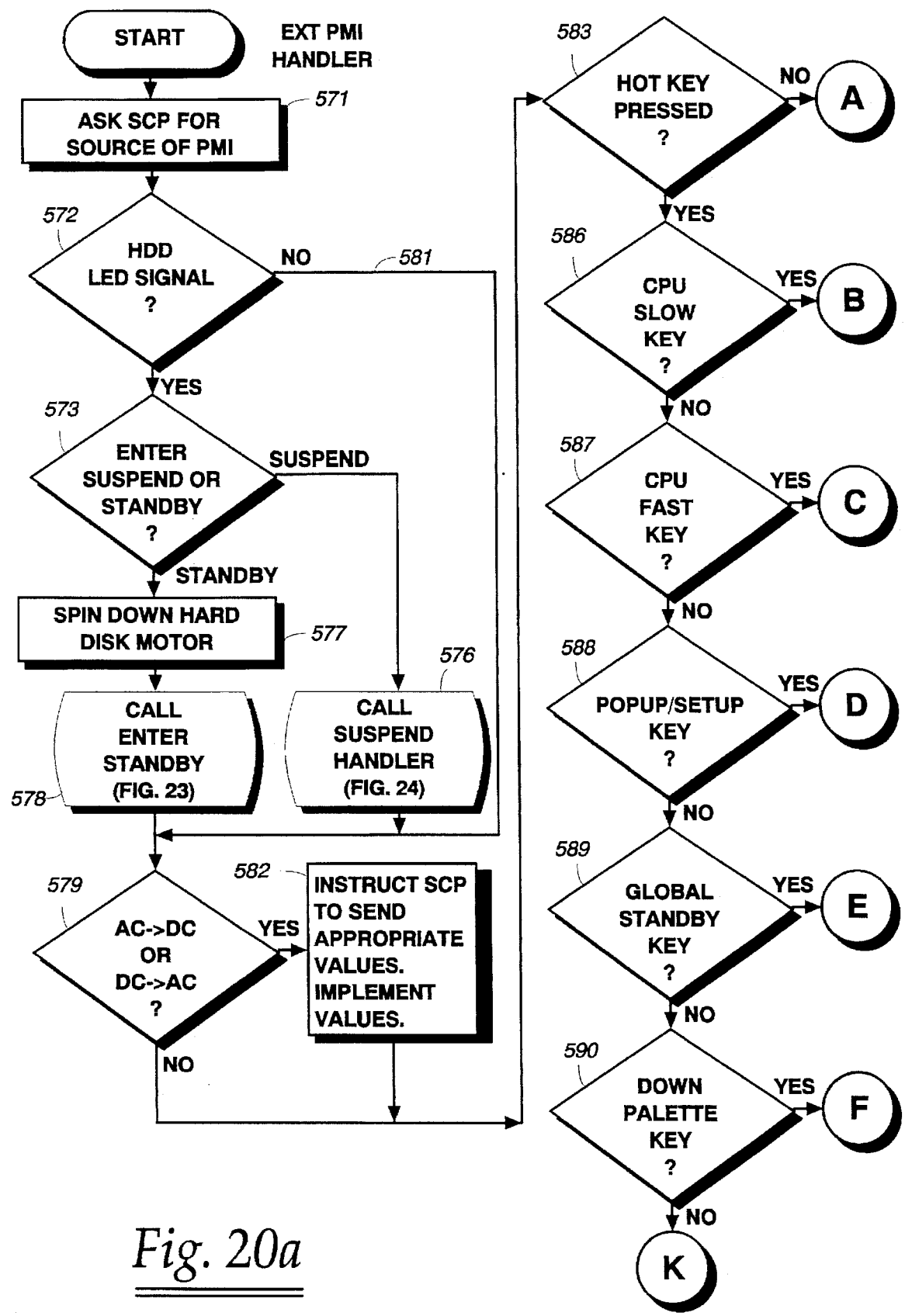
Figure 20B:
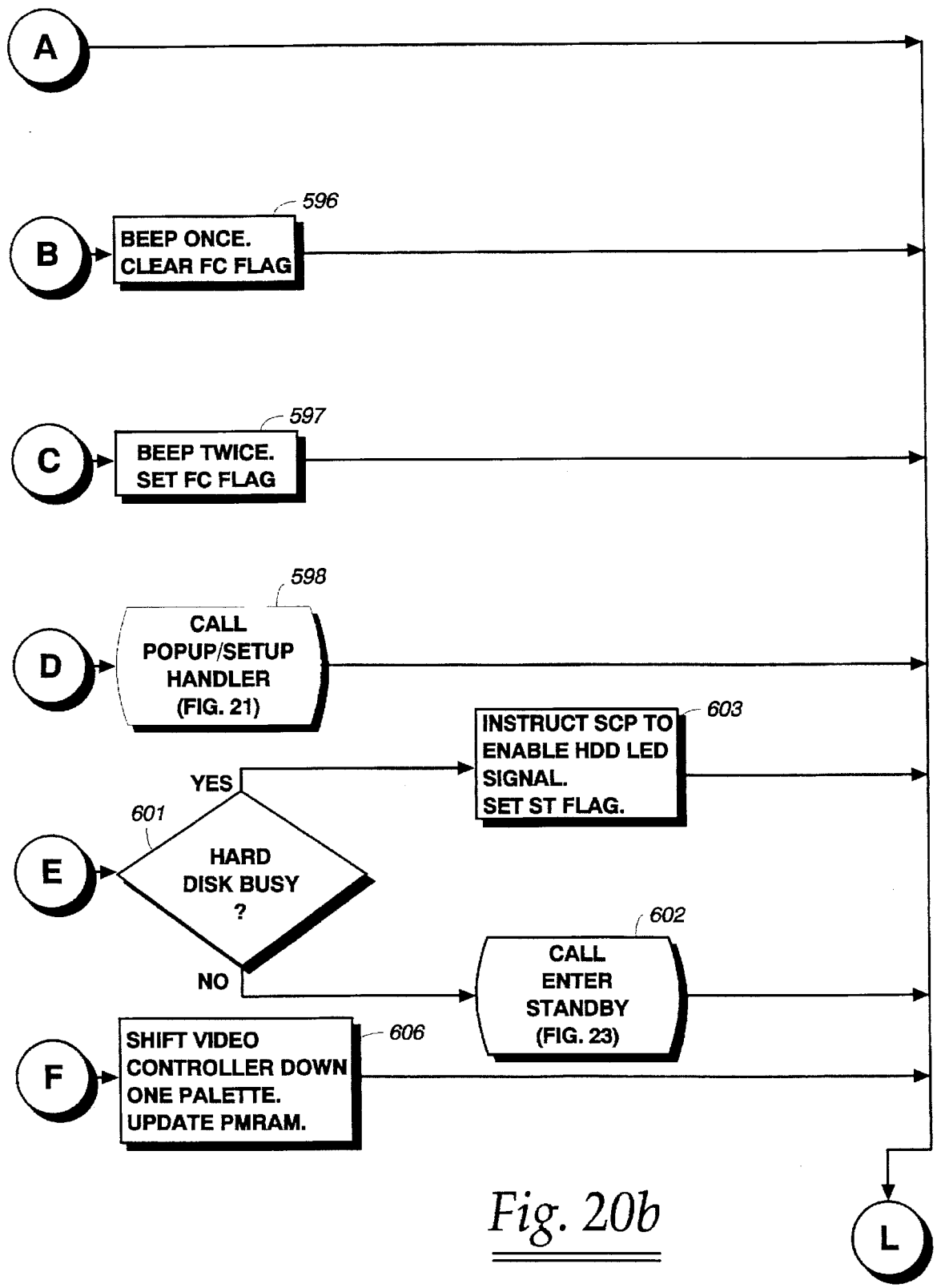
Figure 20C:
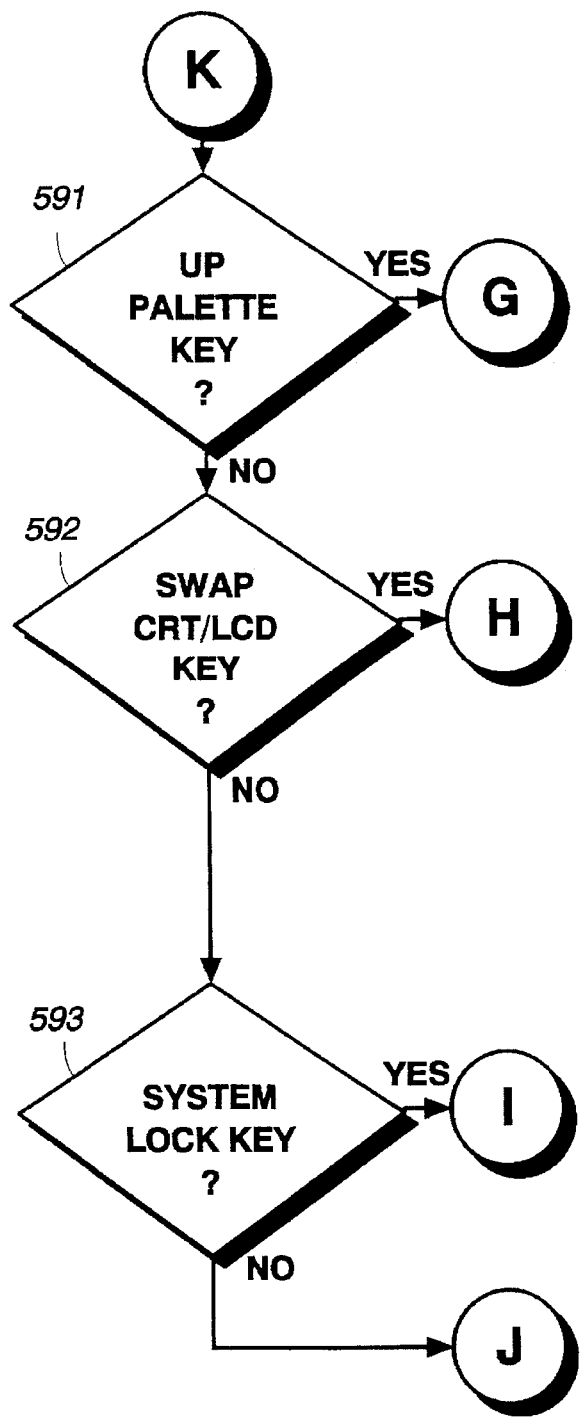
Figure 20D:
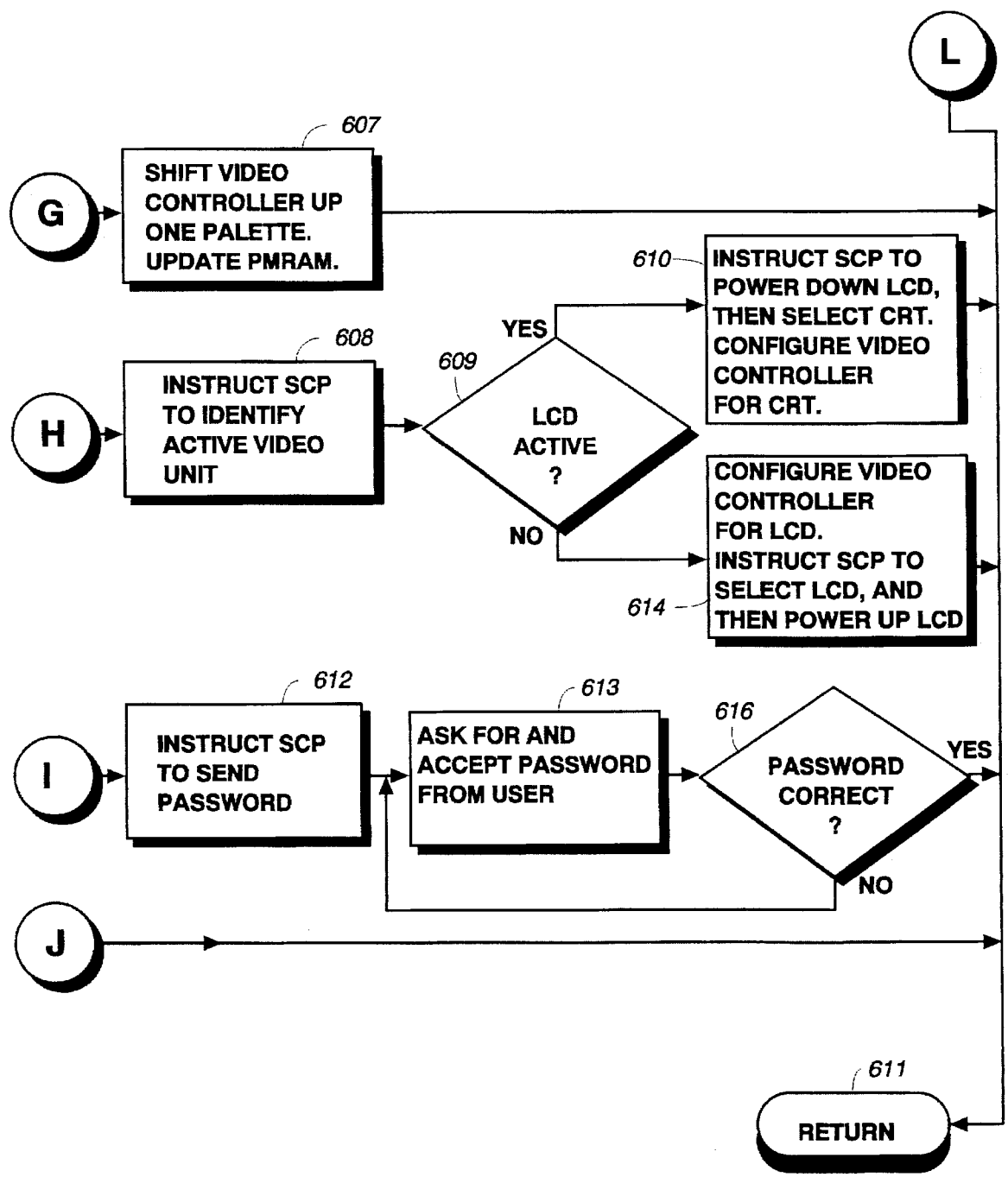
Figure 21:
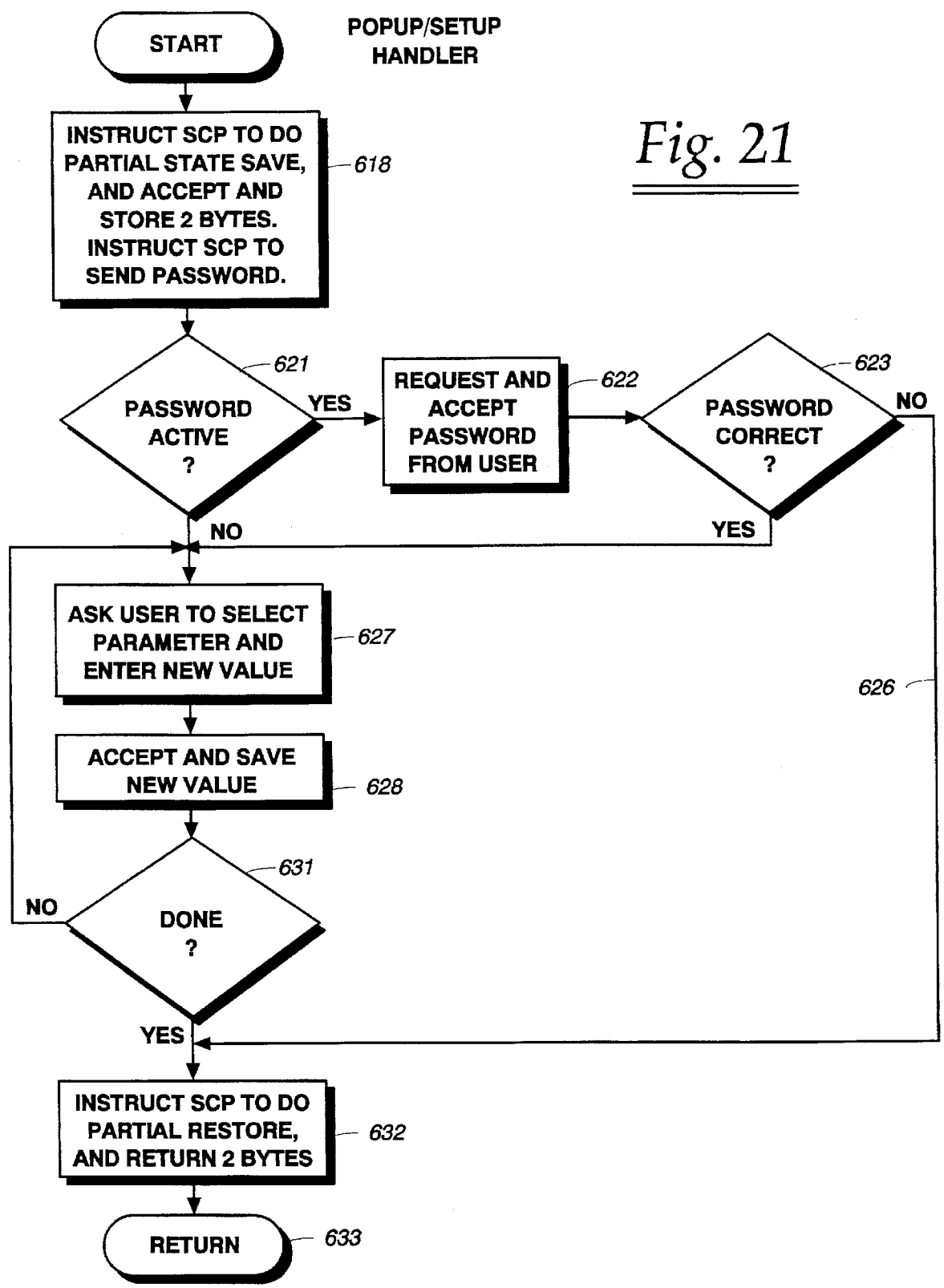

Referring back to block 598 in FIG. 20, the pop-up/set-up handler is shown in FIG. 21, and will now be described. Execution begins at block 618 in FIG. 21, where the processor instructs the SCP to do a partial state save, in response to which the SCP sends the processor two bytes containing mode information. For example, the mode information indicates whether the interrupted application program currently has the keyboard disabled. Obviously, the keyboard needs to be enabled where the PMI handler needs to obtain input from the user through the keyboard, and thus this mode information is saved so that the SCP can change its mode of operation to meet the needs of PMI handler, and after meeting these needs the original mode information is restored as described below so that the system will be returned to the interrupted application program in the same mode it was in when the application program was interrupted. After receiving the two bytes of mode information at 618 from the SCP, the processor stores them at 483 (FIG. 15) in the capital PMRAM. Then, the processor instructs the SCP to send the current password. If it is determined at block 621 that the password is active, the user enters the password and it is checked at blocks 622 and 623 in a manner similar to that described above in association with blocks 613 and 616 of FIGS. 20a–20d. If the user enters a password which is not correct, then the portion of the handler which permits the user to change set-up information is skipped at 626. However, if the password is found to be correct at 623, or is found not to be active at 621, control proceeds to block 627, where the user is presented with a menu or menu system which permit the user to specify a set-up parameter to be changed and to then enter a new value for that parameter. At block 628, the processor accepts and saves this parameter. The types of parameters which can be entered include an AC value and a DC value for the preset time period for each of the timers 351 and 352, an AC value and a DC value for the suspend timer and backlight timer which are implemented in the software of the SCP (as described later), a user indication of whether the mask for the resume mask register 382 should permit a resume reset in response to an ALARM signal from the real time clock 376 or a modem ring signal MDMRI from the modem, a user indication of whether deactuation of the manual switch 313 should place the system in a suspend condition or a power-off condition, a user indication of whether the LCD or an external CRT should be used as the active user display, and a user specification of a new password. Other set-up information which is conventional and not pertinent to the present invention can also be entered. As each item is entered, the processor 311 sends it to the SCP 316 with a command instructing the SCP to store the information in the EEPROM 439. At 631, the processor can loop to continue to accepting information at 627 and 628 so long as the user wants to change set-up values. When the user is done, control proceeds to block 632, where the processor 311 instructs the SCP 316 to accept and restore the two mode bytes which the SCP sent to the processor 311 at block 618, and then follows the command with the two bytes. Then, at 633, a return is made to the calling routine.

Referring once more to FIG. 16a–16c, if it is determined at block 513 that the source of the PMI is a time out of the global standby timer 352 (FIG. 13), control proceeds from 513 to block 636. Time out of this timer means that there has been little or no activity in the system for a predetermined period of time, and therefore the system is going to automatically transition to a global standby mode in which the processor 311 places the number of system components in a reduced power mode and then halts itself in order to conserve power, or to the suspend mode.

Figure 22:
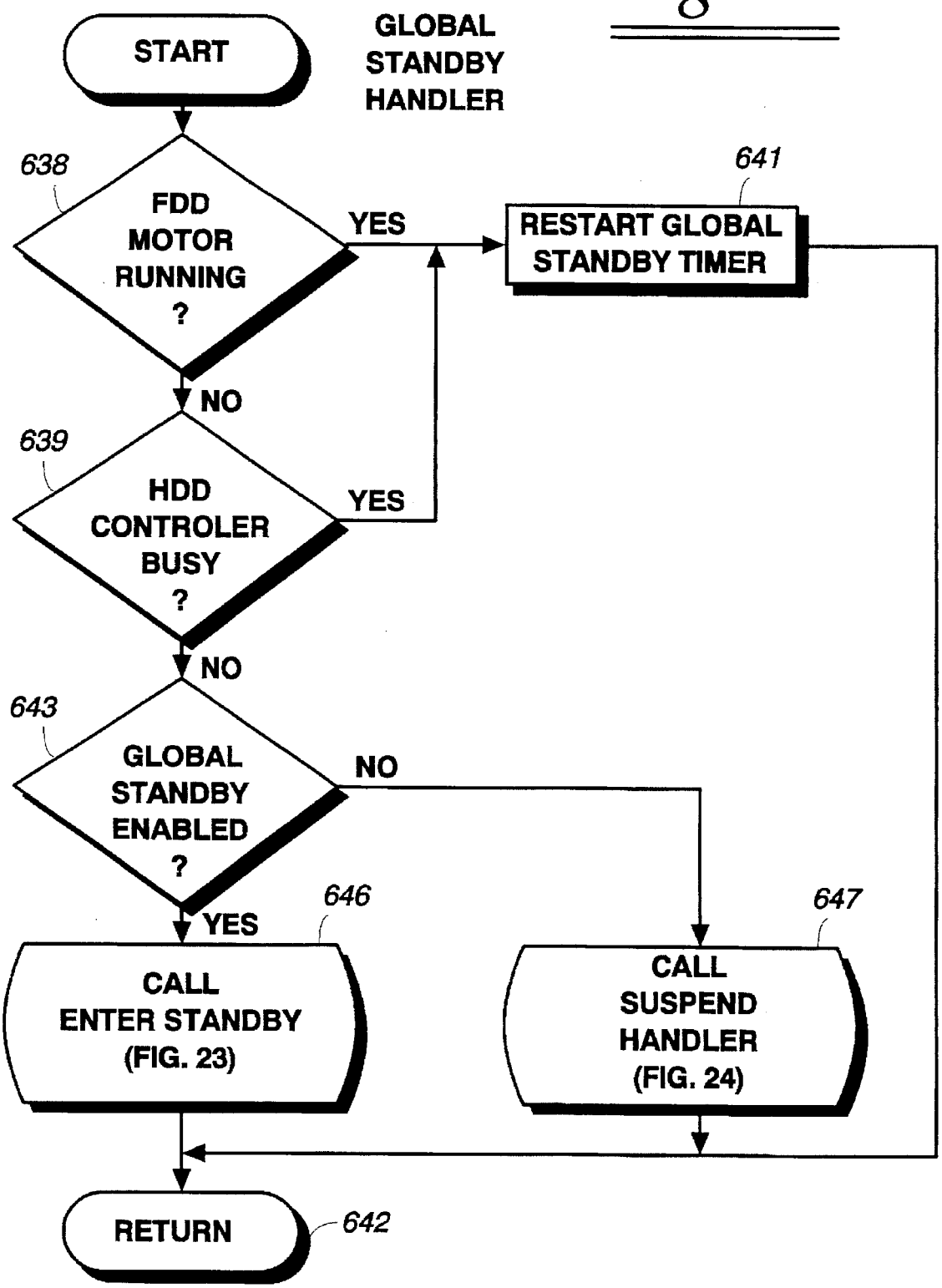

At block 636, a subroutine call is made to a global standby handler routine, which is shown in FIG. 22. A condition for entering global standby mode is that the hard disk drive 323 be quiescent. Therefore, the processor reads status information from the hard disk drive 323 in a conventional manner, and checks this information at 638 and 639 of FIG. 22 in order to determine whether the hard disk motor is running or the hard disk controller circuitry is busy. If the motor is running or the circuitry is busy, then control proceeds to block 641, where the global standby timer 352 is restarted, and then at 642 a return is made to the calling routine without any entry to the standby mode or suspend mode.

More typically, the hard disk will not be busy, and thus control will proceed through blocks 638 and 639 to block 643, where the processor 311 checks the set-up information in the SCP in order to see whether the user has specified that time out of the global timer 352 is to be interpreted to mean that the system enters standby mode, or proceeds directly suspend mode. In particular, if the user has specified a standby preset, then a time-out of timer 352 means the system will enter standby mode. On the other hand, if the user has not specified a standby preset but has specified a suspend preset after which the system is to enter suspend mode, then the suspend preset is used for timer 352, and when it expires the system enters suspend mode. If the system is to go to suspend mode, then control proceeds to block 647, where a subroutine call is made to the suspend handler which places the system in suspend mode, as described in more detail later. On the other hand, the more common determination at 643 is that the user intends the system to go to standby mode, and thus control would proceed to block 646, where a subroutine calls is made to the previously-mentioned routine which guides the system into global standby mode. This routine will now be described in association with FIGS. 23a-23b.

Figure 23A:
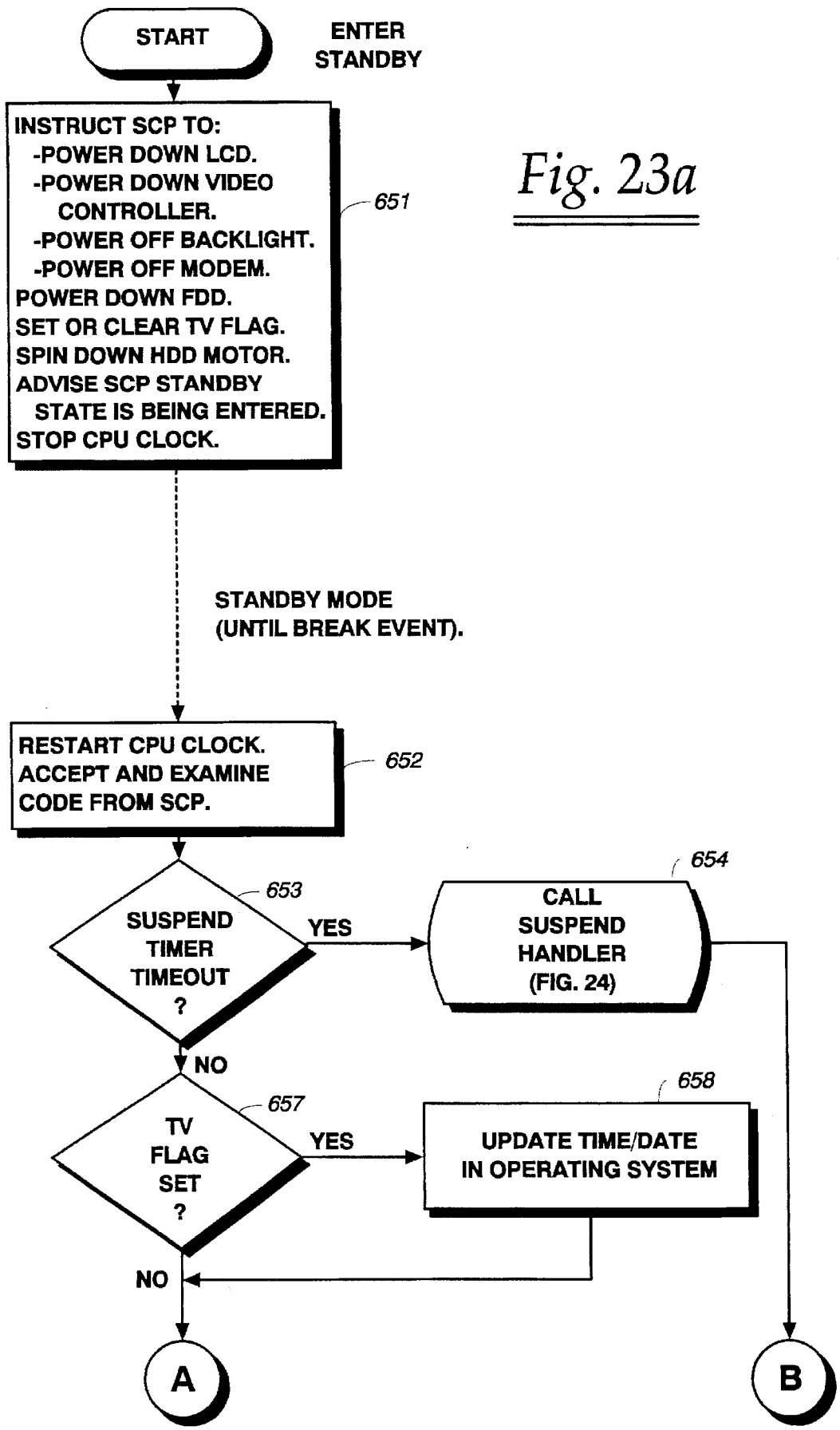
Figure 23B:
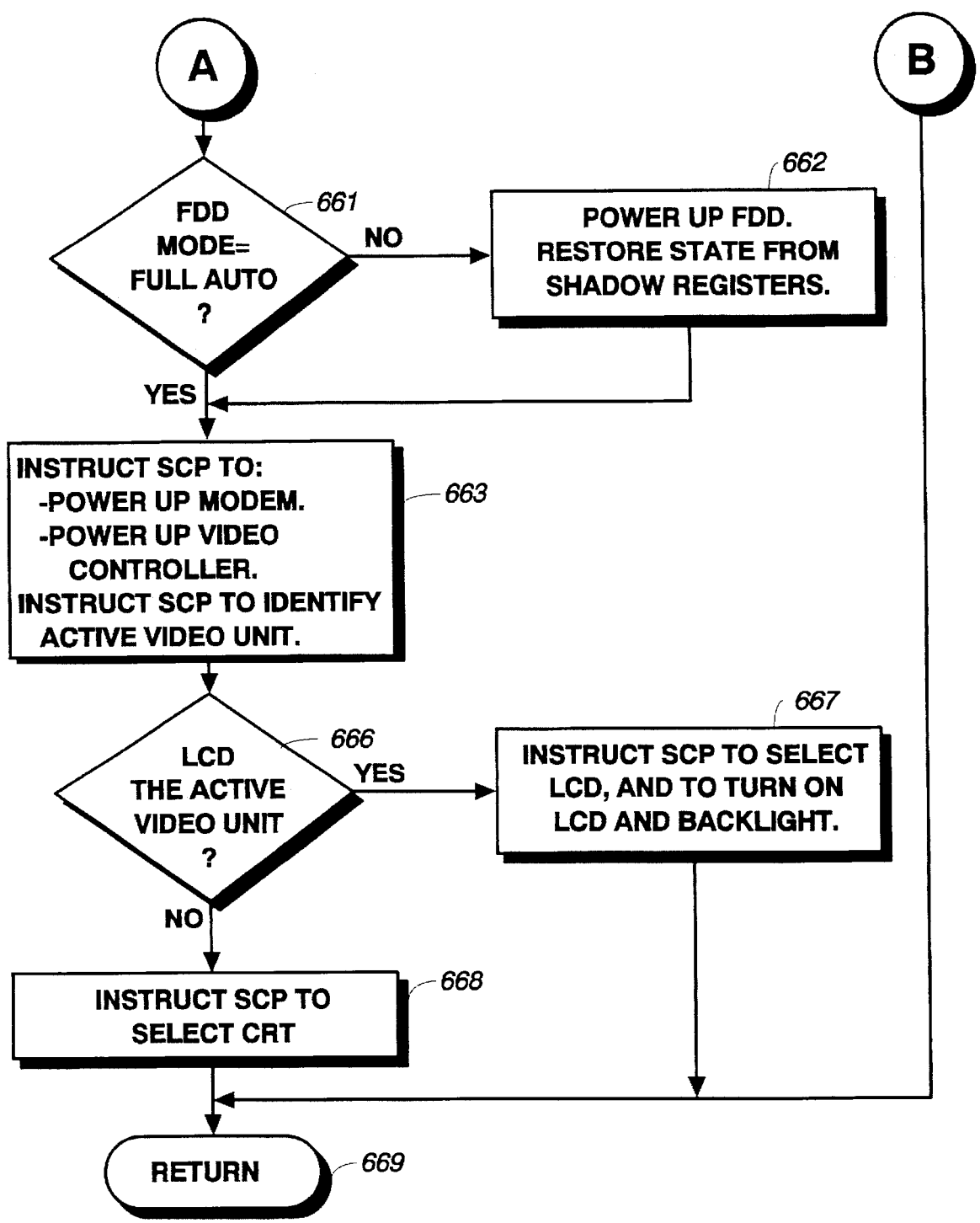

In FIG. 23a-23b, the system begins by sending commands to the SCP which instruct it to deactuate the LCD-PWR line in order to power down the LCD display if the display is not already powered down, to deactuate the VIDEN line in order to power down the video controller, to deactuate the BLON line in order to power down the backlight for the LCD display, and to deactuate the MDMEN line in order to turn off the modem 322. Then, the processor 311 deactuates the FDDSLT line in order to power down the floppy disk drive. Then, the processor either sets or clears the TV flag (FIG. 15) in order to indicate whether or not the operating system 471 (FIG. 15) supports time and date information. Then, the processor 311 sends a command to the hard disk drive 323 which tells it spin down its motor, and sends a command to the SCP which advises the SCP that the processor 311 is entering the standby state, after which the processor 311 stops its clock. Thus, the processor 311 essentially stops operating. It remains in this state until some form of system activity causes the selector 346 to actuate the BREAK EVENT signal.

While the processor 311 is in this inactive state, the SCP 316 remains fully active, and in fact has the responsibility of waking up the main processor 311 in the event certain things occur. In particular, if a key on the keyboard 317 is pressed, then SCP will actuate interrupt signal IRQ1, as it normally does for a standard key press. The IRQ1 interrupt signal is connected to the selector 346, and will actuate the BREAK EVENT signal to wake up the processor 311. Also, the SCP 316 monitors the modem ring signal MDMRI from the modem 322, and will wake up the processor 311 in the event there is an incoming ring signal from a telephone line connected to the jack 434. Further, if the user has specified a suspend timer preset, the SCP will maintain a software timer starting from the point in time when the main processor 311 enters the standby mode. The basic philosophy is that, if the system has been in global standby mode for the specified time period with no activity sufficient to wake it up, it will automatically proceed to the suspend mode when the time interval expires in order to further conserve power. Of course, the user can specify that this timer is not to be active, in which case the system will simply remain in the standby mode. However, for purposes of explaining the present invention, it will be assumed that the user has enabled the suspend timer function, and that the SCP therefore maintains this timer in software. In the event this timer in the SCP expires, or in the event the SCP detects a modem ring signal, the SCP generates a false keystroke signal by actuating the interrupt signal IRQ1 in order to actuate the BREAK EVENT signal in the processor 311 and thus wake the processor up. Whereas in the case of a real keystroke the SCP sends the processor a coded representation of the particular key pressed, in the case of suspend timer expiration or modem ring signal, the SCP sends one of two respective codes which do not correspond to any existing key on the keyboard and which the processor 311 is programmed to recognize as representing the timer expiration or the modem ring signal.

Thus, when the BREAK EVENT signal is eventually actuated in order to wake the processor up, the hardware of the processor 311 automatically restarts the CPU clock, and then the processor 311 proceeds at 652 with the software routine of FIG. 23, in which it accepts and examines the code from the SCP. If it is determined at 653 that the code is an indication that the software suspend timer maintained by the SCP during standby has expired, then control proceeds to block 654, where a subroutine call is made to the routine which handles entry into the suspend mode, and thus the system proceeds automatically from standby mode into suspend mode. On the other hand, if it is determined at 653 that the BREAK EVENT signal was caused by any other condition, such as an actual keystroke on the keyboard or a modem ring indicator signal, then the processor 311 needs to return to the normal operational mode, and therefore proceeds to block 657.

In block 657, the processor 311 checks the TV flag (FIG. 15), which it set before entering standby in order to provide an indication of whether the operating system maintains time and date information. If the flag is set to indicate that it does, then control proceeds to block 658, where the processor 311 extracts up-to-date time and date information from the real time clock circuit 376 (FIG. 13), and updates the time/date information at 472 (FIG. 15) in the operating system.

Control then proceeds to block 661, where the processor 11 checks the shadow register information at 486 (FIG. 15) for the floppy disk drive, in order to determine the operational mode the floppy disk drive was in before the floppy disk drive was powered down for the standby state. The floppy disk drive can be operated in an ALWAYS ON mode in which it is never turned off except for standby and suspend, an AUTO ON mode in which it is left off when the system is powered up but will be turned on and then remain on if it is accessed at any point, and a FULL AUTO mode in which it is turned on and off as needed as a function of the extent to which it is being accessed, as already described above. With respect to the FULL AUTO mode, the I/O trap logic 361 and the local timer 351 are set to disable the FDD TRAP and the LOCAL STANDBY signals except when the floppy disk drive is being operated in the full-auto mode. If the floppy disk drive is not being operated in the FULL AUTO mode, then control proceeds from block 661 to block 662, where the processor 311 actuates the line FDDSLT in order to restore the power to the floppy disk drive 327, and restores the state of the floppy disk drive from the shadow registers stored at 486 (FIG. 15) in the main memory. In either case, control proceeds to block 663, where the processor 311 instructs the SCP 316 to actuate the line MDMEN in order to restore power to the modem 322, and to actuate the line VIDEN in order to restore power to the video controller 318. The processor 311 then asks the SCP to identify whether the active video unit is the LCD 321 or an external CRT 426. If the reply from the SCP indicates that the active unit is the LCD, then control proceeds to block 667, where the processor 311 instructs the SCP to set the line CRT/LCD to select the LCD, and to actuate the signal BLON in order to turn on the backlight to the LCD. On the other hand, if the external CRT is the active unit, then control proceeds from block 666 to block 668, where the processor 311 instructs the SCP to set the line CRT/LCD to select the external CRT 496. In either case, control returns at 669 to the calling routine.

Subroutine calls to the suspend handler routine which guides the system into suspend mode have previously been mentioned in association with block 531 in FIG. 17, block 576 in FIGS. 20a–20 d, block 647 in FIG. 22, and block 654 in FIG. 23. The suspend handler routine will now be described in association with FIGS. 24a–24b. As previously mentioned, suspend mode is not entered while the hard disk is busy. Therefore, the processor 311 begins at 671 in FIGS. 24a–24b by reading in a conventional manner certain status information from the hard disk drive 323 in order to determine whether it is busy. If it is, control proceeds to block 672, where the processor instructs the SCP to actuate the ENABLE signal to the gate 438, and then clears the ST flag (FIG. 15) in order to indicate that, when the processor 311 is signalled that the hard disk is no longer busy, the processor will decide at block 573 in FIGS. 20a–20d to enter the suspend mode at block 576 rather than the standby mode at block 578, as already described in association with FIGS. 20a–20d. From block 672, control proceeds to 673, where a return is made from the suspend handler routine without entry into the suspend mode.

On the other hand, if the hard disk is not busy at block 671, then control proceeds to block 676, where the processor 311 reads the current status of the hard disk drive 323 and saves it in the portion 482 of the PMRAM (FIG. 15). The precise manner in which this occurs is the subject of the above-mentioned copending application. The precise manner in which information is obtained from the hard disk drive 323 is not essential to an understanding of the invention which is of interest here, and details of the manner in which this information is obtained from the hard disk are therefore not included here. After this information has been obtained from the hard disk and stored in the memory, the processor 311 deactuates the line HDDSLT in order to place the hard disk drive in a reduced power mode.

Control then proceeds to block 677, where the processor checks the BATTLOW line from the SCP in order to determine the state of the battery power. If it is determined that the battery power is waning, then control proceeds directly to block 678, which is described in a moment and causes the system to proceed into suspend mode. On the other hand, if the battery power is sufficient, then control proceeds to block 681, where the processor checks to see if the floppy disk drive is busy. If it is, then control will proceed to block 682, where the processor 311 actuates line 391 (FIG. 13) in order to cause the speaker 392 to beep, and warns the user on the display that the floppy disk drive is active. Then, at 673, control is returned to the calling routine without entry into the suspend mode. On the other hand, if it is determined at block 681 that the floppy disk drive is not busy, then control proceeds to block 678 to begin the final sequence of entry into the suspend mode.

In block 678, the processor 311 extracts from its stack 492 (FIG. 15) an indication of the point from which the suspend handler routine was called, in particular in the form of the value of the instruction pointer which has been saved on the stack and which indicates the point to which program control is to be returned. The processor 311 saves this in the main memory for use during a subsequent resume, as described later. Then, at block 683, the processor 311 checks to see whether it is carrying out an automatic entry to suspend mode from standby mode, in particular through block 654 in FIGS. 23a–23b. If it is, then the processor 311 has already addressed whether or not the operating system supports time and date information as part of its entry into the standby mode. On the other hand, if it is not entering suspend mode directly from standby mode, it proceeds to block 686, where it either sets or clears the TV flag (FIG. 15) in dependence on whether or not the current operating system supports time and date information. In either case, control then proceeds to block 687.

In block 687, the processor 311 takes the CPU state saved at 481 (FIG. 15), and creates a copy of it at 488. This is because a further PMI interrupt will be intentionally induced during a resume from the suspend mode in a manner described later, at which point the hardware will necessarily overwrite the information saved at 481. Since this information is needed to resume the interrupted application program, a copy of it is temporarily saved at 488. In addition, the processor 311 saves at 488 some selected internal registers which are not automatically saved at 481 in response to a PMI. This is because the PMI handler routine can service most PMI interrupts without altering these selected registers, and thus in order to speed up handling of most PMI interrupts the processor 311 does not save the selected registers. On the other hand, these registers must be saved in order to enter suspend mode, because the portion of processor 311 which contains them will be powered down during suspend mode and the contents of these registers would thus be lost. Therefore, before entering suspend mode, they are saved at 488.

Figure 24A:
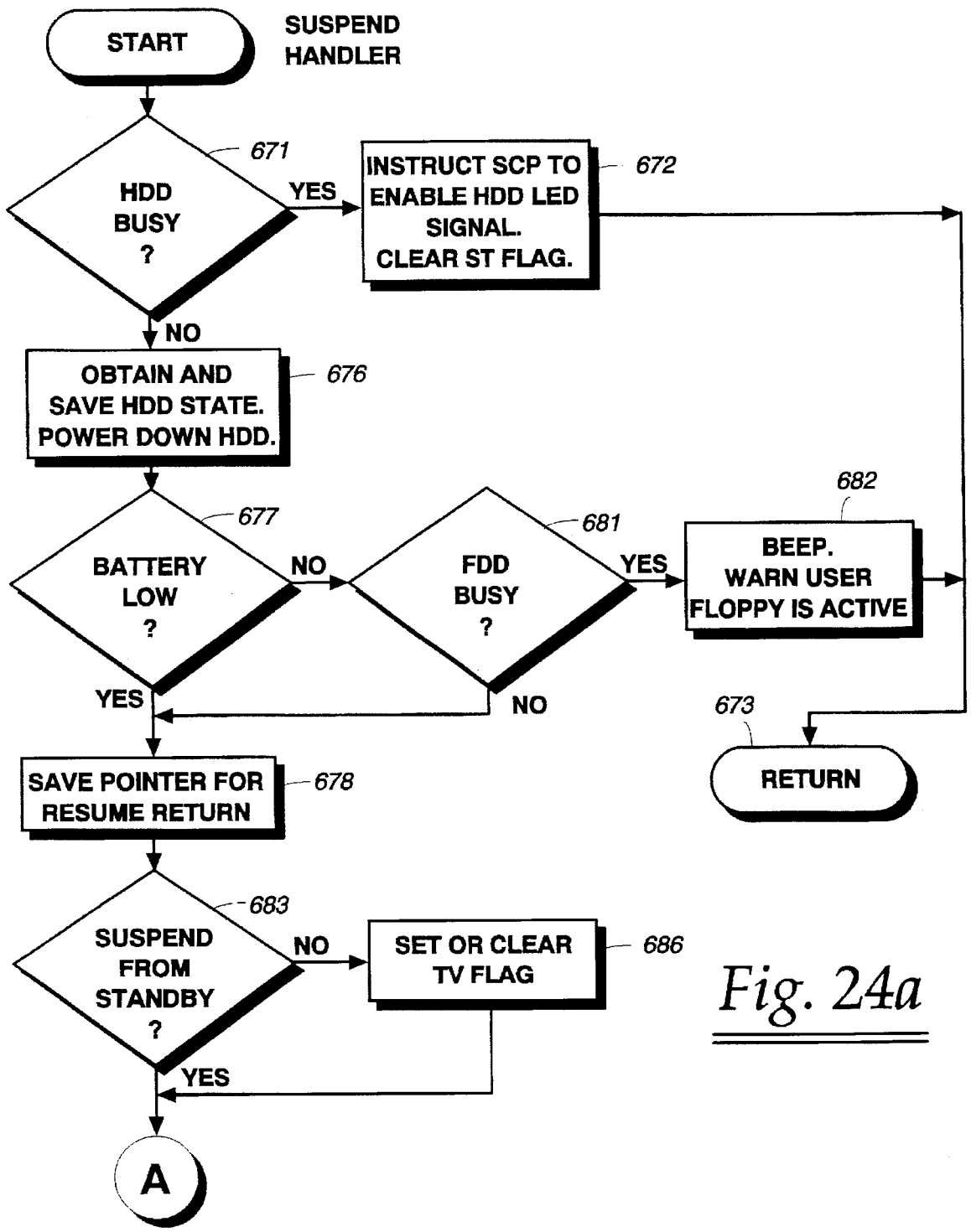
Figure 24B:
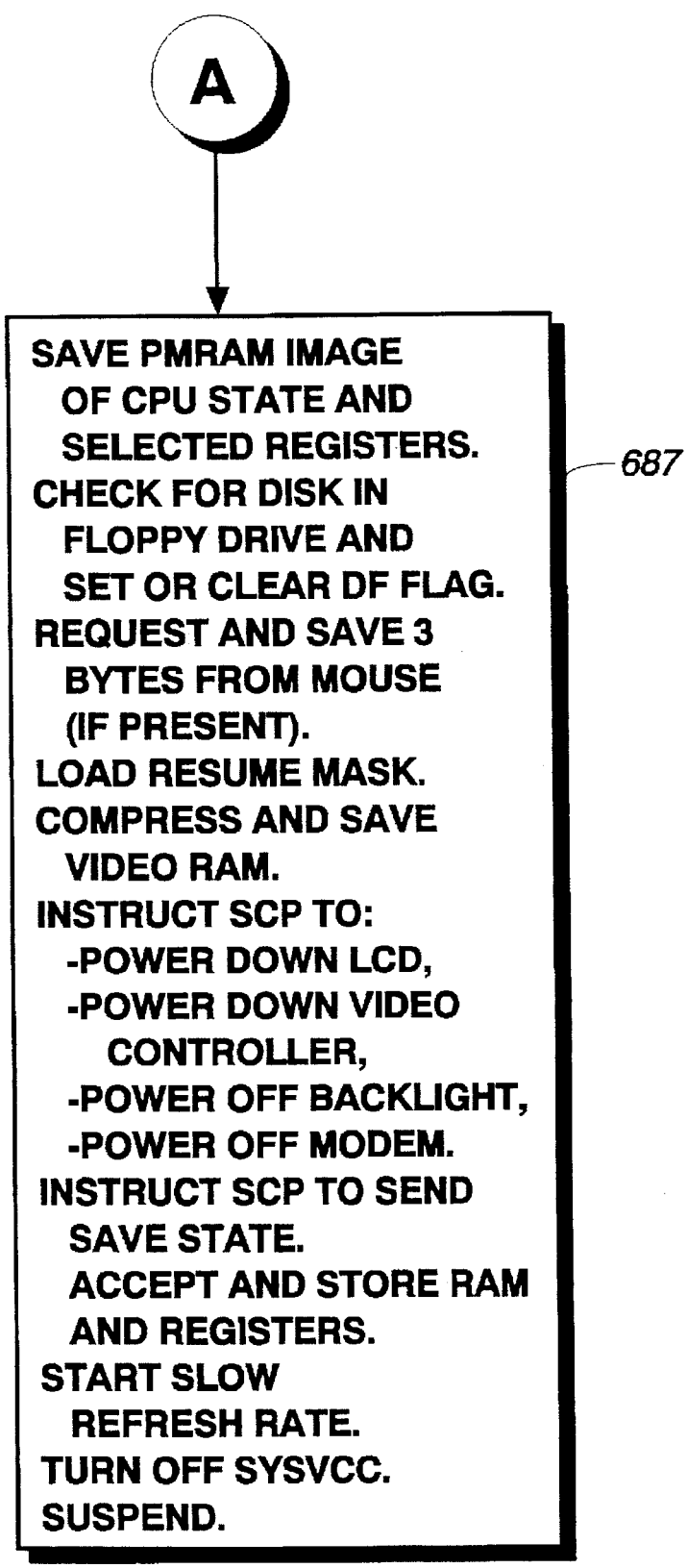

Continuing with block 687 in FIGS. 24a–24b, the processor reads status information from the floppy disk drive in order to determine whether a floppy disk is present in the floppy disk drive, and sets the DF flag (FIG. 15) if a disk is present or clears the flag if a disk is not present. This is so that when operation resumes it will know if a disk should be present in the drive, because it is possible that a user might remove the disk while the system is-in suspend mode or, worse yet, replace the disk with a different disk. If the interrupted application program were in the middle of writing data to the disk when the suspend occurred, it would have no way of knowing at resume that the disk had been changed, and might complete its task of writing data to the floppy disk drive without knowing that it was writing the data on to the wrong disk.

Then, still at block 687, the processor reads 3 bytes of status information in a conventional manner from the mouse 421 (if one is present), and stores the bytes at 482. An external keyboard, on the other hand, has no such status information which must be saved, but instead is always maintained in exactly the same configuration and mode as the internal keyboard. Then, the processor 311 configures and loads into mask register 382 (FIG. 13) the resume mask which determines the events which will wake the processor up from the suspend mode. Then, the processor reads the video RAM 448 from the video controller 318, compresses the video information using a conventional data compression technique, and then stores the compressed data in the portion 478 (FIG. 15) of the main memory. Then, the processor 311 sends a series of commands to the SCP which instruct the SCP to deactuate the line LCDPWR in order to power down the LCD display, to deactuate the line VIDEN in order to power down the video controller, to deactuate the line BLON to turn off the backlight for the LCD display, and to deactuate the line MDMEN in order to power down the modem. Then, the processor 311 sends the SCP a command which instructions the SCP to send the processor 311 the contents of its RAM 440 and certain internal registers. The processor 311 accepts this information from the SCP, and stores it at 482 (FIG. 15) in the PMRAM. Then, the processor 311 sets the refresh control circuit 386 (FIG. 13) to carry out extremely slow refresh to the main memory, and then deactuates the signal SYSPWROFF to the power control circuit 312 so that the power control circuit turns off the SYSVCC power to the SCP, keyboards, video controller, hard disk drive, LCD display, modem, floppy disk drive, and ROM 328. The power control circuit 312 is, of course, still supplying PMVCC power to the main memory 326, the processor 311, and flash RAM 331. Finally, the processor 311 executes a software instruction which causes it to enter suspend mode, as a result of which the processor 311 stops operating and internally turns off power to most of its circuits, with the exception of circuits such as the real time clock 376 which must continue to maintain time and date information, the resume control circuitry 381–383 which must be capable of detecting conditions causing operation to resume, and the refresh control circuit 386 which is maintaining the data in main memory 326.

If the user has specified that an ALARM signal from the real time clock 376 or a modem ring indicator signal MDMRI from the modem 322 is to be capable of waking up the processor, then the processor will have configured the resume mask 382 so that either of these events will produce a RESUME RESET signal. However, the most common cause for a resume is manual actuation of the switch 313 by a user.

Figure 25A:
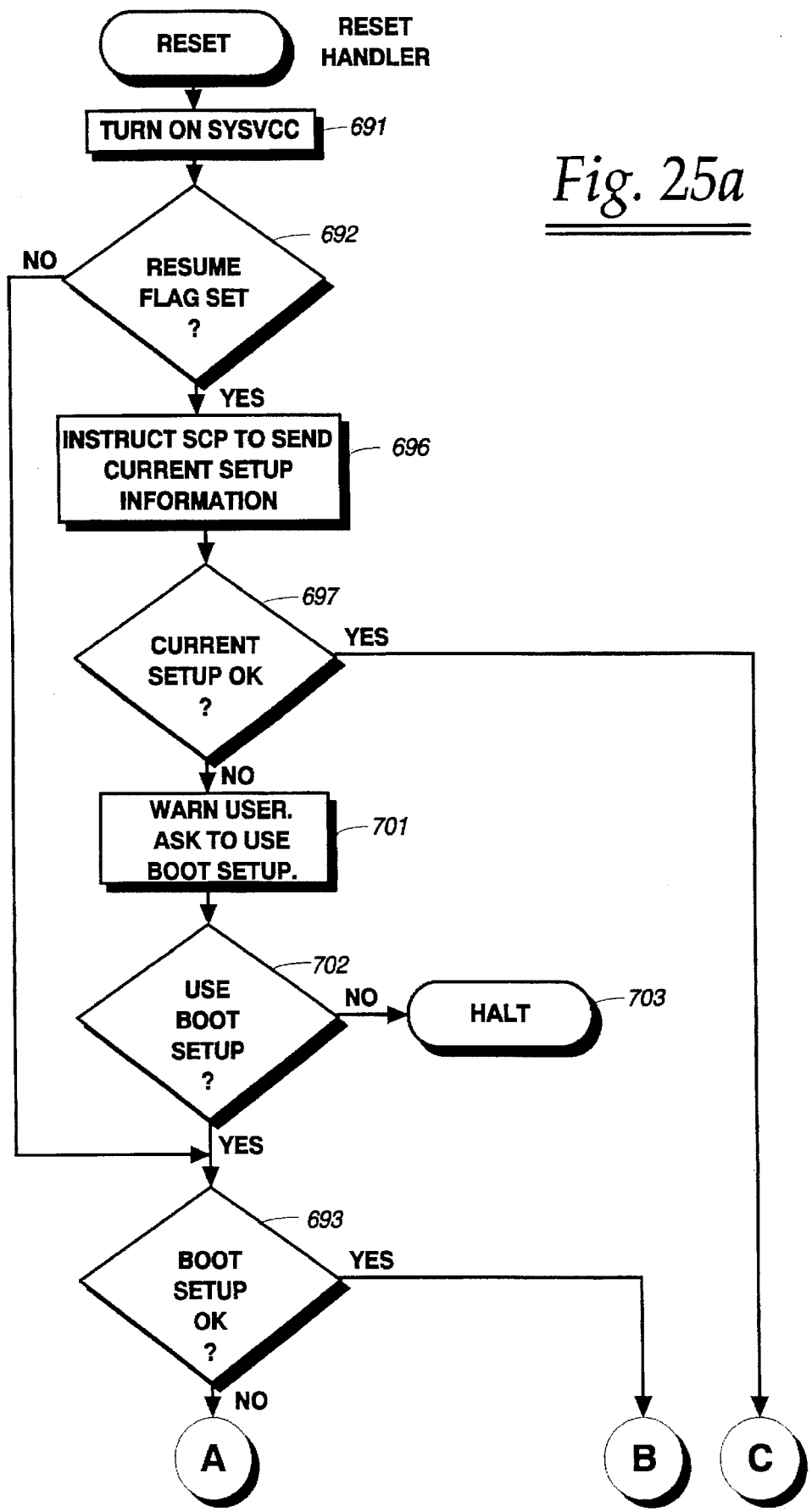
Figure 25B:
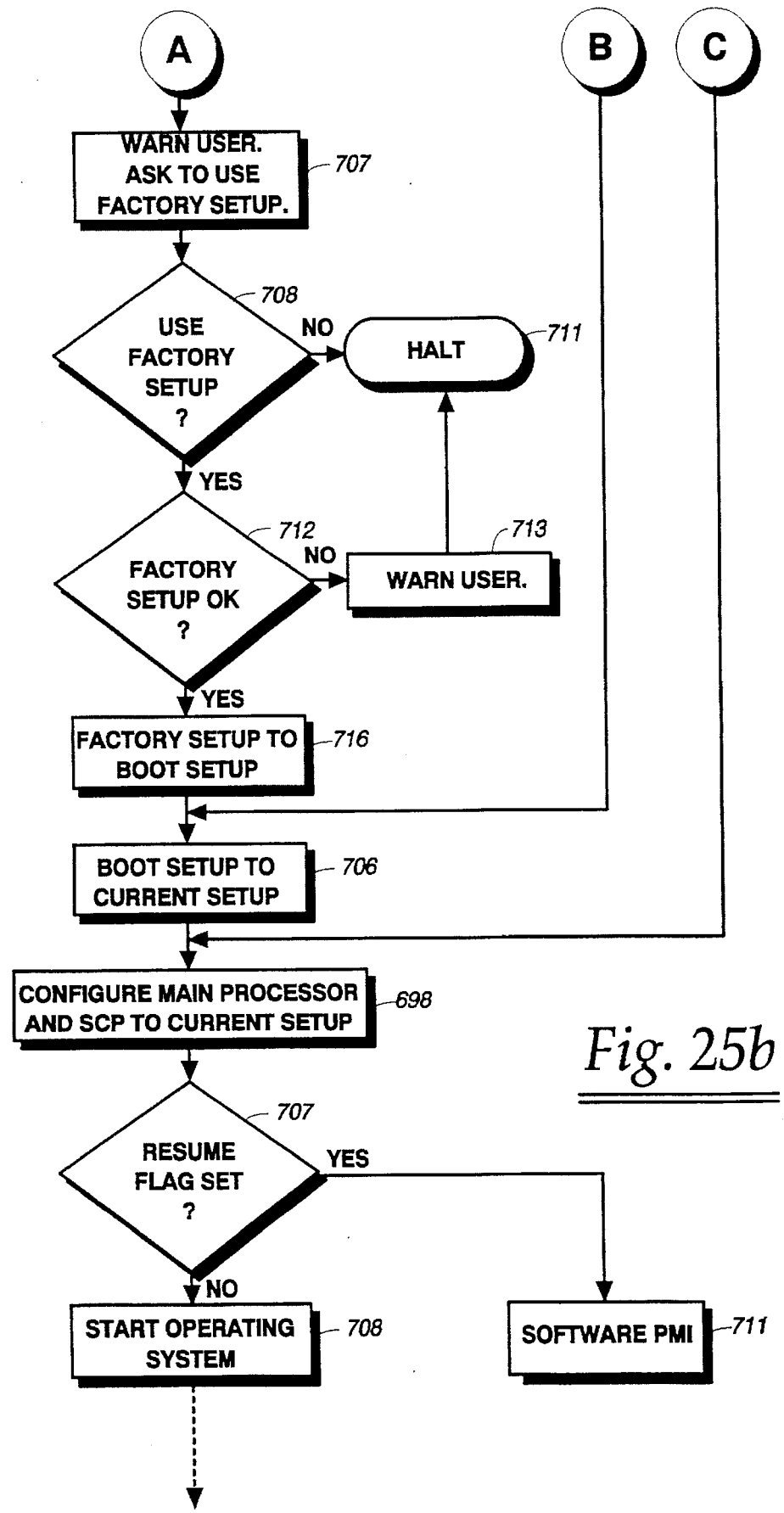

The RESUME RESET signal sets the resume flag 383, whereas this flag is automatically reset by any other reset signal. Further, the RESUME RESET causes the processor 311 to internally restore power throughout its internal circuitry, and the processor automatically brings the refresh control circuitry 386 back to a normal state so that the main memory 326 can be accessed. In response to any type of reset, the processor 311 automatically goes to a predetermined location in the flash ram 331 and executes the first instruction of a reset handling routine stored there. This routine is shown in FIGS. 25a–25b, collectively referred to as FIG. 25. The processor 311 may begin by doing some internal diagnostics, but this is conventional and therefore not illustrated in FIG. 25. For purposes of the present invention, the first significant step performed by the processor 311 is to deactuate SYSPWROFF in order to cause the power control circuit 312 to turn system power SYSVCC back on, so that the SCP, keyboard, video controller, LCD display, modem, hard disk drive and floppy disk drive again have access to a source of power.

Then, at 692, the processor checks the resume flag 383 (FIG. 13). If it is set, then the processor will attempt to configure the system using the set-up information stored in the EEPROM 439 of the SCP. If it is not set, then the system is performing a cold boot and will attempt to configure itself using the set-up information stored in the RAM 377 of the real time clock circuit 376. More specifically, if the resume flag is set to indicate that the system is resuming from suspend mode, then control will proceed from block 692 to block 696, where the system will attempt configuration using the current set-up information stored in the EEPROM 439 of the SCP.

In particular, at block 696, the processor 311 instructs the SCP to send current set-up information to it. It performs a checksum on this information and compares it at 697 to a checksum value present in the set-up information itself in order to determine if the set-up information is valid. If it is, then control proceeds directly to block 698, where the system will configure itself using this set-up information. On the other hand, if it is determined at block 697 that the current set-up information is not valid, then control proceeds to block 701, where the system warns the user that the current set-up information is not valid and asks for authorization to us the boot set-up information stored in the real time clock circuit 376. If the user refuses, then block 702 transfers control to block 703, where the system halts. The user would have the option of restarting the system with a conventional set-up disk in order to configure it in a desired manner.

Typically, the user would approve use of the boot set-up information, and control would thus proceed from block 702 to block 693, where the processor 311 would run a checksum on the boot set-up information in the real time clock circuit 376 and compare the checksum to a checksum stored in the real time clock circuit 376. If the checksum was accurate, then control would proceed directly to block 706, where as described below the system would be configured using the boot set-up information.

Otherwise, control proceeds to block 707, where the processor 311 warns the user that the boot set-up information is not valid and asks for authorization to use the factory default set-up information stored in the flash RAM 331. If the user refuses permission, then at 708 control is transferred to block 711, where the system halts.

Otherwise, control proceeds to block 712, where the processor runs a checksum on the factory default set-up information in the flash RAM 331 and compares the result to a checksum stored in the flash RAM. If an error is detected, control proceeds to 713, where the user is warned that the system has no usable set-up information, and then the processor halts at 711. However, if the factory default set-up information is found to be accurate at block 712, then control proceeds to block 716, where the factory default set-up information is copied from the flash RAM to the RAM 377 in the real time clock circuit 376. Then, at block 706, the set-up information in the real time clock circuit 376 is sent to the SCP, and the SCP stores it in the EEPROM 439 for use as the current set-up information. Then, at block 698, the processor 311 configures the system according to the set-up information which is stored in the SCP.

Figure 26A:
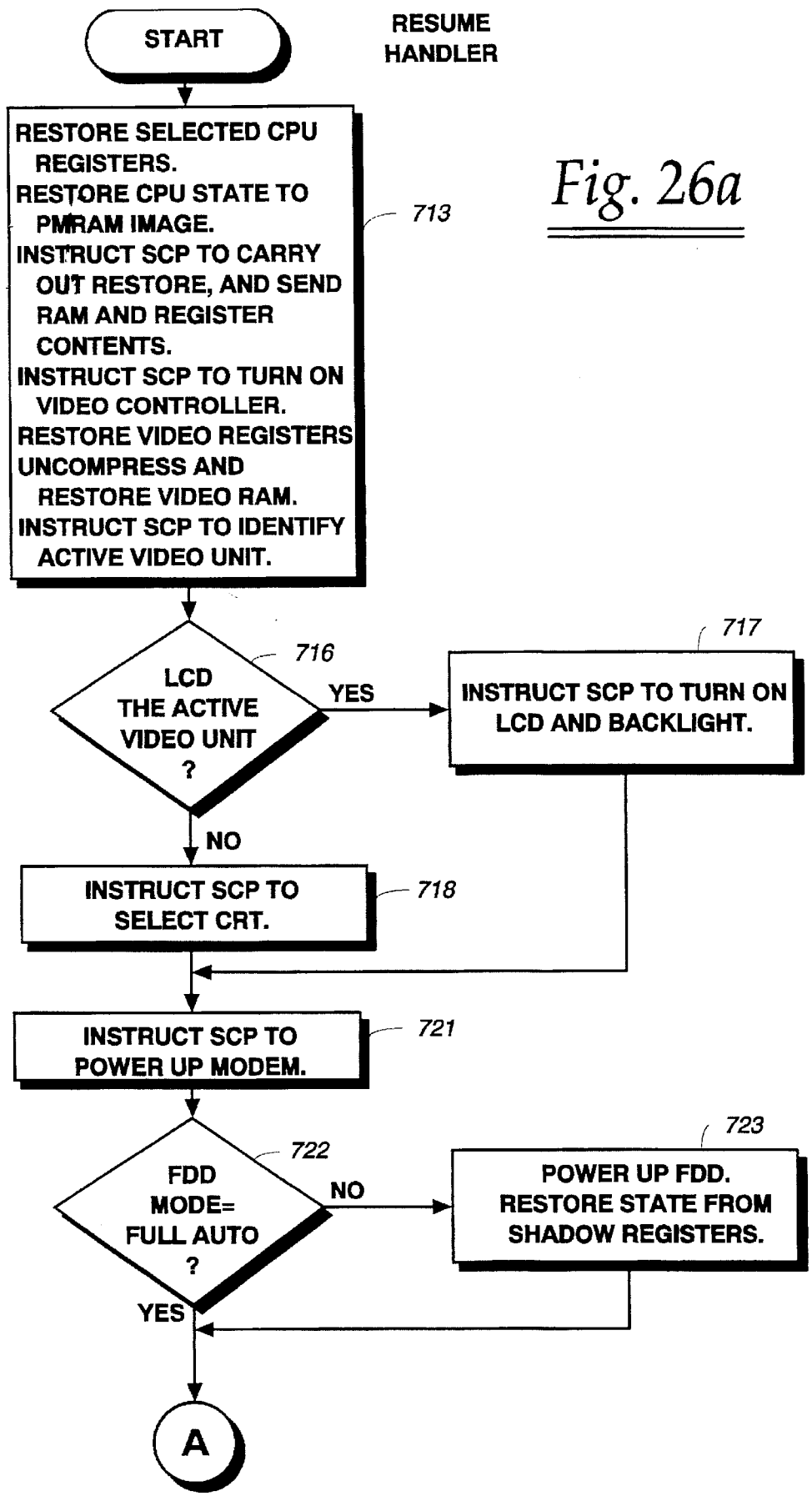
Figure 26B:
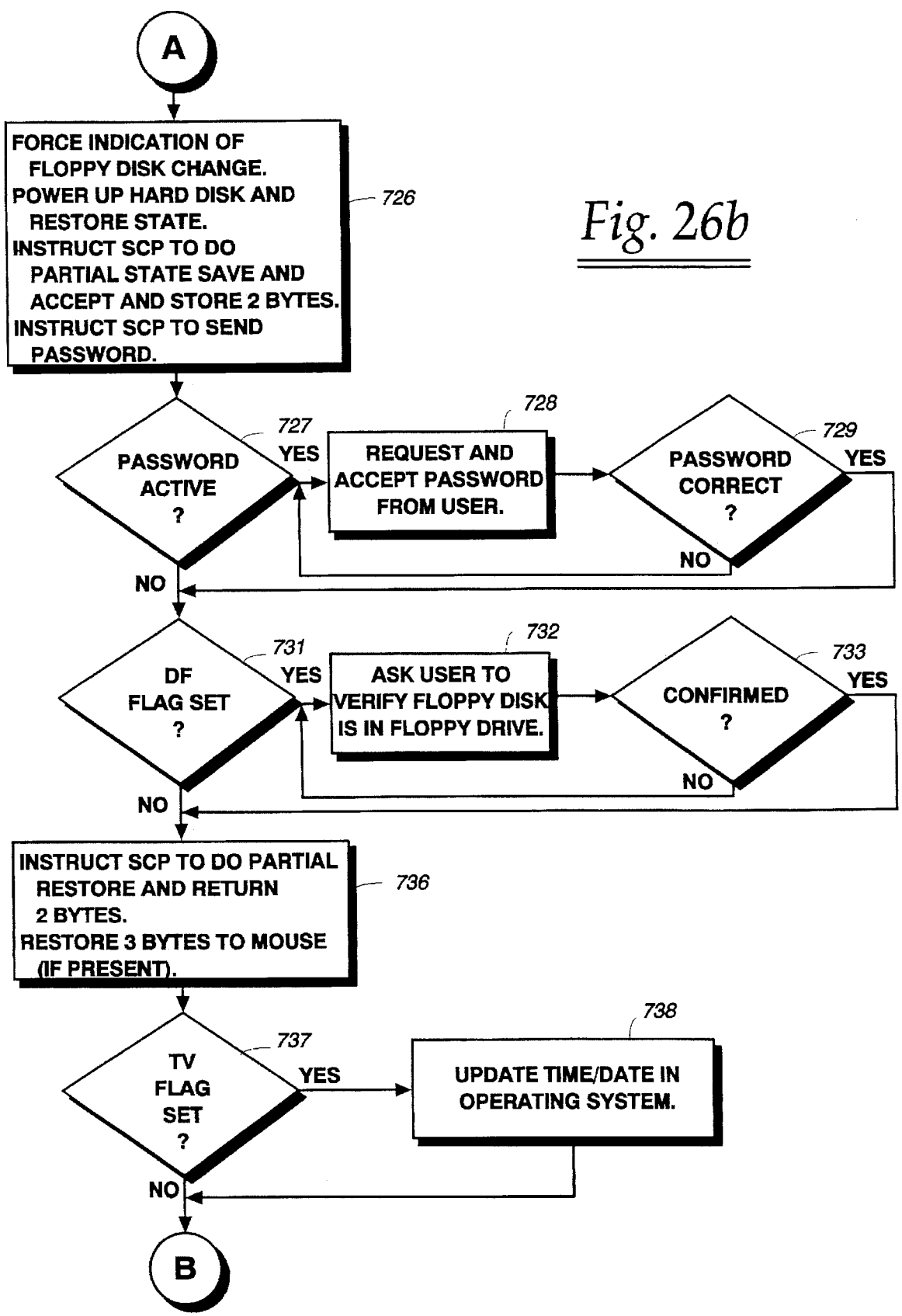
Figure 26C:
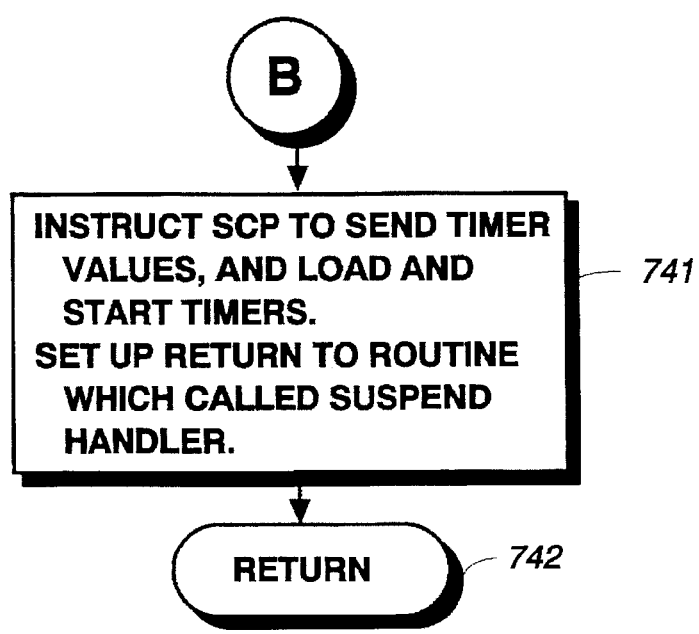

Then, at block 707, the processor again checks the resume flag 383 in order to determine if a resume is being performed. If it is not, then control proceeds to block 708, where the processor starts the operating system in a conventional manner. Otherwise, control proceeds from block 707 to block 711, where the processor 311 executes a software instruction which generates a PMI interrupt in order to invoke the previously-described PMI handler routine. Thus, the software PMI causes the processor to continue with the PMI handler routine shown in FIGS. 16a–16c. In particular, at previously-described block 502, the system checks the resume flag again in order to determine whether the PMI handler has been entered as a function of resuming from a suspend state, or for some other reason. Since in this case the flag will be set, control proceeds to block 503, where a branch is made to a resume handler routine which is shown in FIGS. 26a–26c, collectively referred to as FIG. 26.

At block 713 in the resume handler routine of FIG. 26, the processor 311 begins by extracting from portion 488 (FIG. 15) of the main memory the states of selected registers which it stored there, and restoring these values directly to the registers in the processor itself. Then, the processor transfers from the portion 488 to the portion 481 the states of the remaining processor registers, thereby overriding the information stored at 481 by the software PMI used to reenter the PMI handler, so that at the end of the resume handler the hardware will be able to find and restore these register states to the registers of the processor 311 when the PMI handler is terminated and the interrupted application program is resumed. Then, still at 713 in FIG. 26, the processor instructs the SCP to carry out restoration of its state, and sends the SCP the contents of the SCP registers and RAM stored by the processor 311, in the main memory prior to entering suspend mode.

Then, the processor instructs the SCP to actuate the VIDEN signal in order to turn on the video controller of the video registers 446, and then uncompresses and restores the video RAM from the state of the video RAM saved at 478 in the main memory. Then, the processor 311 instructs the SCP to identify from the set-up information in EEPROM 439 the active video unit. Then, if the processor finds at block 716 that the LCD display is the active video unit selected by the user, it proceeds to block 717 where it instructs the SCP to actuate the LCDPWR signal in order to power up the LCD, and to actuate the BLON signal in order to turn on the backlight for the LCD display. On the other hand, if it is determined at 716 that the user has selected the external CRT 426 as the active video unit, control proceeds to block 718 where the processor instructs the SCP to set the CRT/LCD signal to select the CRT. In either case, at block 721 the processor then instructs the SCP to actuate the MDMEN line in order to power up the modem 322. Then, at block 722, the processor checks the shadow register information at 486 in order to determine if the floppy disk drive is being operated in FULL AUTO mode. In not, then at block 723 the processor actuates the FDDSLT line in order to power up the floppy disk drive, and sends the shadow registers stored at 486 to the floppy disk drive in order to restore the configuration of its control registers.

Control ultimately proceeds to block 726, where the processor sets the DC flag 473 (FIG. 15) in order to force an indication to the operating system that a floppy disk change has occurred. This will force the operating system to reread certain standard tables from the disk to an image of the disk in memory, thereby ensuring that if a user has changed the disk while the system was in suspend mode, the image of these tables in memory will at least correspond to the tables of the disk which is actually present in the disk drive, as opposed to tables on a disk which is no longer present in the disk drive.

Then, still in block 726, the processor 311 actuates the line HDDSLT in order to power up the hard disk, and then sends the hard disk the information regarding the state of the hard disk which the processor obtained from the hard disk and stored before entering the suspend mode. This restores the hard disk to the state it was in before operation of the system was suspended. Then, the processor instructs the SCP to do a partial state save as previously discussed in association with block 618 of FIG. 21. Then, the processor instructs the SCP to send it the current password, and then if it is determined at 727 that the password is an active password, the processor requests and accepts a password from the user at 728 and then compares the passwords at 729. If they do not compare, the processor remains at 728 and 729, in order to prevent an unauthorized user from using the system.

If they do compare, control proceeds to 731, where the processor checks the DF flag (FIG. 15) in order to determine whether a disk was present in the floppy drive when the system was turned off. If a disk was present, then control proceeds to block 732, where the processor uses the active video unit to ask the user to verify that the same floppy disk is still in the floppy drive or has been reinserted in the floppy drive. A check is made at 733 to be sure that the user has confirmed that this floppy disk is present. If it is not, control remains at blocks 732 and 733. Once user confirmation is obtained, control proceeds to block 736, where the processor instructs the SCP to do a partial restore, and sends it the two bytes which were received at block 726. Also, if a mouse 421 is present, the processor takes from portion 482 of the main memory the 3 bytes obtained from the mouse before the suspend, and loads them back into the mouse in a conventional manner.

Then, at block 737, the processor checks the TV flag (FIG. 15) in order to determine whether the operating system supports time and date information. If it does, then in block 738 the processor reads up-to-date time and date information from the real time clock 376 (FIG. 13), and uses it to update the time and date information maintained at 472 (FIG. 15) in the portion 471 of the main memory used for the operating system.

Then, at 741, the processor instructs the SCP to send it the set-up information stored in the EEPROM 439 for the timers 351 and 352, and uses this information to configure the registers 356 and 357 for the timers 351 and 352 so that the timers start running (or to disable the timers if the timers will not be used). Then, at 741, the processor uses the pointer saved at block 678 in FIG. 24 to modify its stack 492 so that, when it immediately thereafter does a subroutine return at 742, the processor 311 will return to the point from which the suspend handler subroutine was called before the processor entered the suspend mode, or in other words to one of the blocks 531, 576, 647 and 654 respectively appearing in FIGS. 17, 20a–20d, 22 and 23a–23b. Following the subroutine return, the system continues execution of the PMI handler routine from the point at which execution was placed on hold so that the system could enter and resume from the suspend mode. When execution of the PMI routine is eventually completed, the processor 311 will exit from the PMI handler at blocks 522 and 523 of FIGS. 16a–16c in the manner previously described, so that execution of the interrupted application program resumes as though there had been no interruption at all.

Figure 27:
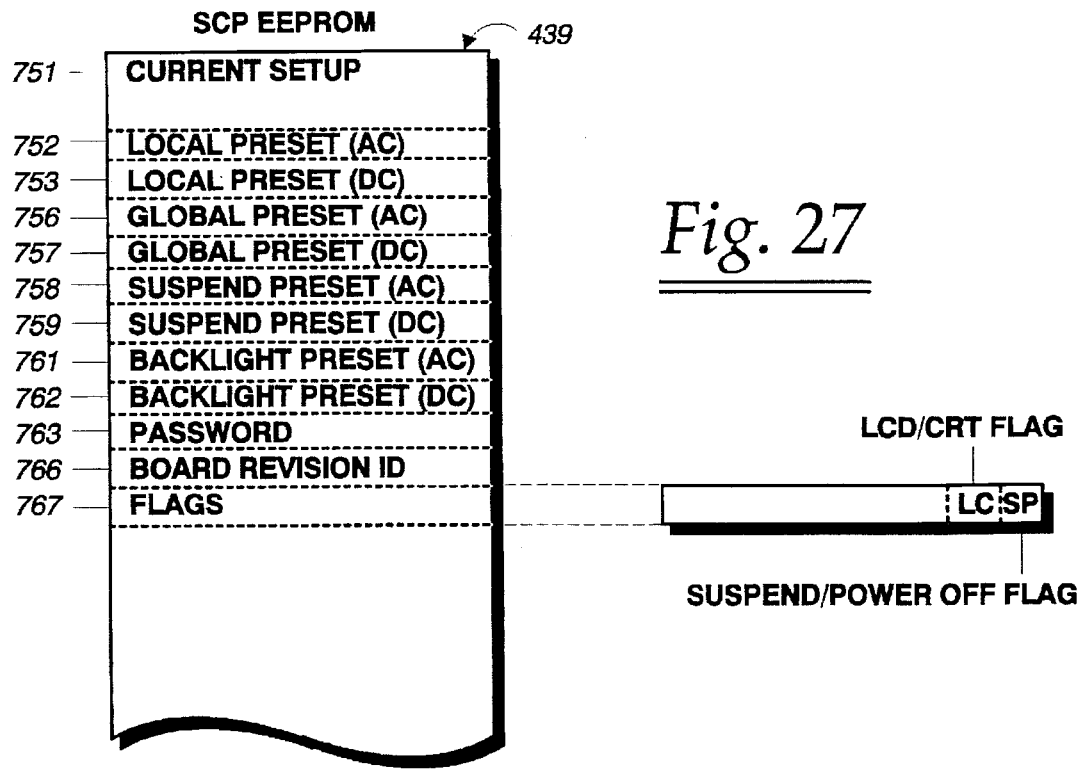
FIGS. 27 and 28 are diagrams representing the organization of respective memories used in an auxiliary processor which is a component of the system of FIG. 13.

Turning now in more detail to the system control processor (SCP) 316, FIG. 27 is a diagrammatic view of a portion of the information stored in the EEPROM 439 of the SCP. A portion 751 of this device is used to store current set-up information of the type commonly found in conventional and commercially available personal computers. In addition, portions 752 and 753 store two different values of a preset time for the local timer 351, one value being used when the system is operating on AC power and the other being used when the system is operating on DC power. Similarly, portions 756 and 757 store respective AC and DC values for use in the global standby timer 352, portions 758 and 759 store respective AC and DC values of a suspend timer preset for the suspend timer maintained in software by the SCP, and portions 761 and 762 contain respective AC and and DC preset values for a backlight timer maintained by the SCP. A portion 763 contains the current system password, and a portion 766 contains a value representing a board revision number of the main circuit board on which the processor 311 and SCP 316 are mounted. A further portion 767 contains some flags, including an LC flag which indicates whether the LCD 321 or the external CRT 426 is presently the active display device, and an SP flag which indicates whether manual deactuation of the switch 313 is to place the system in suspend mode or the power off state.

Figure 28:
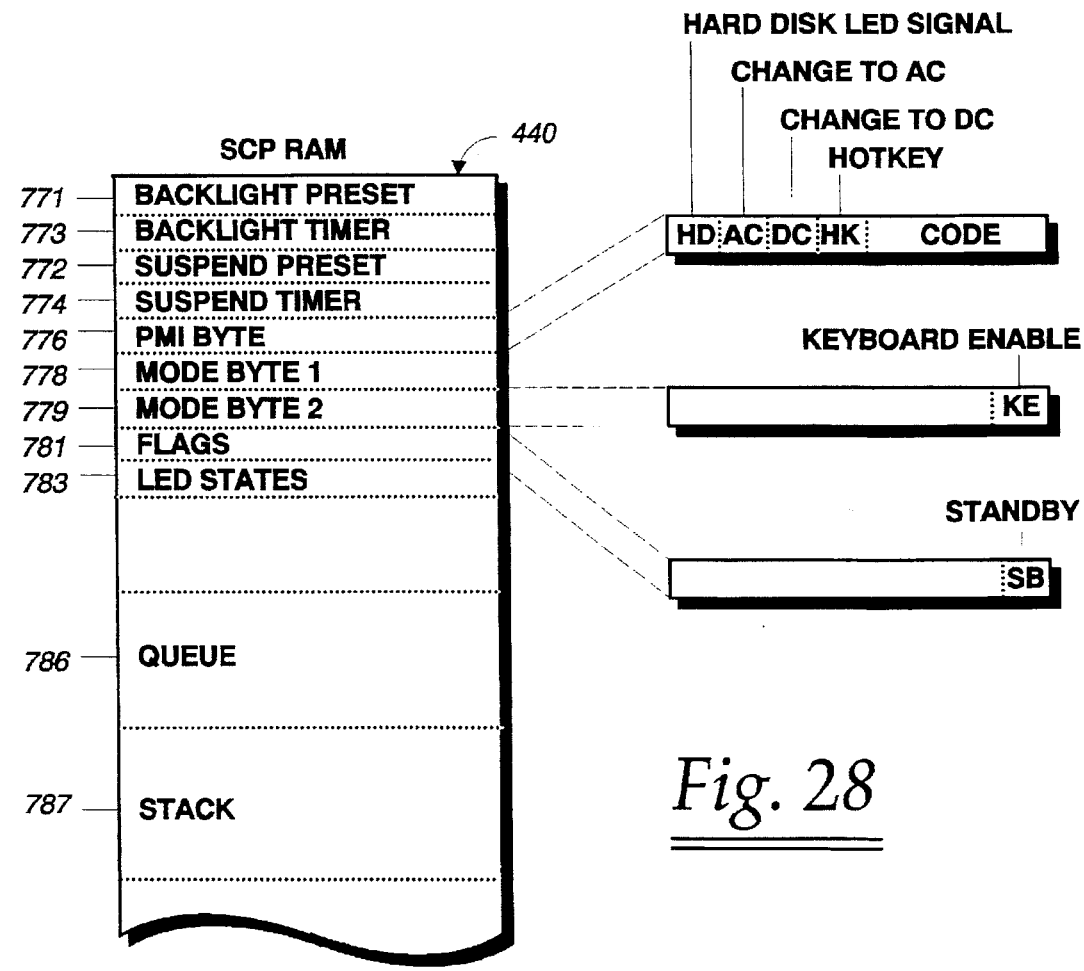

FIG. 28 is a diagrammatic view of the SCP RAM 440 and some of the information stored therein. In particular, a portion 771 stores a preset for the backlight timer. This is the value which is currently specified for use in operating the timer, and in particular is the AC back light preset stored at 761 in the EEPROM if the system is operating under AC power, and is the DC backlight preset stored at 762 if the system is operating under DC power. Similarly, the SCP RAM stores at 772 a suspend preset which is one of the AC and DC suspend presets stored at 758 and 759 in the EEPROM. The SCP RAM also includes locations 773 and 774 which respectively serve as the backlight timer and the suspend timer. Each timer is started by storing in the associated location the appropriate preset, which is a positive number representing the time interval to be timed. The number of each timer is then periodically decremented by software in a manner described later, and the timer expires when the value in the location reaches zero.

The SCP RAM 440 also includes a PMI byte 776. When the main processor asks the SCP to identify the source of an external PMI, the SCP sends the main processor the PMI byte 776. This byte includes an HD bit which is set to indicate that the hard disk LED signal was the source of the PMI, and AC bit which indicates that the power supply has just changed to AC power, a DC bit which indicates that the power supply has just changed to DC power, and a HK bit which indicates that a hot key multi-key combination has been pressed on the keyboard and was the reason for the PMI. In addition, the PMI byte includes a code which identifies the most recent hot key actuated on the keyboard.

The RAM also includes two mode bytes 778 and 779, which control modes in which the SCP and the keyboard operate. For purposes of understanding the present embodiment, a single bit from one of these bytes is shown, which is a keyboard enable (KE) flag. This KE flag indicates whether or not information is to be accepted from the keyboards. Certain application programs may temporarily cause this flag to be cleared in order to prevent the user from entering information on the keyboard.

The RAM 440 also includes a portion 781 containing an additional flag, in particular a standby (SB) flag which is set to let the SCP know that the main processor is currently in standby mode. The RAM 440 also includes a portion 783 which has bits corresponding to each of the four LEDs 442 on the keyboard 317, and these bits each indicate whether the associated LED on the keyboard should presently be on or off for purposes of normal operation. The RAM 440 also includes a queue area 786, which is discussed below, and the usual stack area 787.

Each time power to the SCP is turned on, including the situation where the system is resuming from the suspend mode, the hardware of the SCP automatically causes it to execute a program instruction stored at a predetermined location in the ROM 437, which is the first instruction of the firmware program which controls the SCP. FIGS. 29–30, 31a–31b (collectively referred to as FIG. 31) and 32a–32e (collectively to a referred FIG. 32) are flowcharts of this firmware program. Following a power-up reset at 801, block 802 represents the first portion of the firmware program, in which the SCP configures itself to a default set-up. This includes turning power on to the video controller 318 and LCD 321, and turning on the backlight 431 for the LCD. This default configuration is carried out even if the system is resuming from a suspend mode which was entered while the active display unit was the external CRT 426 rather than the LCD 321. If the active display is in fact to be the external CRT 426, then it is up to the main processor 311 to send commands to the SCP to appropriately reconfigure it, in a manner described below.

After the SCP configures itself to a default set-up configuration, control proceeds from block 802 to block 803, where the SCP checks to see if the KE flag (FIG. 28) is set to indicate that the keyboards are enabled and information can be accepted from them. If so, then control proceeds to block 806, where the SCP scans only the internal keyboard in order to determine if a key has been pressed. If one has, then control proceeds to block 807, where the SCP restarts the backlight timer 773 (FIG. 28) by taking the current backlight preset stored at 771 and storing it in the backlight timer location at 773. Thus, so long as keys are being pressed the timer will be periodically restarted before it can expire and thus will keep the backlight on, whereas if the backlight timer expires the SCP will turn off the backlight in a manner described below in order to conserve power.

Then, still at block 807, the system forcibly disables the suspend timer 774, even if this timer is already disabled, for example by storing a negative number in location 774. The fact that a key has been pressed means that, if the main processor 311 did happen to be in the suspend mode, the SCP would be waking it up in order to pass it the keystroke, and thus the suspend timer necessarily needs to be stopped because the main processor will be exiting standby mode and it is no longer necessary to measure the period of time it has been in standby mode. For similar reasons, the SB flag (FIG. 28) is forcibly cleared to indicate that the main processor is not in the standby mode.

Then, at block 808, a check is made to see if the key which has been pressed is a hot key, or in other words one of several specific predefined multi-key combinations. If not, then at 811 a code representing the particular key pressed is placed in the queue section 786 of the SCP RAM 440, from which it will be sent in due course to the main processor. On the other hand, if it is determined at 808 that the key which has been pressed is a hot key, then control proceeds to block 812, where the SCP updates the PMI byte 776 (FIG. 28) by setting the HK bit to indicate that a hot key has been pressed and by placing in the code section of the PMI byte a unique code corresponding to the particular hot key. Then, the SCP places an unused code in the queue, which will have the effect of waking up the processor if it is in the standby mode but which in any case will be discarded by the processor 311 if it ultimately reaches the processor 311. Then, still in block 812, the SCP produces an output signal which actuates the EXTPMI line in order to produce a PMI in the main processor.

Control ultimately proceeds to block 816, where the SCP checks to see if the queue 786 is empty. If it is not, then it contains information waiting to be sent to the main processor, and control proceeds to block 817, where the SCP checks to see if the CPUSUREQ line from the main processor is actuated to indicate that the main processor is about to send a command to the SCP. If it is actuated, the SCP does not send information from the queue, in order to keep the interface to the main processor clear so that the interface will be available for any information which the SCP needs to send back to the main processor in response to the command, while also avoiding the possibility that information from the queue being sent to the main processor at about the same time that the main processor issues a command will be misinterpreted by the main processor as being a response to the command. If it is determined at 817 that the CPUSUREQ line is not actuated, then at block 818 the SCP takes a code from the queue and places it in an output register in the interface to the main processor, and then generates an IRQ 1 interrupt signal in order to indicate to the main processor that the output register contains information for the main processor. In the event the main processor happens to be in standby mode, the IRQ 1 interrupt signal will wake it up from the standby mode, as already described above in association with the discussion of the main processor. The processor then loops at 819 through blocks 803 and 818, which constitutes the main loop of the program in the SCP.

This main loop can be interrupted by different events, one of which is an attempt by an external keyboard or mouse 421 to send information to the SCP. In response to an interrupt caused by such an attempt to send information, the SCP executes the interrupt service routine shown in FIG. 30. In this routine, the SCP first checks the KE flag at 821 in order to determine whether the user is currently allowed to input information. If the flag is not set, then control proceeds to 822, where a return is made from the interrupt handler without accepting the information. Typically, however, it will be determined at 821 that the information can be accepted, and therefore it will be accepted at block 823, and then at block 826 the system will determine whether it is dealing with an external keyboard or mouse, and if the device is a keyboard the SCP will proceed to block 827 where it places a code representing the actuated key in the queue 786. Hot keys are recognized only for the internal keyboard and not an external keyboard. If a hot key actuation were received from an external keyboard, it could be discarded. All valid codes are thus placed directly in the queue. Then, the SCP restarts the backlight timer, disables the suspend timer and clears the SB flag, for reasons similar to those discussed above in association with block 807, and then returns at 822 to the interrupted routine.

On the other hand, if it is determined at 826 that the external device is a mouse, control proceeds to block 828, where the code received from the mouse is placed in an output register, and then the SCP actuates interrupt line IRQ 12, which is reserved for use with a mouse and indicates to the processor that information from a mouse is being sent to the processor. Then the SCP restarts the backlight timer, disables the suspend timer and clears the SB flag, and returns at 822.

Figure 29:
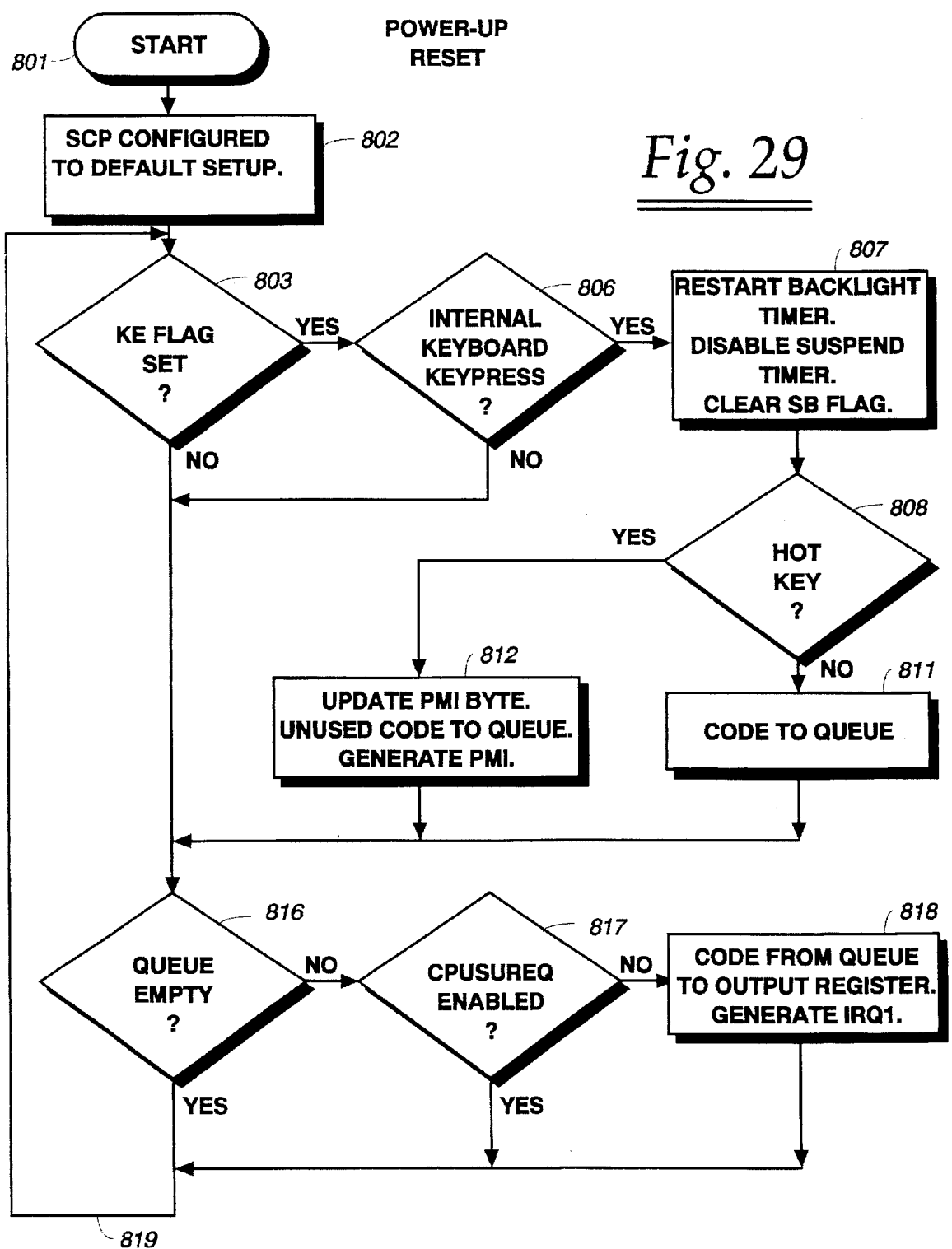
Figure 30:
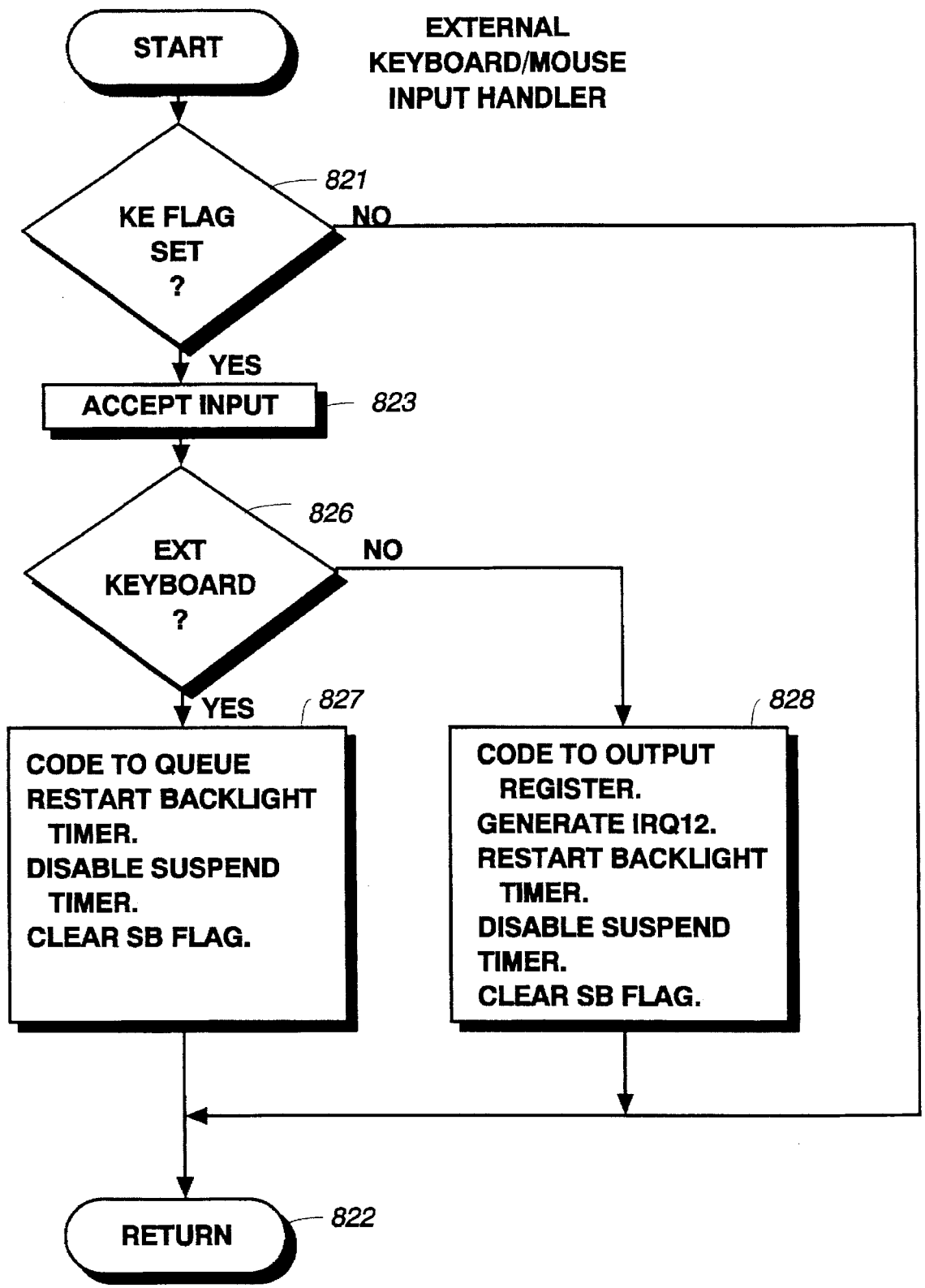
Figure 31A:
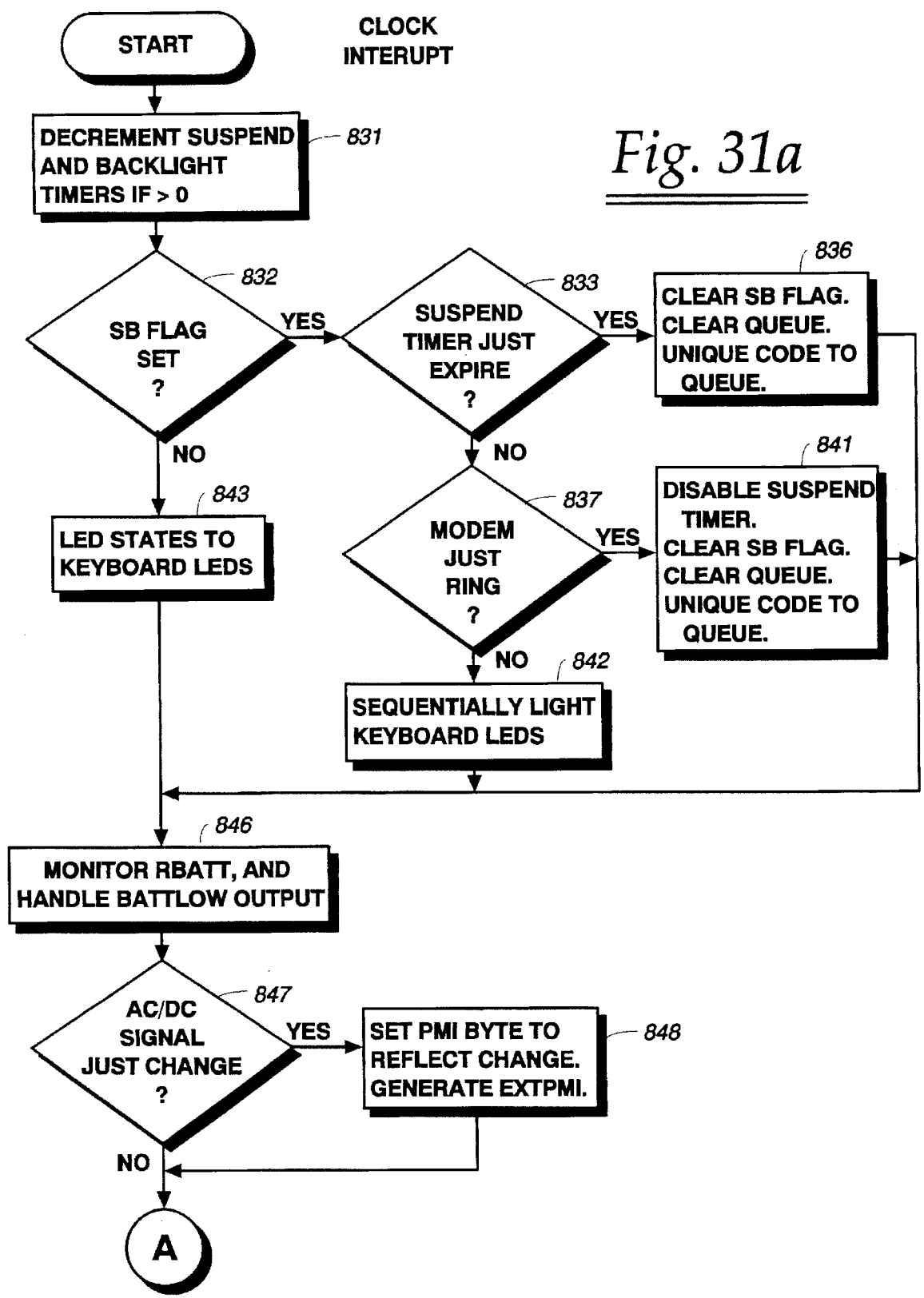
Figure 31B:
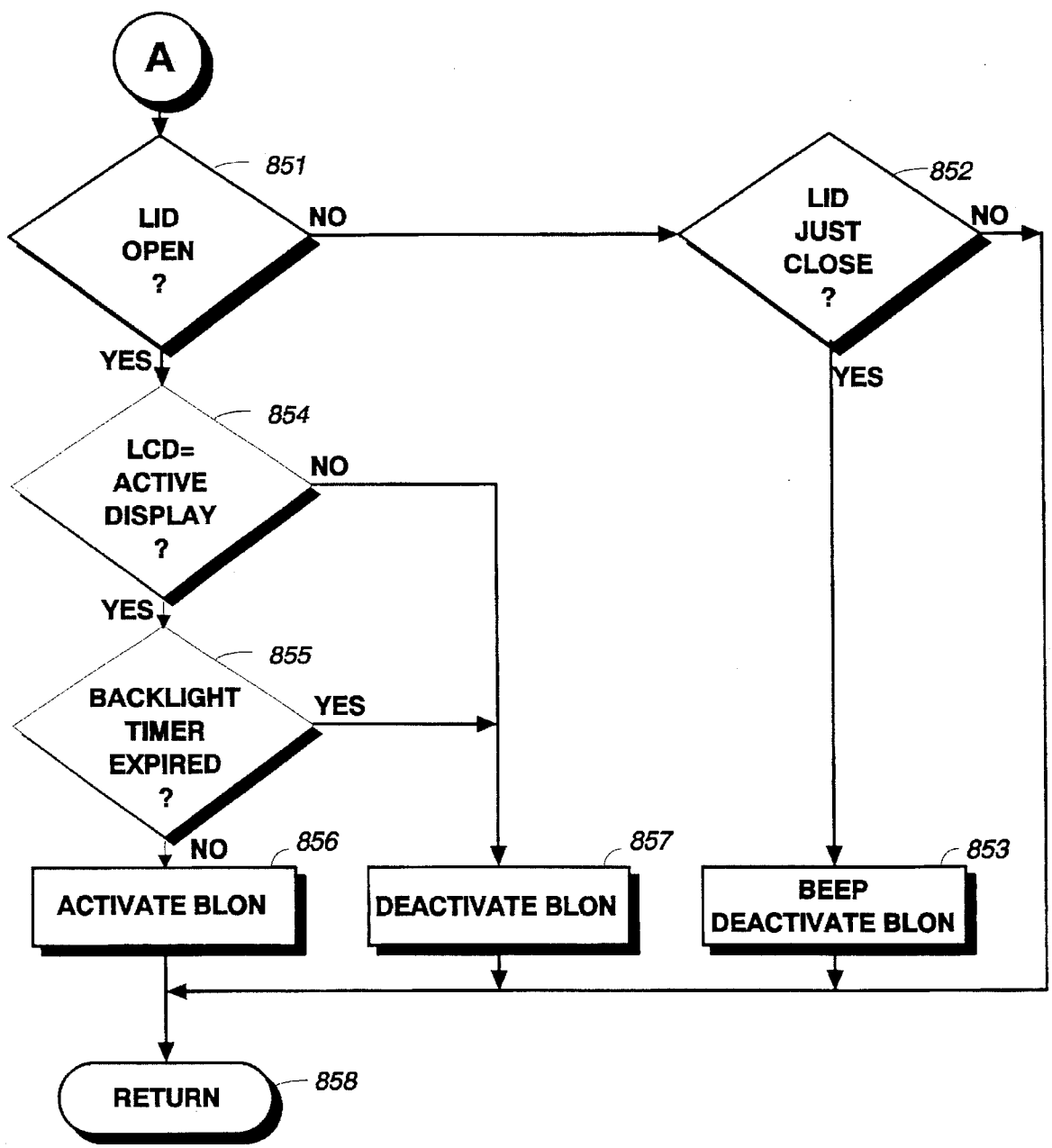

Another source of interrupts to the main routine shown in FIG. 29 are pulses of the keyboard clock signal KBCLCK received from the clock generation circuitry in the main processor. This interrupt occurs at regular intervals and thus each occurrence of this interrupt represents the elapse of an amount of time equal to this interval. The occurrence of this interrupt is therefore used to keep track of time, as well as to perform some housekeeping functions. The firmware service routine for this interrupt is shown in FIG. 31, where the SCP begins at 831 by decrementing the numbers in each of the timer locations 773 and 774 if they are greater than zero. As mentioned above, the expiration of each timer occurs when the positive value in it is decremented to a value of zero.

Then, at 832, the system checks to see if the SB flag is set, or in other words whether the main processor is currently in standby mode. If the main processor is in standby mode, then control proceeds to block 833, where the SCP checks to see if the suspend timer has just expired, or in other words whether the value in location 774 has just been changed from one to zero at block 831. If it has, then the system has remained inactive for a predetermined period of time while the main processor was in standby mode, and therefore the main processor is to be shifted to suspend mode in order to further conserve power until the user again begins using the system. Thus, at block 836, the SCP clears the SB flag in order to indicate that the main processor is no longer in standby mode, because the SCP is going to break the main processor out of standby mode so that the main processor can enter suspend mode. Then, the SCP clears the queue 786, so that the queue can be used to send the main processor a unique code which is not used by the keyboard and which indicates that the suspend timer has expired and that the main processor should transition from standby to suspend mode.

On the other hand, if it is determined at block 833 that the suspend timer has not yet expired, then at block 837 the SCP checks to see if the modem ring signal MDMRI from the modem 322 has just been actuated in order to indicate that there is an incoming call. If it has, then control proceeds to block 841, where the SCP turns off the suspend timer 774 and then takes the same actions described above in association with block 836, except that the unique code placed in the queue is a different unique code not used for the keyboard which will be interpreted by the main processor to mean that the modem ring signal has occurred.

If it is determined at 837 that no ring signal is being received from the modem, then control proceeds to block 842, where the four LEDs 442 on the keyboard are controlled in a manner which causes them to be sequentially lit, which serves as a visual indication to the user of the system that the main processor is in standby mode. In contrast, if it had been determined at block 832 that the SB flag was not set and that the main processor thus was not in standby mode, control would have proceeded directly to block 843, where the LED states stored at 783 in the SCP RAM would have been used to set the LEDs 442 in the keyboard 317 to their normal operational states.

In any event, control ultimately proceeds to block 846, where the SCP reads the value of the RBATT signal from the power control circuit 312 through the A/D converter 416, and then analyzes the state of the signal. The SCP preferably analyzes the rate of change of this signal over time, because an inherent characteristic of the rechargeable battery 396 is that its terminal voltage will drop very slowly while it has a strong charge, and will then begin dropping much more quickly a short period of time before the battery reaches a state where it would not have enough power to operate the system. Consequently, when it is determined that the rate of change of this signal has exceeded a predetermined reference value, the SCP actuates the BATTLOW signal to the main processor 311 as an indication that the battery power is getting low. However, it will be recognized that a detailed analysis of the RBATT signal is not necessary, and that the SCP could alternatively just determine whether the RBATT signal had dropped below a predefined voltage, and then actuate the BATTLOW signal to the main processor 311.

Thereafter, at block 847, the SCP checks the DC/AC signal from the power control circuit 312 in order to determine whether this signal has just changed from one state to another state. If it has, then control proceeds to block 848, where the SCP sets either the AC bit or DC bit in the PMI byte 776 to indicate the current source of system power is AC or DC. Then, the SCP outputs a signal at 435 which actuates the EXTPMI signal in order to generate a PMI in the main processor.

At block 851, the SCP checks the LIDSW switch from the lid switch 432 for the lid on which the LCD display 321 is mounted. If the lid is closed, then control proceeds to block 852, where the SCP checks to see if the lid has just been closed. If the lid was already closed then block 853 is skipped, but if the lid has just been closed control proceeds to block 853, where the SCP actuates line 417 to cause the speaker 392 to beep, and then deactuates the BLON line in order to turn the backlight 431 off. It should thus be noted that if the lid is closed during system operation the system does not automatically enter standby mode or suspend mode, but instead simply beeps to warn the user that the system is still active, and turns off the backlight for the LCD in order to conserve power.

If it was determined at block 851 that the lid is open, then at 852 the SCP checks to see if the LCD is currently the active display, and if it is checks at 853 to see if the backlight timer has expired, and if the backlight timer has not expired proceeds to block 856 where it ensures that the BLON signal is actuated in order to turn on the backlight 431. On the other hand, if the LCD display is not active or the backlight timer has expired, then at block 857 the SCP deactuates the BLON signal to turn off the backlight. Thus, if the user does not press any key for a predetermined period of time specified by the backlight preset at 771, the backlight is automatically turned off in order to conserve power, but will be automatically turned back on when the user again presses a key. After appropriately controlling the backlight, the SCP proceeds to 858, where control is returned to the calling routine.

Figure 32A:
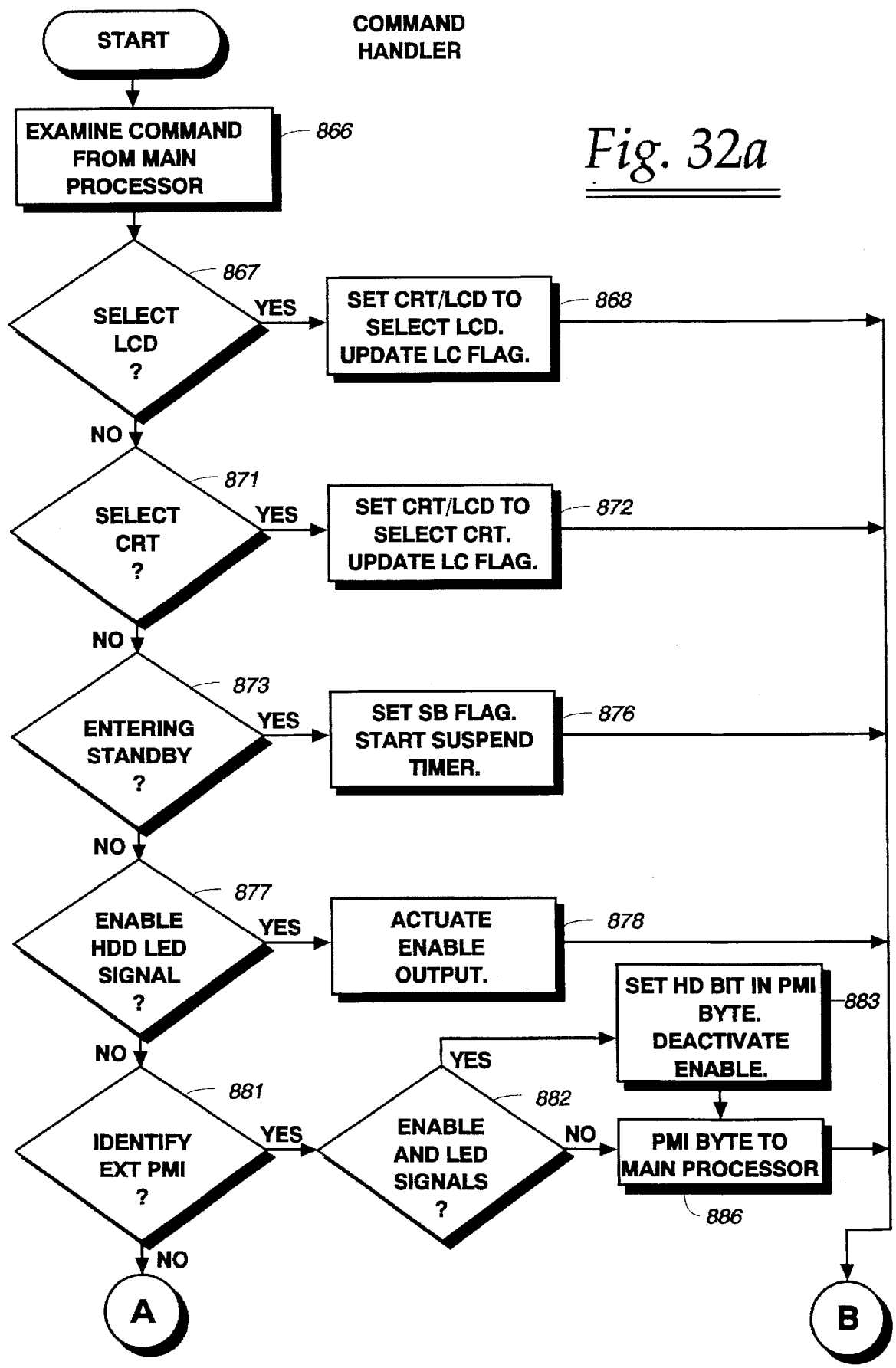
Figure 32B:
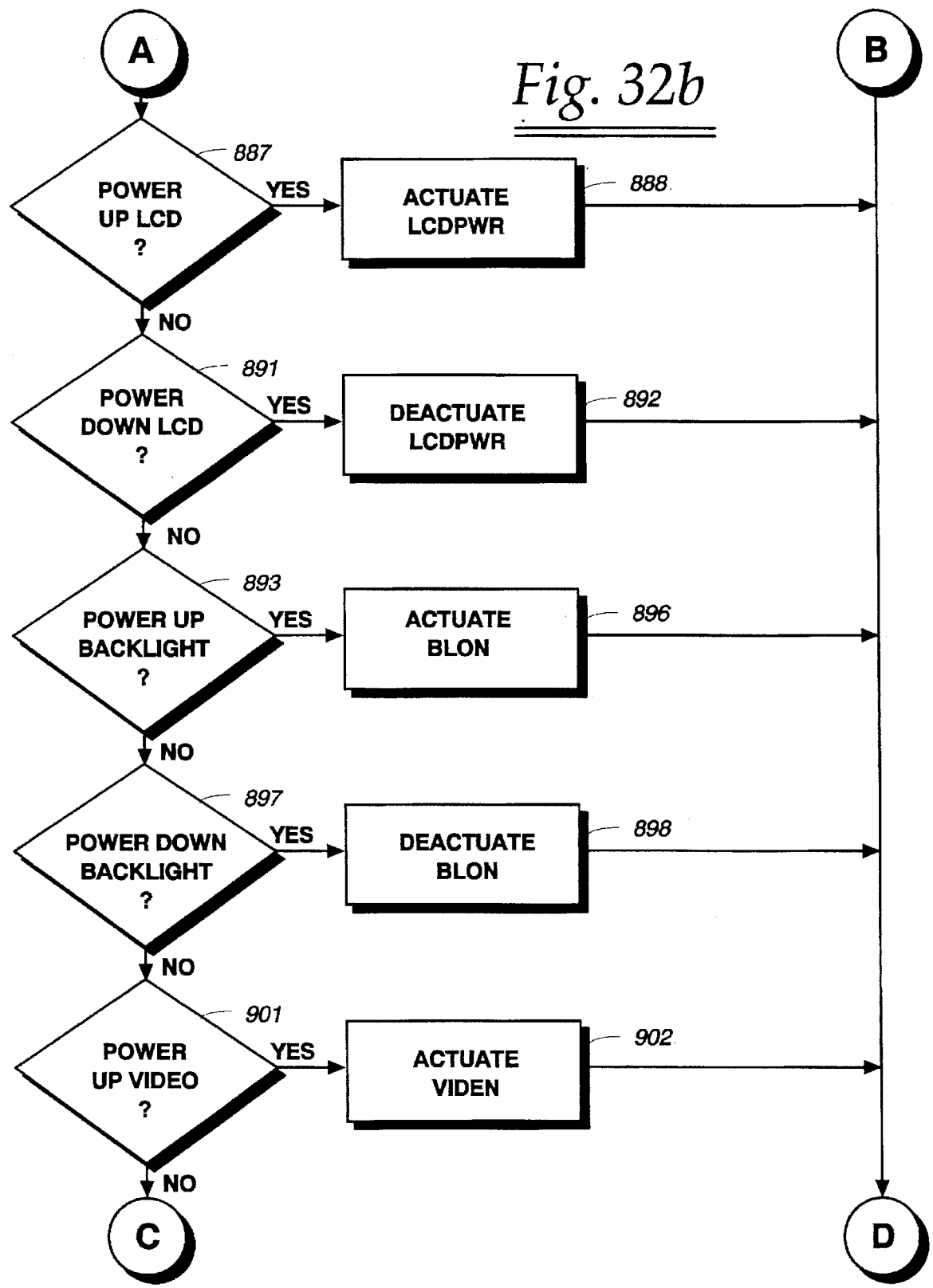
Figure 32C:
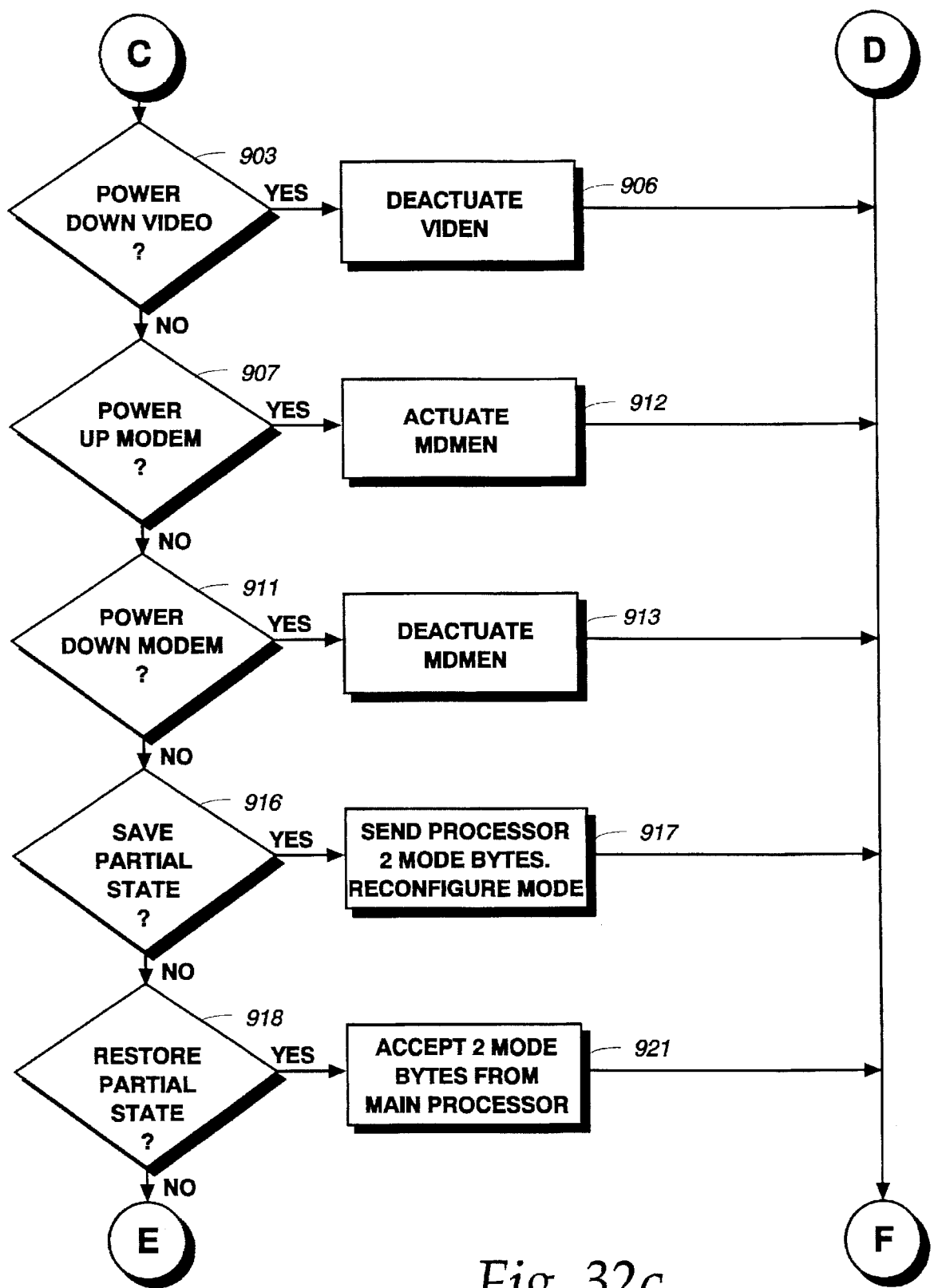
Figure 32D:
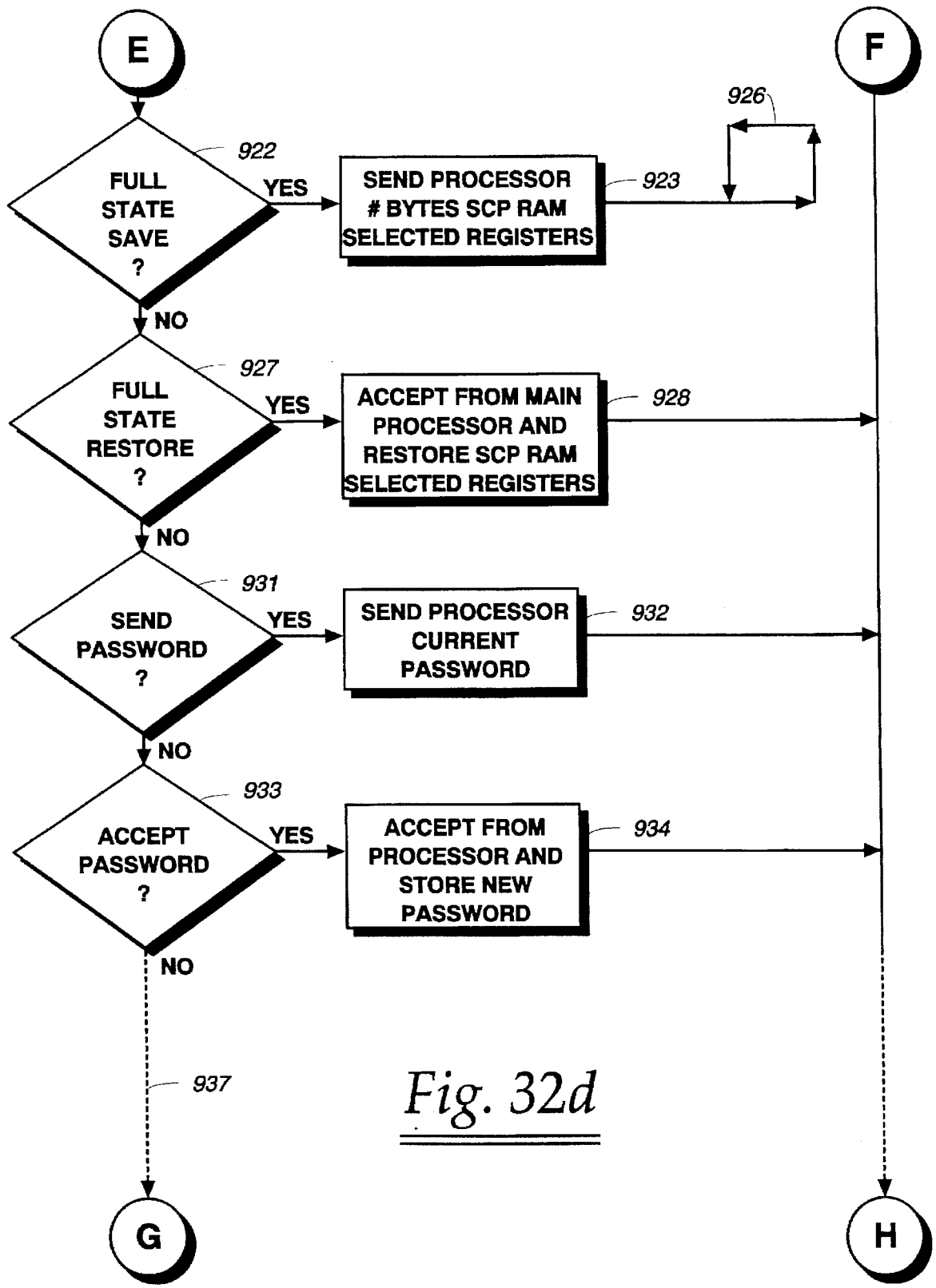
Figure 32E:
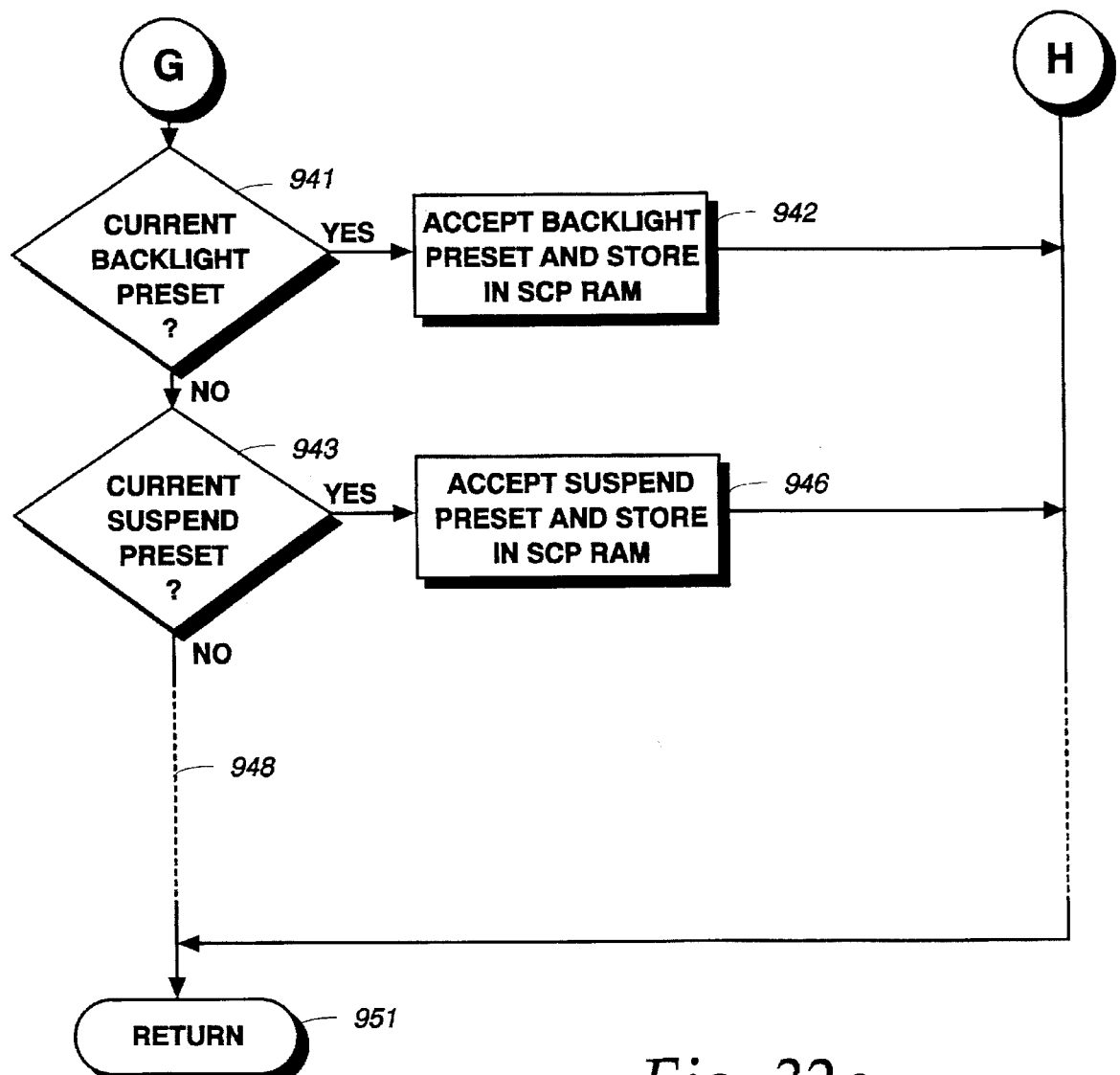

A further event which can interrupt the SCP from the main routine shown in FIG. 29 occurs when the main processor sends a command to the SCP, the loading of this command into an interface register automatically generating an interrupt to the SCP. The interrupt routine which handles the command is shown in FIGS. 32A and 32B, which will be collectively referred to herein as FIG. 32. At 866 in FIG. 32, the SCP examines the command which the main processor has sent it. At 867, if the command indicates that the SCP is to select the LCD as the active video display, control proceeds to block 868, where the SCP sets the CRT/LCD output to select the LCD 321, and then updates the LC flag (FIG. 27) to reflect this setting. On the other hand, if it were determined at 867 that the command was not to select the LCD, but it was determined at 871 that the command was to select the external CRT 426 as the active display unit, then control would proceed to block 872, where the SCP would set the CRT/LCD line to select the CRT, and update the LC flag. Otherwise, control would proceed to block 873, where the SCP would check to see if the command was an indication that the main processor was entering standby mode, in which case the SCP would proceed to block 876, where it would set the SB flag to indicate that the main processor was in standby mode, and would take the preset value from location 772 (FIG. 28) and place it in location 774 if it is a positive number, in order to start the suspend timer.

If it were determined at 877 that the command was to enable the LED signal from the hard disk, the SCP would actuate its ENABLE output to the gate 438 at block 878. Otherwise, if it were determined at block 881 that the command was a request for the SCP to identify the reason for generation of a PMI through actuation of the EXTPMI signal, control would proceed to block 882, where it would check to see if the ENABLE signal to the gate 438 and the LED signal from the hard disk 323 were both actuated, in which case it would proceed to block 883 and set the HD bit in the PMI byte 776. In either case, at 886 it would send the PMI byte to the main processor.

If the SCP proceeded directly from block 881 to block 887, and determined there that the command was to power up the LCD, then at block 888 it would actuate the LCD-PWR line to the LCD 321. Otherwise, it would proceed to block 891, and if it determined there that the command was to power down the LCD, at block 892 it would deactuate the LCDPWR line to the LCD.

If the SCP proceeded directly from block 891 to block 893 and determined there that the command was to power up the backlight, it would proceed to block 896 and actuate the line BLON in order to turn on the backlight. Otherwise, it would proceed to block 897, and if it determined there that the command was to power down the backlight, it would proceed to block 898 where it would deactuate the BLON line in order to turn off the backlight.

In a similar manner, if the SCP proceeded from block 897 to block 901 or 903 and determined that the command was to power up or power down the video controller, it would proceed to one of blocks 902 and 906 and either actuate or deactuate the VIDEN signal in order to appropriately control the power to the video controller. Likewise, if the SCP proceeded to block 907 or 911 and determined that the command was to power up or power down the modem, it would proceed to one of the blocks 912 and 913 and actuate or deactuate the MDMEN signal in order to appropriately control the power to the modem.

If the processor proceeded through blocks 907 and 911 to block 916 and determined that the command was to do a partial state save, control would proceed to block 917, where the SCP would send the main processor the two mode bytes 778 and 779 (FIG. 28), and then set the location 778 and 779 in the RAM 440 to a default configuration which would ensure that information could be sent from the keyboard through the SCP to the main processor, and thus for example the KE flag would be set to indicate that the keyboard is enabled. Otherwise, the SCP would proceed to block 918, and if it determined there that the command was to do a partial restore of the SCP, it would accept two mode bytes from the main processor at 921 and place those mode bytes into locations 778 and 779 of the RAM 440.

If the SCP proceeded through blocks 916 and 918 to block 922, and determined there that the command was to effect a full state save of the SCP, it would proceed to block 923, where it would send the main processor a value representing the total number of bytes to be sent to the main processor, followed by the entire contents of the SCP RAM 440, and selected internal registers of the SCP. Then, the SCP would enter a continuous loop at 926 (for example by executing an instruction which performs an unconditional branch to itself), and wait for the main processor to turn off the power to the SCP as a part of the process of placing the system in the suspend mode.

If the SCP proceeded from block 922 to block 927, and determined that the command was to effect a full restoration of the state of the SCP, it would proceed to block 928, accept information from the main processor, and place this information in the SCP RAM and selected registers of the SCP.

If the SCP proceeded to block 931 and determined that the command was to send the main processor the current password, the SCP would proceed to block 932, and would take the password stored at 763 (FIG. 27) in the EEPROM 439 and send it to the main processor. Otherwise, the SCP would proceed to block 933, and if it determined there that the command was to accept a new password from the main processor, it would proceed to block 934, where it would accept a new password from the main processor and store it in the location 763 of the EEPROM.

In a similar manner, each of the other items stored in the EEPROM 439 are capable of being sent to the main processor and updated by the main processor in response to respective commands. This is handled in a manner similar to that shown above for the password at blocks 931-934, and thus these separate commands are not all illustrated, but instead a broken line at 937 is provided to diagrammatically represent their existence.

If the command is not any of these, then at 941 the SCP checks to see if the command is an instruction to accept a preset value for the backlight timer, in which case at 942 the SCP accepts the preset value and stores it at 771 in the SCP RAM 440. Similarly, if it is determined at 943 that the command is to accept a suspend timer preset, then at 946 the SCP accepts the suspend timer preset and stores it at 772 in the RAM 440.

There are other commands which are not pertinent to an understanding of the present embodiment and which are thus not illustrated and described in detail, but a broken line has been provided at 948 in order to diagrammatically represent their existence. Upon completing the execution of each command, control proceeds to block 951, which transfers control back to the calling routine.

In the embodiment disclosed in FIGS. 13-32, power is supplied to the main memory 326 during suspend in order to maintain the information stored there. In a variation, a portion of the hard disk 323 is reserved, the entire contents of the main memory are written to the reserved portion of the hard disk after the status of all devices had been saved to the main memory, then both the hard disk and main memory are powered down, and then the processor enters the suspend state. Upon resuming, steps with the opposite effect are carried out in reverse order to restore the system. This is slower than the approach taken in the preferred embodiment, but uses less power and thus allows the system to remain in suspend longer on a single battery charge. By using conventional compression techniques on the data from the main memory being stored on the disk, the amount of space required on the disk could be reduced, but the time required to enter and exit from suspend mode would increase as a result of the extra time required for compression and uncompression of the data.

Although certain preferred embodiments of the invention have been disclosed and described in detail for illustrative purposes, it will be recognized that there are variations and modifications of these embodiments, including the rearrangement of parts and data formats, which lie within the scope of the appended claims.

What is claimed is:

1. An apparatus, comprising: a processor having first and second operational modes, wherein in said first operational mode said processor has a predetermined set of operational capabilities and in said second operational mode said processor can perform a first subset of said operational capabilities and is inhibited from performing a second subset of said operational capabilities different from said first subset; operating system program means and application program means respectively executed by said processor in said first and second operational modes; and control means responsive to a predetermined condition originating external to said application program means when said processor is executing said application program means in said second operational mode for interrupting said application program means in a manner invisible to said application program means in order to execute in said first operational mode special program means separate and independent from said operating system program means and said application program means, said control means including means for saving state information from said processor in a manner invisible to said application program means, for forcing said processor to said first operational mode, and for then causing said processor to begin executing said special program means, said special program means including means for placing said processor in a reduced power mode in which instruction execution by said processor is halted.

2. An apparatus of claim 1, including integrated circuit means having therein said processor and said control means.

3. An apparatus of claim 1, wherein said means for causing said processor to begin executing said special program means includes means for causing said processor to execute a program instruction at a specified address after said processor has been forced to said first operational mode.

4. An apparatus of claim 3, wherein said specified address is a predetermined constant address.

5. An apparatus of claim 3, wherein said processor includes a register which can be selectively loaded by said processor under program control, and wherein said specified address is determined as a function of the contents of said register.

6. An apparatus of claim 3, wherein said control means includes means responsive to completion of said saving of said state information for generating a reset signal, and means responsive to said reset signal for effecting said forcing of said processor to said first operational mode and said causing of said processor to execute said instruction at said specified address.

7. An apparatus of claim 3, wherein said processor includes and is controlled by microcode, said control means including a portion of said microcode which controls said saving of said state information, said forcing of said processor to said first operational mode, and said execution of said instruction at said specified address.

8. An apparatus of claim 1, wherein said control means includes a state machine in said processor which controls said saving of said state information and said forcing of said processor to said first operational mode.

9. An apparatus of claim 1, wherein said control means is implemented as circuitry within said processor.

10. An apparatus of claim 1, wherein said processor includes flag means which is actuated in response to said predetermined condition and which can be tested by a program instruction.

11. An apparatus of claim 1, including means for restoring to said processor said state information saved by said control means.

12. An apparatus of claim 11, wherein said means for restoring said state information is implemented as a program instruction.

13. An apparatus of claim 1, wherein said predetermined condition is actuation of a predetermined electrical signal supplied to said processor.

14. An apparatus of claim 13, wherein said control means is responsive to an interrupt signal for interrupting said processor, and wherein in response to an occurrence of said interest signal approximately simultaneously with actuation of said predetermined electrical signal said control means responds to said predetermined electrical signal before said interrupt signal.

15. An apparatus of claim 1, wherein said processor has a register, and means for comparing a value in said register to a value represented by specified signals and for generating said predetermined condition when a value represented by said signals is equal to said value in said register.

16. An apparatus according to claim 1, wherein said reduced power mode includes substantially all circuitry of said processor being powered off.

17. An apparatus, comprising: a computer system which includes a processor having first and second operational modes, wherein in said first operational mode said processor has a predetermined set of operational capabilities and in said second operational mode said processor can perform a first subset of said operational capabilities and is inhibited from performing a second subset of said operational capabilities different from said first subset; memory means storing system routines executable by said processor which are permanently resident in said computer system and independent of software programs executed by said processor, said system routines including a predetermined routine; and control means responsive to a predetermined condition originating external to a software program during execution thereof in said second operational mode for interrupting execution of the software program to execute said predetermined routine in said first operational mode in a manner invisible to the software program, said control means including means for saving state information from said processor in a manner invisible to the software program, for forcing said processor to said first operational mode, and for then causing said processor to begin execution of said predetermined routine, said predetermined routine including a routine that places said processor in a reduced power mode in which instruction execution by said processor is halted.

18. An apparatus according to claim 17, wherein said reduced power mode includes substantially all circuitry of said processor being powered off.

19. An apparatus, comprising: a processor having first and second operational modes, wherein in said first operational mode said processor has a predetermined set of operational capabilities and in said second operational mode said processor can perform a first subset of said operational capabilities and is inhibited from performing a second subset of said operational capabilities different from said first subset; a memory; and virtual address generation means responsive to address information from said processor for generating actual memory addresses to said memory; and control means responsive to a predetermined interrupt condition for bypassing said virtual address generation means and directly generating predetermined addresses for said memory while saving state information from said processor at said predetermined addresses, for forcing said processor to said first operational mode, and for then causing said processor to begin executing a predetermined routine, said predetermined routine including a routine that places said processor in a reduced power mode in which instruction execution by said processor is halted.

20. An apparatus according to claim 19, wherein said reduced power mode includes substantially all circuitry of said processor being powered off.

21. An apparatus, comprising: a processor having first and second operational modes, wherein in said first operational mode said processor has a predetermined set of operational capabilities and in said second operational mode said processor can perform a first subset of said operational capabilities and is inhibited form performing a second subset of said operational capabilities different from said first subset, said first subset including the capability to execute X86-compatible programs; and control means responsive to a predetermined condition when said processor is executing an application program in said second operational mode for saving state information from said processor sufficient to permit invisible resumption of execution of the application program in said second operational mode, and for causing said processor to execute in said first operational mode a further program independent of said application program, said further program including a routine that places said processor in a reduced power mode in which instruction execution by said processor is halted.

22. An apparatus according to claim 21, wherein said reduced power mode includes substantially all circuitry of said processor being powered off.

23. An apparatus, comprising: a processor having first and second operational modes, wherein in said first operational mode said processor has a predetermined set of operational capabilities and in said second operational mode said processor can perform a first subset of said operational capabilities and is inhibited from performing a second subset of said operational capabilities different from said first subset; an operating system and an application program executed by said processor, an interrupt processing program executed in an interrupt processing environment underlying said operating system so as to be invisible to said operating system and said application program; and interrupt handling means responsive to a predetermined condition for interrupting execution of said operating system and application program in a manner invisible to said operating system and application program, for forcing said processor to said first operational mode, for causing said processor to execute said interrupt processing program in said interrupt processing environment in said first operational model said interrupt processing program including a routine that places said processor in a reduced power mode in which instruction execution by said processor is halted, and for thereafter responding to a predetermined condition by causing said processor to exit said reduced power mode and to resume execution of the interrupted program in a manner invisible to the interrupted program, including restoration of the one of said first and second operational modes in effect at the time of the interruption.

24. An apparatus according to claim 23, wherein said reduced power mode includes substantially all circuitry of said processor being powered off.

25. An apparatus, comprising: a processor having first and second operational modes, wherein in said first operational mode said processor has a predetermined set of operational capabilities and in said second operational mode said processor can perform a first subset of said operational capabilities and is inhibited from performing a second subset of said operational capabilities different from said first subset; a memory and means for causing said memory to be normally inaccessible to said processor in each of said first and second operational modes and to be accessible to said processor in response to a predetermined interrupt condition; and control means responsive to said predetermined interrupt condition for saving state information from said processor in said memory, for forcing said processor to said first operational mode, and for causing said processor to begin executing an interrupt handling program, said interrupt handling program including a routine that places said processor in a reduced power mode in which instruction execution by said processor is halted.

26. An apparatus according to claim 25, wherein said reduced power mode includes substantially all circuitry of said processor being powered off.

27. An apparatus, comprising a processor operable in a real mode and a protected mode, and an operating system and at least one protected mode application program; interrupt means coupled to said processor and serviced in an operating environment that underlies said operating system so as to be transparent to said operating system and a protected mode executing program for forcing said processor into said real mode and for transferring program control of said processor from said executing program to said interrupt processing program, said interrupt processing program including a routine that places said processor in a reduced power mode in which instruction execution by said processor is halted; and restoration means coupled to said processor for causing said processor to exit said reduced power mode and for restoring program control of said processor to said protected mode executing program in response to detection of an event.

28. An apparatus according to claim 27, including a memory area coupled to said processor and inaccessible to said operating system and all application programs, for storing processor state data.

29. An apparatus according to claim 28, wherein at least a portion of said memory area for storing said processor state data is contained in a RAM.

30. An apparatus according to claim 28, wherein at least a portion of said memory area for storing said processor state data is contained in a system RAM external to integrated circuit means which contains said processor.

31. An apparatus according to claim 30, wherein said interrupt means is responsive to an electrical signal applied to an external circuit pin of said integrated circuit means.

32. An apparatus according to claim 31, wherein said electrical signal is generated in response to an operator action.

33. An apparatus according to claim 27, wherein said event is an operator action.

34. An apparatus according to claim 27, wherein said reduced power mode includes substantially all circuitry of said processor being powered off.

35. A method of interrupting operation of a processor operable in a real mode and a protected mode, comprising the steps of: receiving an interrupt; transparently transferring program control of said processor in an operating environment that underlies an operating system from a protected mode executing program to an interrupt processing program upon receipt of said interrupt, said step of transparently transferring program control including the steps of suspending execution of said operating system and application program in said processor and forcing said processor into said real mode of operation; executing a routine of said interrupt processing program that places said processor in a reduced power mode in which instruction execution by said processor is halted; detecting occurrence of an event; and responding to detection of said event by causing said processor to exit said reduced power mode and then transparently restoring program control of said processor to said protected mode executing program.

36. A method according to claim 35, including the step of providing a memory area inaccessible to said operating system and all application programs for storing processor state data; and wherein said step of transparently transferring program control to said interrupt processing program includes the step of saving said state data of said processor in said memory area.

37. A method according to claim 35, further comprising the step of providing said interrupt upon detection of a low battery condition.

38. A method according to claim 35, further comprising the step of providing said interrupt upon detection of an operator action.

39. A method according to claim 35, wherein said event is an operator action.

40. A method according to claim 35, wherein said step of executing said routine that places said processor in said reduced power mode includes the step of turning off power to substantially all circuitry of said processor.

41. A method of reducing power consumption in a processor operable in a real mode and a protected mode, comprising the steps of: detecting occurrence of a first event; transparently transferring program control of said processor in an operating environment that underlies an operating system from a protected mode executing program to an interrupt processing program upon detection of said first event, said step of transparently transferring program control including the steps of suspending execution of said operating system and application programs in said processor and forcing said processor into said real mode of operation; executing a routine of said interrupt processing program that places said processor in a reduced power mode in which instruction execution by said processor is halted; detecting the occurrence of a second event; and responding to detection of said second event by causing said processor to exit said reduced power mode and then transparently restoring program control of said processor to said protected mode executing program.

42. A method according to claim 41, including the step of providing a memory area inaccessible to said operating system and all application programs for storing processor state data; and wherein said step of transparently transferring program control to said interrupt processing program includes the step of saving said state data of said processor in said memory area.

43. A method according to claim 41, wherein said second event is an operator action.

44. A method according to claim 41, wherein said step of executing said routine that places said processor in said reduced power mode includes the step of turning off power to substantially all circuitry of said processor.

45. An apparatus with a transparent system interrupt capability, comprising: a processor operable in a real mode and a protected mode; a memory area coupled to said processor for storing processor state data; interrupt means coupled to said processor and serviced in an operating environment that underlies an operating system so as to be transparent to said operating system and a protected mode executing program for forcing said processor into said real mode and for transferring program control of said processor from said protected mode executing program to an interrupt processing program, said interrupt processing program including a sequence of instructions for saving said processor state data in said memory area and a sequence of instructions for placing said processor in a reduced power mode in which instruction execution by said processor is halted; and state restoration means coupled to said processor and responsive to detection of an event for causing said processor to exit said reduced power mode, for restoring said processor to a state represented by said processor state data stored in said memory area and for restoring program control of said processor to said protected mode executing program.

46. An apparatus according to claim 45, wherein said memory area is contained in RAM.

47. An apparatus according to claim 45, wherein said memory area is contained in RAM external to integrated circuit means containing said processor.

48. An apparatus according to claim 45, wherein said interrupt means is responsive to an electrical signal applied to an external pin of integrated circuit means which contains said processor.

49. An apparatus according to claim 45, wherein said reduced power mode includes substantially all circuitry of said processor being powered off.

50. A method of operating a system which includes a processor having a normal mode of operation and a normal address space accessible using an address bus and a data bus coupled to said processor, and having a non-maskable interrupt in response to which said normal mode of operation is interruptable, said method comprising the steps of: providing a special interrupt to said processor separate from said non-maskable interrupt, said special interrupt also being non-maskable; providing said processor with a special mode of operation invoked in response to said special interrupt; executing a sequence of instructions in said normal mode of operation by accessing said instructions and accessing data in said normal address space; interrupting said executing with said special interrupt and entering said special mode of operation; saving in a special address space, when entering said special mode of operation and using said address bus and said data bus, a state of said processor at a point in said sequence of instructions when said special interrupt was received; causing said processor to enter, during said special mode of operation, a reduced power mode in which instruction execution by said processor is halted; and responding to the occurrence of a predetermined condition while said processor is in said reduced power mode by causing said processor to exit said reduced power mode and to return from said special mode of operation to said normal mode of operation to continue said executing at said point in said sequence of instructions.

51. A method according to claim 50, including the step of causing said special address space to be inaccessible to said processor while in said normal mode of operation.

52. A method according to claim 50, wherein said normal mode of operation includes a protected mode and a real mode.

53. A method according to claim 50, wherein said sequence of instructions includes codes for an operating system and for an application program.

54. A method according to claim 50, wherein said step of causing said processor to enter said reduced power mode includes the step of turning off power to substantially all circuitry of said processor.

55. An apparatus, comprising: a processor, and an address bus and a data bus coupled to said processor for accessing a normal address space; means for executing a sequence of instructions in a normal mode of operation by accessing said instructions and accessing data in said normal address space; first interrupt means responsive to a non-maskable interrupt during said executing for interrupting said executing to enter a non-maskable interrupt handling mode of operation; second interrupt means responsive to a special interrupt separate from said non-maskable interrupt during said executing for interrupting said executing to enter a special mode of operation, said special interrupt also being non-maskable; means, operable when entering said special mode of operation, for saving in a special address space a state of said processor at a point in said sequence of instructions when said special interrupt was received; means operable during said special mode of operation for causing said processor to enter a reduced power mode in which instruction execution by said processor is halted; and means responsive to the occurrence of a predetermined condition while said processor is in said reduced power mode for causing said processor to exit said reduced power mode and to return from said special mode of operation to said normal mode of operation to continue said executing at said point in said sequence of instructions.

56. An apparatus according to claim 55, wherein said processor accesses said special address space in said special mode of operation using said address bus and said data bus, said special address space being inaccessible in said normal mode of operation.

57. An apparatus according to claim 55, further comprising a memory for storing said sequence of instructions and said other instructions and other data, said memory being external to integrated circuit means which contains said processor.

58. An apparatus according to claim 55, wherein said normal mode of operation includes a protected mode and a real mode.

59. An apparatus according to claim 55, wherein said sequence of instructions includes code for an operating system and for an application program.

60. An apparatus according to claim 55, wherein said reduced power mode includes substantially all circuitry of said processor being powered off.

\* \* \* \* \*